United States Patent [19]
Bush et al.

[11] Patent Number: 5,790,778
[45] Date of Patent: Aug. 4, 1998

[54] SIMULATED PROGRAM EXECUTION ERROR DETECTION METHOD AND APPARATUS

[75] Inventors: William R. Bush, San Mateo; Jonathan D. Pincus, San Francisco; Richard E. Wilbur, Campbell; Debby Majors-Degnan, San Jose; David Jon Sielaff, Oakland, all of Calif.

[73] Assignee: Intrinsa Corporation, Mountain view, Calif.

[21] Appl. No.: 694,470

[22] Filed: Aug. 7, 1996

[51] Int. Cl.$^6$ .............................. G06F 13/00; G06F 9/45
[52] U.S. Cl. ................ 395/183.14; 395/704; 395/183.1
[58] Field of Search ...................... 395/183.14, 183.13, 395/183.04, 183.05, 183.09, 183.15, 183.01, 183.02, 701, 704, 183.1

[56] References Cited

U.S. PATENT DOCUMENTS

| | | | |
|---|---|---|---|
| 5,325,533 | 6/1994 | McInerney et al. | 395/700 |
| 5,446,900 | 8/1995 | Kimelman | 395/700 |
| 5,481,705 | 1/1996 | Watanabe et al. | 395/650 |
| 5,574,854 | 11/1996 | Blake et al. | 395/183.04 |
| 5,581,696 | 12/1996 | Kolawa et al. | 395/183.14 |
| 5,583,988 | 12/1996 | Crank et al. | 395/185.01 |
| 5,590,329 | 12/1996 | Goodnow, II et al. | 395/708 |
| 5,687,375 | 11/1997 | Schwiegelsholm | 395/704 |

OTHER PUBLICATIONS

Mendal Rosenblum et al., "Complete Computer Sys Simulation: The Sim DS Approach," IEEE Parallel & Distributed Technology, vol. 3, Issue 4, pp. 34–43, 1995.

Brian A. Malloy, "Trace Driven and Program–Driven Simulation: A Comparison," MASLDTS 94: Modeling, Analysis, and Simulation, Intl Workshop., IEEE., pp. 395–396, 1994.

Primary Examiner—Robert W. Beausoliel, Jr.
Assistant Examiner—Norman M. Wright
Attorney, Agent, or Firm—Skjerven, Morrill, MacPherson, Franklin & Friel, LLP; Alan H. MacPherson

[57] ABSTRACT

A computer program error detection system that detects errors in a computer program by simulating execution of program statements. An internal format structure is retrieved along with a list of all functions defined by the computer program. The internal format structure is analyzed to determine all function calls and the function call ordering. External behavior models corresponding to the discovered function calls are retrieved and stored in a model table. One or more control flow paths are traversed through the computer program. For each path traversed, a structural memory model is maintained to represent the effect of the simulated execution of statements along the control flow path. A statement is simulated by executing a built in model of the operation. A function call is emulated by executing an external behavior model corresponding to the called function. Execution of an external behavior model causes the structural model memory to be updated to reflect execution of the called function. Information describing the manipulation of the memory model is logged for automodelling purposes. Invalid conditions in the structural memory model are detected and reported. The information logged for automodelling purposes is scanned after analysis of each path to build an outcome for that path. After individual path analysis completes, the different outcomes are processed, duplicates are removed, and an external behavior model representing the computer program under analysis is generated.

41 Claims, 27 Drawing Sheets

Microfiche Appendix Included
(22 Microfiche, 2146 Pages)

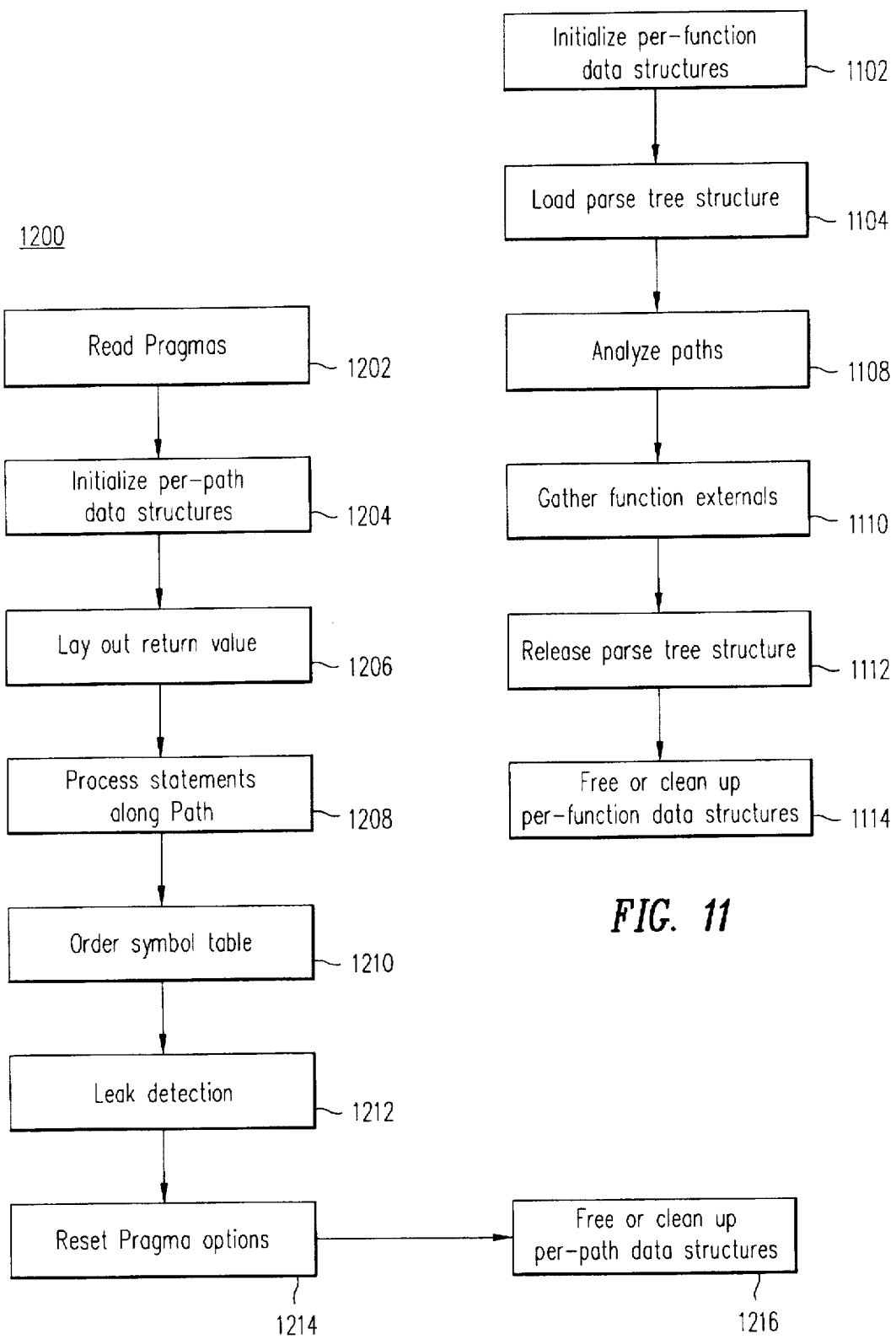

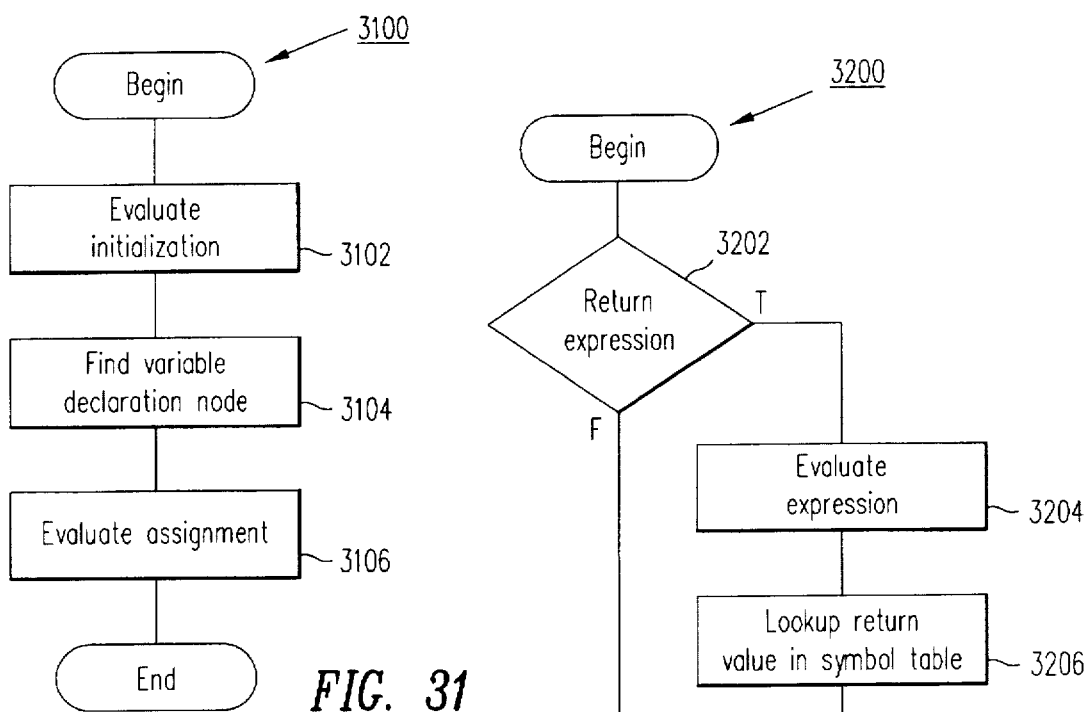
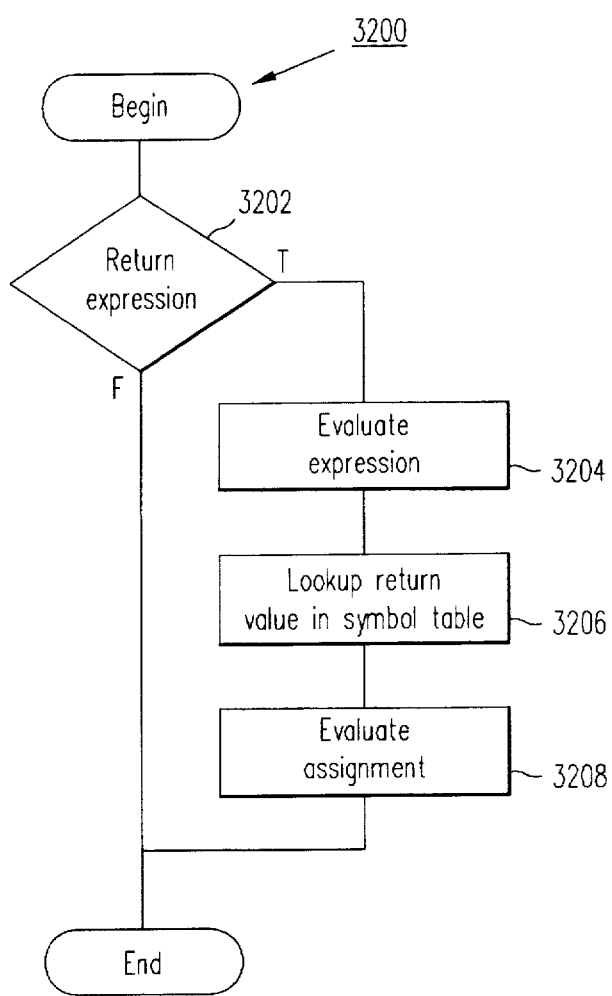
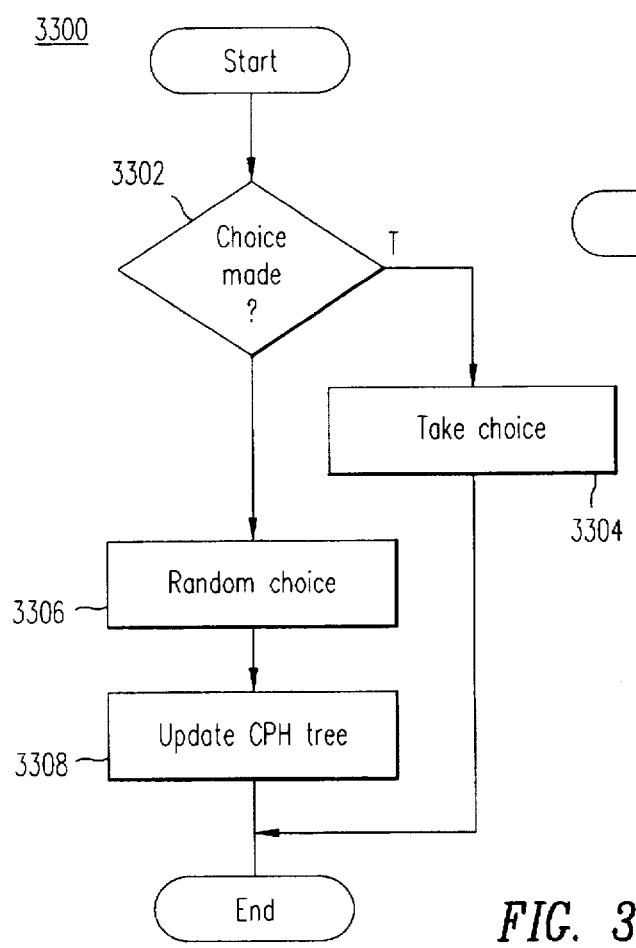
FIG. 31
FIG. 32
FIG. 33

Fetched value block 3500

| | |
|---|---|
| 3502 | Number of bytes |
| 3504 | Exact value known flag |
| 3506 | Exact value pointer |
| 3508 | Predicate collection pointer |
| 3510 | Format of value |
| 3512 | Value as real |
| 3514 | Value as unsigned integer |
| 3516 | Resource type |
| 3518 | Resource state |
| 3520 | Initialized flag |
| 3522 | Valid pointer |
| 3524 | Non-zero flag |
| 3526 | New predicates flag |
| 3528 | Changed flag |
| 3530 | Assumed flag |
| 3532 | SVS pointer |
| 3534 | SVS offset |
| 3536 | From location flag |
| 3538 | Location |
| 3540 | Chunk origin |
| 3542 | Memory type |
| 3544 | SV subset pointer |
| 3546 | Expression pointer |
| 3548 | Dereference flag |

*FIG. 35*

SIMULATED PROGRAM EXECUTION ERROR DETECTION METHOD AND APPARATUS

CROSS REFERENCE TO MICROFICHE APPENDIX

Appendix A, which is a part-of this disclosure, is a microfiche appendix consisting of 22 sheets of microfiche having a total of 2146 frames. Microfiche Appendix A is a list of computer programs and related data in one embodiment of the present invention, which is described more completely below.

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of the Invention

The present invention relates to the analysis of computer programs and, in particular, to the detection of programming errors in a computer program through analysis of the effects of simulated execution of the computer program upon a structural memory model.

2. Background

A large amount of effort in the development of computer programs is spent ensuring the correctness of the completed program. The objective of a computer program is to implement a specified input/output function. The correctness of a computer program is the degree to which the program is free from errors in its specification, design and implementation. The two most common methods for detecting errors in a computer program are compile-time checking and runtime checking.

Compile-time checking is the process of evaluating a computer program based on its form, structure or content. Compile-time checking tests properties that can be established before the execution of a program. "Syntax checking", one form of compile-time checking, verifies compliance with structural or grammatical rules defined for a language. For example, in the context of a computer program written in the well known C computer language, using the statement B+C=A produces an error because the correct format is A=B+C. Syntax checking is discussed further in Richard Conway and David Gries, *An Introduction to Programming*, (Winthrop Publishers, Inc. 1979). "Data flow analysis", another type of compile-time checking, analyzes the sequence in which data transfer, use and transformation are performed in a computer program to detect programming errors. Data flow analysis includes the use of control flow information; "control flow" is the sequence in which statements are performed in the execution of a computer program. A control flow is also referred to as a "control flow path" or, simply, a "code path". Data flow analysis can detect such errors as the use of a variable before assignment, two consecutive assignments to a variable or assigning a value to a variable that is never used.

Most shortcomings of compile-time checking methods stem from the fact that they do not consider consequences of computer program execution. Compile-time checking is limited to what can be determined without considering the dynamic effects of program execution. For example, the lint compile-time checker available in the SPARCworks™ 3.0.1 programming environment from Sun Microsystems of Mountain View, Calif., analyzes computer code without regard to the dynamic flow of control through the code. This shortcoming leads lint to report values being used before they are initialized when that is, in fact, not the case.

Error messages produced by compile-time checking methods are typically either under-inclusive or over-inclusive. A particular function in a computer program may use a resource before checking if the resource is valid. If resource validity is not checked outside the instant function, then failure to report a potential program terminating error could result in the corruption of data structures and even loss of valuable data. However, if resource validity is checked prior to the instant function, then reporting an error clutters the analysis of the instant function with false errors and, in a large program, may render analysis of the computer program useless.

Another type of false error reported by compile-time analysis methods is an "apparent" error in instructions through which control flow cannot go. The sequence in which statements are performed often depends on particular values associated with particular variables. Compile-time checking methods generally assume statements are always executed because they cannot determine if a particular code path is executed or under what specific circumstances program control flows through the code path.

Runtime checking, the other primary type of programming error detection method, is the process of evaluating a computer program based on its behavior during execution. Runtime checking involves executing the computer program with a known set of inputs and verifying the program results against the expected outcome. The set of test inputs, execution conditions and expected results is called a "test case". Often, in order to help locate errors, a printout (trace) showing the value of selected variables at different points in the program is produced.

Although simple in concept, the usefulness of runtime checking is limited by the complexity of the computer program. A tremendous amount of effort is required to design, make and run test cases. Even after an extensive effort, the error detection capability of runtime checking is limited to the code paths executed by the specific set of inputs chosen. In all but the most simple computer programs, it is generally impractical to execute all possible control flow paths. Furthermore, runtime checking requires that a computer program be complete and ready for execution. Since a function must be executed to be analyzed, testing a function apart from incorporating it into a complete program requires the additional effort of building a program shell which provides the function with the necessary environment for execution.

One method to overcome the deficiencies of typical programming error detection methods is presented by Applicants in U.S. patent application Ser. No. 08/289,148, entitled "Computer Process Resource Modelling Method and Apparatus", filed on Aug. 10, 1994, and assigned to the same assignee as this application, which is expressly incorporated herein by reference. This programming error detection method analyzes components of computer programs by tracking the effect of program instructions on the state of program resources. Each resource has a prescribed behavior represented by a number of states and transitions between states. However, since state machines are cumbersome to maintain and use, computer process resource modelling is limited in its ability to suppress spurious errors and provide detailed error messages. Further, the complexity of the method itself makes it difficult to maintain the structure embodying the method and to extend the method to new types of programming errors and programming languages.

What is needed is a programming error detection method which considers the behavior of executed program instructions, which automatically considers substantially all possible control flow paths through a computer program, and which can analyze an individual function of a computer program. What is further needed is a programming error detection method which considers the behavior of a called function when analyzing the calling function. The needed programming error detection method must also be easy to maintain and extend to new programming languages and different types of errors. The needed method should also be able to minimize spurious errors and provide detailed error messages.

SUMMARY OF THE INVENTION

In accordance with this invention, a computer program error detection system is provided to analyze the runtime behavior of a computer program by simulating the execution of program statements. Specifically, the system can be used to analyze only a subset of functions within a computer program or the entire program. In one embodiment, an object based design methodology is employed to increase maintainability of the system while providing high extensibility.

In one embodiment of the present invention, a computer program is input into a preprocessor. Also input into the preprocessor are user specified configuration options contained in a configuration file, header files, and command line information. The preprocessor transforms the computer program into an internal format structure (a parse tree structure). The parse tree structure is put into an intermediate file along with a list of all the functions defined within the computer program. This intermediate file, the configuration options, command line information and external behavior models are input into the analysis engine.

Analysis engine processing starts with accepting the configuration options. Configuration options control the analysis performed by the analysis engine. Once the controlling configuration options are determined, the internal format structure of the computer program is retrieved from the intermediate file. Also from the intermediate file, the analysis engine identifies all of the functions defined by the computer program. The internal format structure of the computer program is analyzed to identify all the function calls. The scheduling of function analysis is controlled by the ordering of identified function calls. In another embodiment of this invention, a different representation of the computer program can be used in place of the internal format structure. For example, source code representing the computer program.

Before analysis of the functions, the analysis engine locates and retrieves any previously constructed external behavior models corresponding to the identified called functions. The gathered external behavior models are represented by model table entries. Each model table entry is collected into the model table. If no external behavior model can be found for a called function, that function is represented by the missing model. The model table provides a reference to the external behavior models during function analysis.

Analysis of each function defined by the computer program is performed in a loop. At the start of analysis of a function, the internal format structure corresponding to the function is read into memory. The analysis engine analyzes a function by traversing code flow paths through the function until either the maximum number of paths has been reached or there are no more paths to analyze. The maximum number of paths is set with a configuration option to put a ceiling on analysis engine processing. A control flow path is selected using a deterministic choice point history. The simulated execution of a function through different control flow paths is modelled by a CPH tree. A control flow path may contain an unresolved choice point. That means, there may be a conditional or predicate in the control flow path that can't be resolved. A node in the CPH tree is used to represent each unresolved choice point. An edge from the node is randomly chosen to simulate resolution of the unresolved choice point. After a path is chosen in the CPH tree, that path is analyzed. When an edge is randomly chosen, there are implications for program variables which are remembered by updating the structural memory model representing the effect of the statements in the control flow path.

After all the selected paths have been analyzed, the externals of the function under analysis are gathered. Then, when it is no longer needed, the internal format structure of the function being analyzed is released from memory. Finally, the automodeller scans all the individual path outcomes, removes extraneous operations and deletes duplicate outcomes. The automodeller then packages the remaining outcomes together to generate an external behavior model of the function being analyzed.

Analysis of a particular control flow path entails simulation of each statement along the control flow path. At the start of path analysis, the analysis engine checks for configuration options specified only for the function being analyzed. Processing for the current function is influenced by the configuration options detected. For each code path analyzed, the analysis engine constructs a new structural memory model. The structural memory model is used to simulate the effects of execution of each statement along the control flow path. A table, called the "chunk table" is provided to keep track of all the modeled memory locations. For each code path analyzed, a symbol table is created that associates variable names used in the computer program to locations in modelled memory.

Prior to processing the first statement in the path, a modeled memory location is created for the function's return value and this location is inserted into the symbol table. A modeled memory location consists of one stored value per each addressable unit of the memory being modeled. If a four byte pointer is modelled, then the modeled memory location will contain four stored values (one per byte—the lowest addressable unit). Stored values are collected in stored value sets. The chunk table manages the memory model by keeping track of all the stored value sets.

Once the return value is laid out in the memory model, each statement along the path is processed. After the statements are processed, the symbol table is ordered to facilitate the comparison of outcomes between different code paths. Path processing also performs leak detection which searches each modeled memory location to determine if a piece of memory is allocated but will not be pointed to by any symbol after the function exits. Appropriate error messages are generated for any leaks detected. Path processing concludes with the automodeller scanning structures in the memory model to determine the tests performed on and the changes made to each external of the function. This information is summarized into an outcome for the path.

Analysis of a particular statement entails manipulating the memory model to reflect the effect the statement has in a computer memory. At the start of statement processing, the analysis engine checks for configuration options specified only for the statement being analyzed. Processing for the current statement is influenced by the configuration options detected. Statements are distributed for processing to an appropriate statement unit. There is a different statement unit for each type of statement. In general, a statement unit simulates execution of the program statement by evaluating the expressions in a statement and reproducing the appropriate processing control results.

Expressions are evaluated by creating modeled memory locations to represent the operands of the expression and updating the memory model to simulate the effect of applying the operator of the expression to the operands. Information describing the manipulating of the memory model is logged for later inspection by the automodeller. Simulating the effect of applying operators is performed by the operation unit. The operation unit simulates operations by executing built in models analogous to the external behavior models used to represent functions.

If the statement is a function call, an external behavior model corresponding to the called function is executed to emulate the effect of the function call. If a corresponding external behavior model does not exist then the memory model is updated under the assumption the called function returned normally. An external behavior model generated by the automodeller for a called function can be used to emulate the called function in an analysis of the calling function.

When an invalid condition is detected in the memory model an error message is generated. Reporting error messages is controlled by configuration options. Configuration options can permit only certain invalid conditions to be reported or can suppress the reporting of certain invalid conditions. Further, the analysis engine does not report duplicate error messages.

This invention will be more fully understood in view of the following detailed description taken together with the drawings.

BRIEF DESCRIPTION OF THE DRAWINGS

FIG. 11 is a block diagram representing the processing performed by the analyze functions block of FIG. 8.

FIG. 12 is a block diagram representing the processing performed by the analyze paths block of FIG. 11.

FIG. 31 is a logic flow diagram of one embodiment of the variable initialization unit of this invention.

FIG. 32 is a logic flow diagram of one embodiment of the return unit of this invention.

FIG. 33 is a logic flow diagram of one embodiment of the CPH choose condition unit of this invention.

FIG. 35 is an illustration of a fetched value block employed in one embodiment of the present invention.

DETAILED DESCRIPTION OF THE PREFERRED EMBODIMENTS

Figure 1:
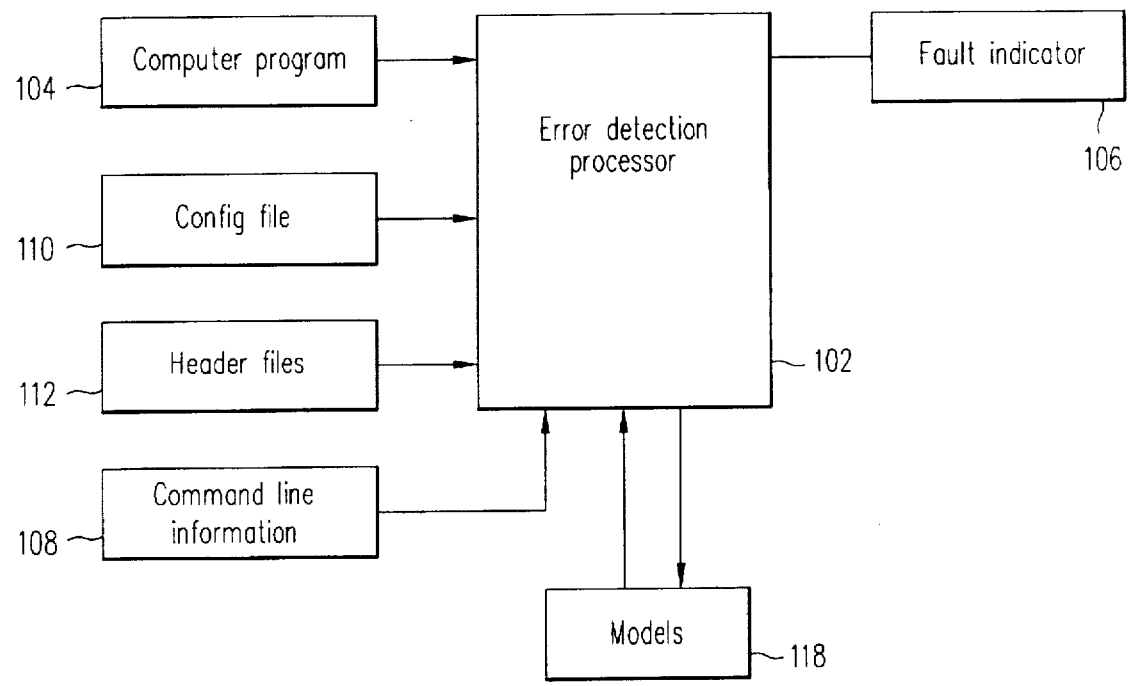
FIG. 1 is a block diagram of the inputs and outputs to one embodiment of the present invention.

According to the principles of this invention, methods and apparatus are provided for simulating computer program execution and detecting programming errors. In particular, in accordance with this invention a novel error detection method maps the source code of a computer program to a sequence of operations on a virtual machine. A virtual image, a detailed structural model of memory as used by the computer program under analysis (sometimes referred to as a "memory model"), represents the condition of the virtual machine. Each variable in the computer program is associated with a unique location in the memory model. Each location contains a value. Each value is uniquely identified and represents a particular instance of a variable or other program resource. Executable program instructions are converted to instructions for the virtual machine. The virtual machine operates by applying behavior models of the instructions to the values contained in the memory model. Application of the models detects illegal operations, invalid values, leaks and other kinds of errors.

Analysis of a computer program involves multiple iterations traversing different code paths. While traversing an individual code path, unresolved choice points are resolved. A "choice point" is a point in the computer program at which one of two or more alternative sets of program statements is selected for execution based upon the value of a condition or predicate. When analysis is conducted with only partial knowledge of a program's variables and resources, a condition or predicate value may be undetermined resulting in an unresolved choice point.

Function calls along a code path are analyzed by executing an external behavior model of the function. This external behavior model reflects what must be true when the corresponding function is entered and what will be true when the corresponding function exits. The information distilled from multiple iterations of the computer program is abstracted to form an external behavior model of the program under analysis.

In the following description, numerous specific details are set forth such as language syntax, program interfaces, and sample data, etc. in order to provide a more thorough understanding of the present invention. However, it will be apparent to one skilled in the art that the present invention may be practiced without these specific details. In some cases, well known data formats and data structures are not described in detail in order not to unnecessarily obscure the present invention.

Analyzing at the Function Level

Typically, computer programs are developed by combining previously developed components with newly written code. As used herein, "code" refers to source code, i.e., computer instructions in human intelligible form and/or object code, i.e., computer instructions in computer intelligible form. A component of a computer program is a piece of code which performs one or more specified tasks. To execute a computer program on a computer, the source code is translated into machine code and the program is loaded into memory as a load module. For more discussion on creating load modules and executing programs see Arthur Gill, *Machine and Assembly Language Programming of the PDP-11*, (Prentice-Hall, Inc. 1978).

Computer programs can be written in any of a number of computer languages. In traditional computer languages, called procedural languages, the programmer states a specific set of instructions that the computer must perform in a given sequence. An instruction is a statement in a programming language which specifies an operation to be performed by the computer and the addresses or values of the associated operands. For example, in the instruction A=B+1, "B" and "1" are the operands and "+" is the operator used to specify the addition operation. In general, a statement specifies an action to be performed. Examples of procedural computer languages are C, Ada, Pascal, Fortran, COBOL and PL/1.

Some procedural languages, such as C++, are object oriented. Object oriented programming languages maintain objects which are conceptual groupings of functions and associated data. Objects are structured into components known as "classes". Some computer languages are graphics-based in that instructions are represented as graphical images which are displayed on a computer screen and which are linked by a computer programmer to create a computer program. Some computer languages are specific to a particular software product such as the Lotus 1-2-3 macro language for the Lotus 1-2-3 Spreadsheet program available from Lotus Development Corporation of Cambridge, Mass. The present invention is applicable to any computer language, i.e., to any computer instruction protocol, in which memory is manipulated.

While source code computer instruction protocols are described above, it is appreciated that the teachings herein are equally applicable to computer instructions in the form of object code. In the illustrative embodiment described herein, the particular computer language analyzed is the well-known C computer language.

Computer programs written in the C computer language are typically divided into a number of functions. A function accepts as input zero or more parameters, performs a specific action and produces as output at most one returned item. The parameters and returned item are data structures which are stored in memory. A function can be a component or part of a component. In the illustrative embodiment of the present invention described herein, each function of a computer program is analyzed individually.

Computer Program Analysis

FIG. 1 illustrates one embodiment of the present invention. Error detection processor 102 reduces computer program 104 into fault indicators 106, and models 118. Fault indicators 106 pinpoint and describe specific errors within computer program 104. In one embodiment of the present invention, fault indicators 106 take the form of error messages. Error messages are described below in more detail. Model 118 defines the mapping of input memory to output memory that a corresponding function within computer program 104 performs. Model 118 is an external behavior model because it is a summary representation of the externally visible behavior of a corresponding function. Modelling a computer function is described below in greater detail.

Error detection processor's 102 treatment of computer program 104 is influenced by a variety of input factors; the input factors include: config file 110, command line information 108, header files 112 and models 118. The input factors are described below in greater detail.

Figure 2:
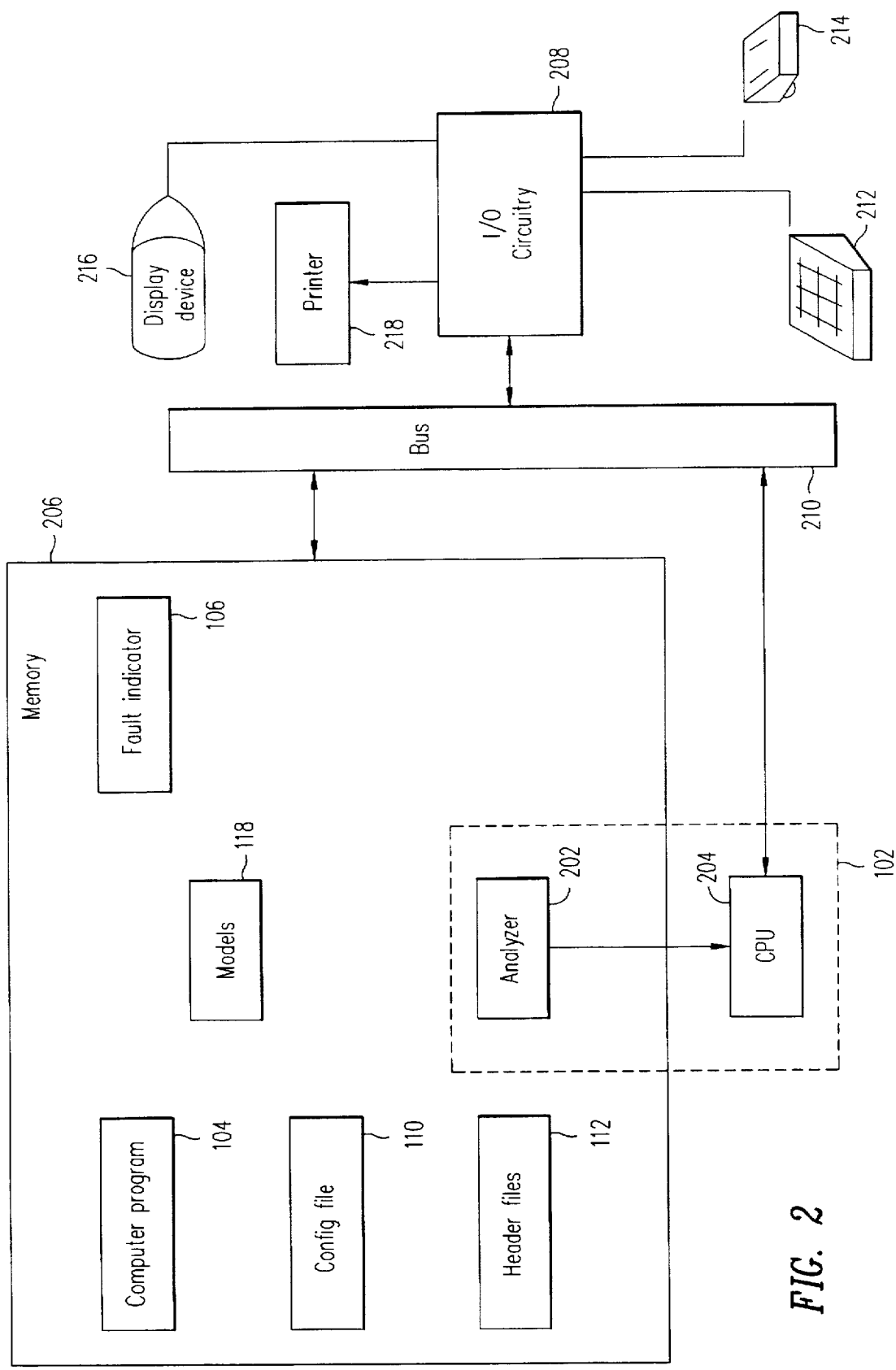
FIG. 2 is a block diagram of one operating environment for the present invention as depicted in FIG. 1.

FIG. 2 illustrates one typical operating environment for error detection processor 102. In the embodiment of FIG. 2, error detection processor 102 comprises analyzer 202 executed upon central processing unit (CPU) 204. CPU 204 executes stored program instructions. Analyzer 202 along with computer program 104, config file 110 and header files 112 are contained in memory 206. Memory 206 can be further subdivided into main memory (not shown) and secondary storage (not shown). Main memory holds program instructions or data and is directly addressable by CPU 204. Secondary storage contains data not directly under control of or addressable by CPU 204. One skilled in the art will realize that the information contained in memory 206 can be stored in main memory or it can be kept in secondary storage and transferred into main memory when required for execution on CPU 204.

Input/Output (I/O) circuitry 208 is responsible for the transfer of data to and from CPU 204. CPU 204, memory 206 and I/O circuitry 208 are interconnected through an internal data channel called a bus 210. Keyboard 212 and mouse 214 are two common input devices designed to assist in the entry of data and instructions to CPU 204. For example, typically command line information 108 is entered through keyboard 212 for presentation to error detection processor 102. Display device 216 and printer 218 are two common output devices designed to assist in the output of data from CPU 204. In the embodiment of FIG. 2, the output signal, fault indicator 106, is stored in memory. One skilled in the art will recognize that this output signal can also be directed to other output devices, such as display device 216 and printer 218.

Figure 3:
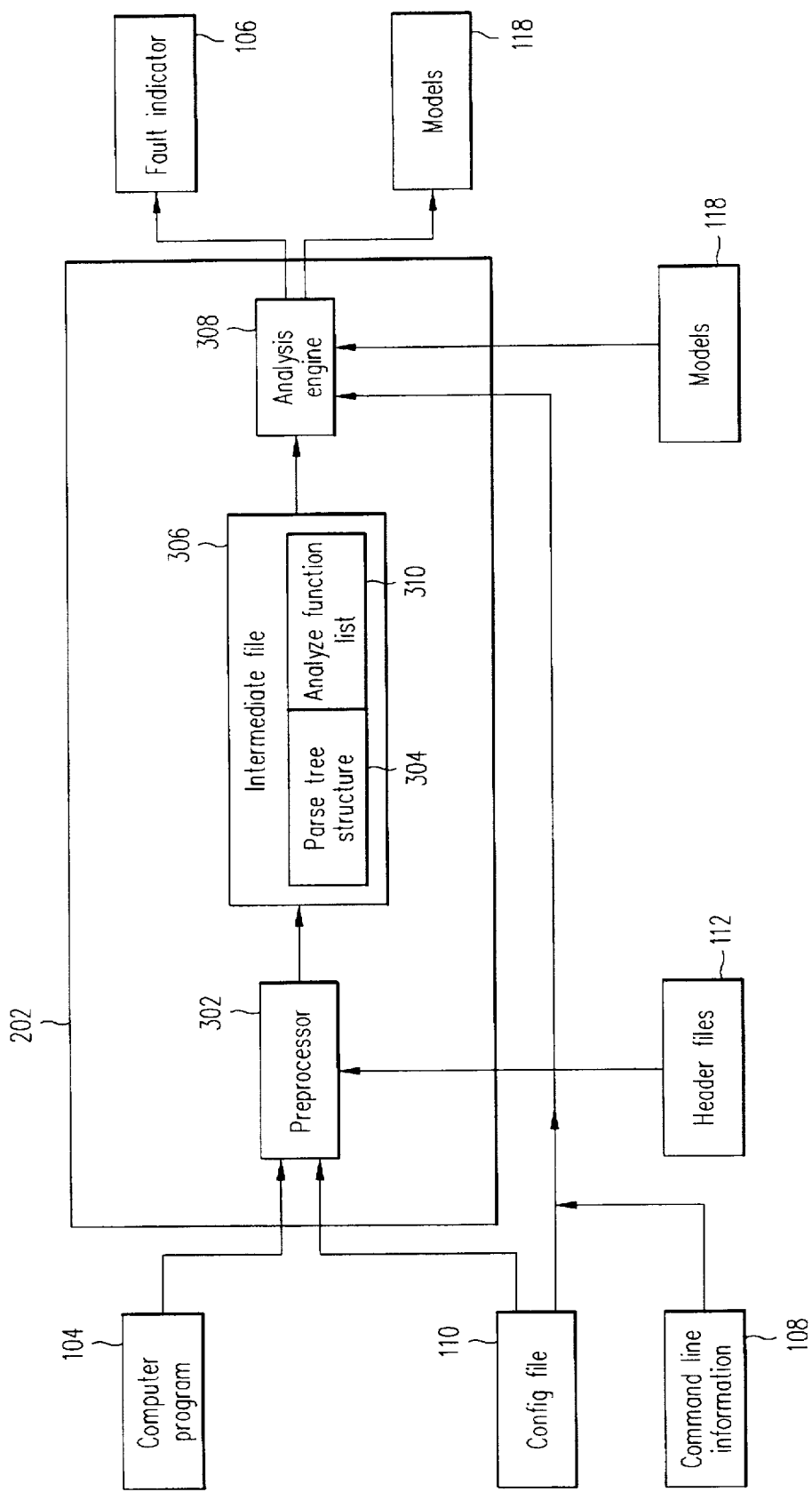
FIG. 3 is a more detailed block diagram of the internals of the analyzer of FIG. 2.

FIG. 3 illustrates a functional description of analyzer 202. Preprocessor 302 translates computer program 104 into a corresponding parse tree structure 304. Preprocessor 302 stores parse tree structure 304 in intermediate file 306. Also in intermediate file 306, preprocessor 302 stores analyze function list 310, a list of all the functions defined in computer program 104. The functions defined in computer program 104 are the functions analyzed by analysis engine 308. Analysis engine 308 traverses parse tree structure 304 to detect errors and generate fault indicators 106. Additionally, analysis engine 308 generates a model 118 for each function of computer program 104. Models 118 and other output of analysis engine 308 are described below in greater detail.

Figure 4:
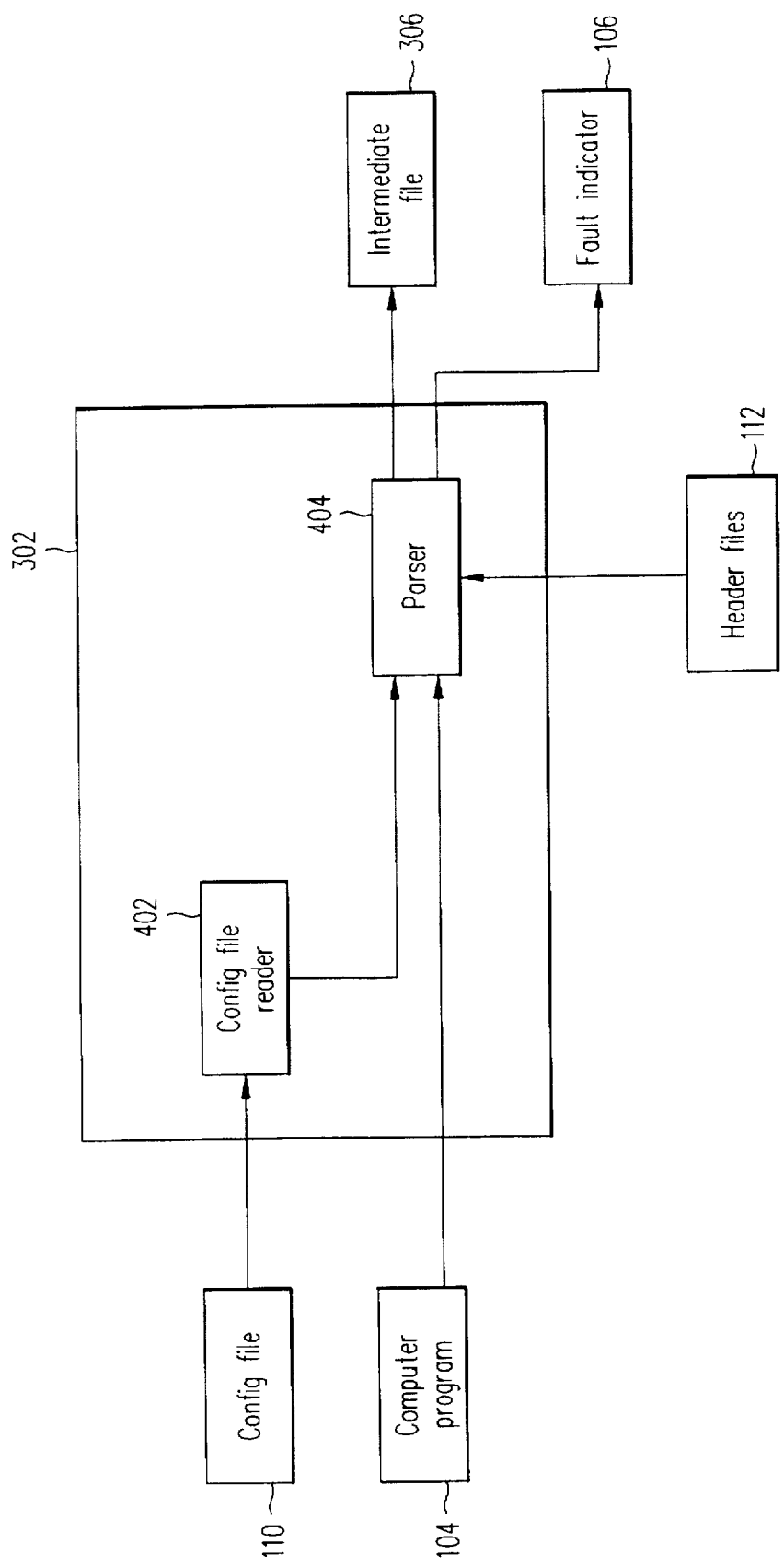
FIG. 4 is a more detailed block diagram of the preprocessor of FIG. 3.

A functional description of preprocessor 302 is illustrated in FIG. 4. Preprocessor 302 receives operating instructions from config file 110. Config file 110 allows a user to customize analyzer 202. The settings contained in config file 110 determine characteristics of the environment in which computer program 104 is analyzed. For example, in one embodiment of the present invention, configuration option "maximum_paths" sets a limit on the amount of analysis performed for each function. An integer option value specifies a limit on the number of paths analyzed by analyzer 202. A full list of configuration options for one embodiment of the present invention is shown in Appendix B.

The configuration options contained in config file 110 are processed by config file reader 402. Config file reader 402 reads in the configuration options from config file 110 and sets the operating attributes of parser 404 as indicated by the configuration options. Parser 404 creates an internal, intermediate representation of computer program 104. Parser 404 uses header files 112 to translate computer program 104. In one embodiment, header files 112 include standard library functions that are available to a C program through the "#include" C preprocessor directive. Header files are well known in the prior art. For a more detailed discussion on header files, see Mark Williams Company, Ansi C: A Lexical Guide, (Prentice Hall 1988).

In preparation for analysis, parser 404 parses computer program 104. Parsing a computer program determines the syntactic structure of the program by decomposing it into more elementary subunits and establishing the relationships among the subunits. Parser 404 checks that the statements appearing in computer program 104 occur in patterns that are permitted by the source language (C) specification. Parser 404 generates fault indicator 106 for statements that violate the language specification. In one embodiment of the present invention, fault indicator 106 is in the form of an error message. Errors that violate the language specification are called "syntax errors".

Additionally, and more importantly for purposes of further error detection, parser 404 imposes parse tree structure 304 upon the elementary subunits of computer program 104. Parse tree structure 304 is a parse tree which exhibits the syntactic structure of computer program 104. A tree is a collection of elements grouped in a hierarchical structure with many branches. The top element in the tree is called the root node. Terminal nodes, nodes without any branches, are called leaf nodes. The remaining nodes in a tree are interior nodes.

Figure 5:
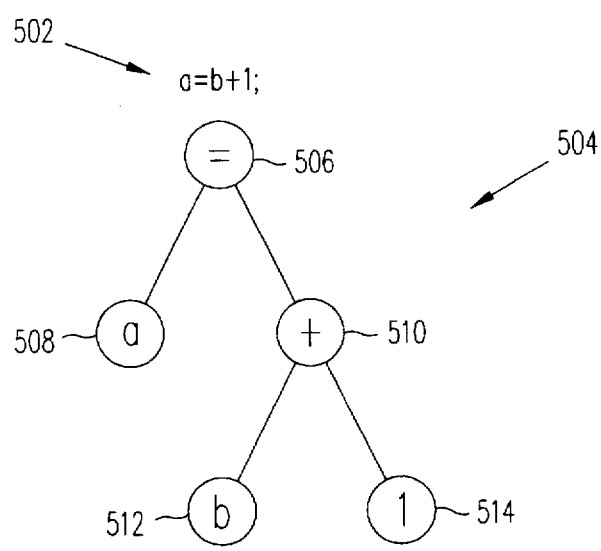
FIG. 5 is an illustration of a sample C programming language statement and a corresponding parse tree.

The concept of a parse tree is best understood by way of example. FIG. 5 shows a simple C statement and the corresponding parse tree. Statement 502, "a=b+1;", is decomposed into two expressions. The primary expression is an equality expression that sets "a" equal to the value generated by a secondary expression. The primary expression's two operands are "a" and the secondary expression. The secondary expression is an addition operation that adds 1 to "b". The secondary expression's two operands are "b" and "1". Statement 502 is represented by parse tree 504. The root of parse tree 504, root node 506, contains the equality operator which represents the equality expression. The two branches off of root node 506 lead to the two operands of the equality expression. Leaf node 508 contains operand "a" and interior node 510 contains the addition operator which represents the addition operation. The two branches off of interior node 510 lead to the operands of the addition operation. Leaf node 512 contains "b" and leaf node 514 contains "1".

Using a parser to parse computer programs, generate error messages for syntax errors and build a parse tree are all well known in the prior art. For a detailed discussion on parsing computer programs, see Alfred V. Aho, Ravi Sethi and Jeffrey D. Ullman, Compilers: Principles, Techniques, and Tools, (Addison-Wesley Publishing Company 1986).

In addition to parse tree structure 304, preprocessor 302 also produces a list of all functions defined in computer program 104. This list, analyze function list 310, is stored with parse tree structure 304 in intermediate file 306. Analysis engine 308 accesses analyze function list 310 to determine which functions to analyze.

Figure 6:
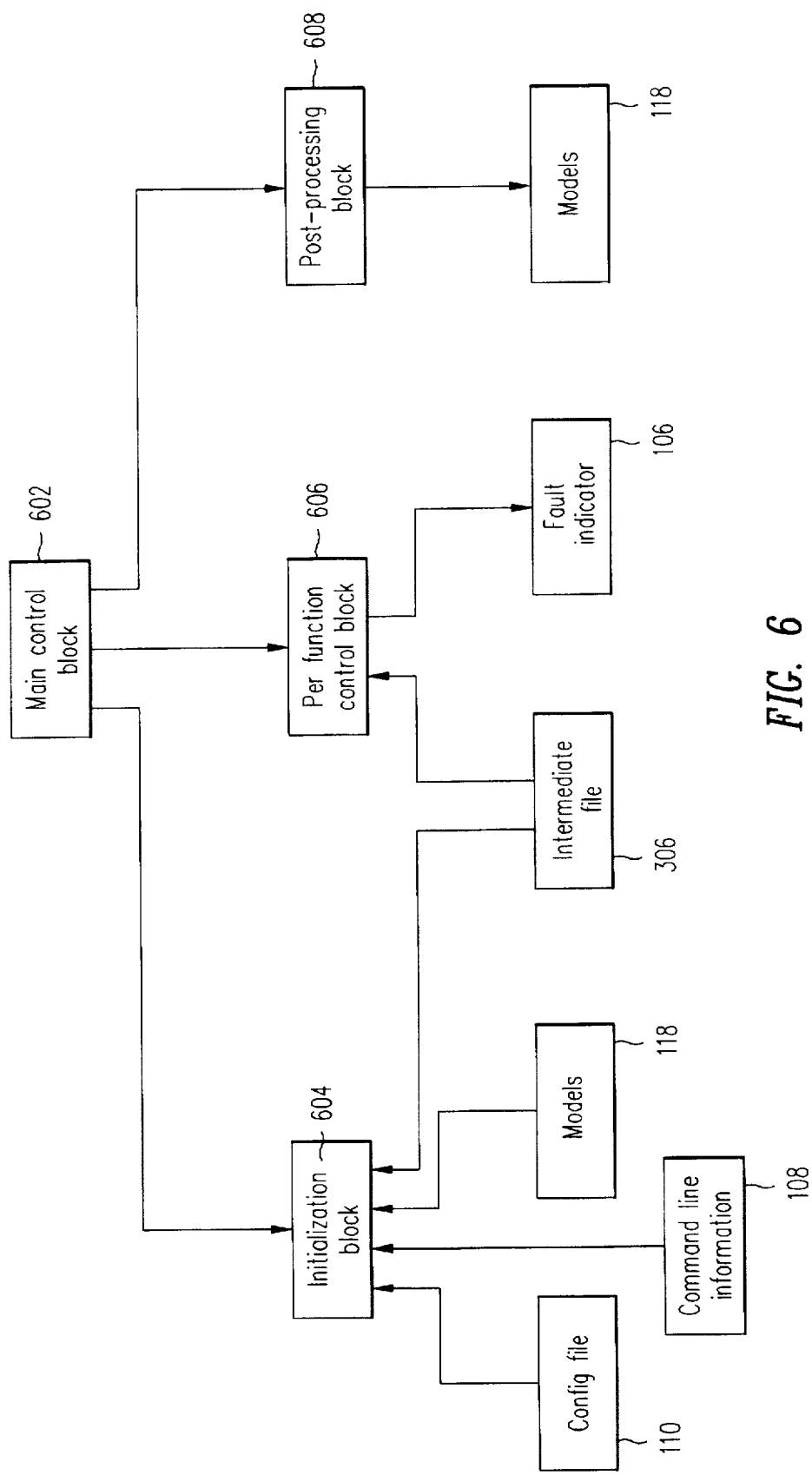
FIG. 6 is a more detailed block diagram of the analysis engine of FIG. 3.

FIG. 6 illustrates a functional description of analysis engine 308. Main control block 602 is the main entry point of analysis engine 308. Main control block 602 is invoked from the command line directly by the user or indirectly by integration scripts or build tools. A user can invoke analyzer 202 directly with a command entered through keyboard 212 or mouse 214. The key information input on the command line, part of command line information 108, is a list of intermediate files 306 (containing parse tree structures 304) that corresponds to computer programs to be analyzed. In addition, command line information 108 may also contain a specification of configuration file 110. Main control block 602 controls the order of processing within analysis engine 308.

Initialization block 604 performs the first processing within analysis engine 308. Initialization block 604 processes command line information 108 (including the list of intermediate files 306 and the optional specification of a configuration file 110) and models 118. When processing is complete, control returns to main control block 602.

Next, processing is performed by per function control block 606. One parse tree structure 304, corresponding to one computer program, is analyzed at a time. Each parse tree structure 304 may have multiple functions represented within it. Per function control block 606 analyzes a single function at a time. Per function control block 606 traverses parse tree structure 304 and produces fault indicators 106. Processing is repeated for each parse tree structure 304 to be analyzed. When all parse tree structures 304 have been analyzed, control returns to main control block 602.

Final processing is completed by post-processing block 608. Post-processing block 608 writes out models 118 corresponding to functions analyzed by per function control block 606. Models 118 can be written to any output medium. Typically, models 118 are written to secondary storage where they are available for the analysis of additional computer programs. Post-processing block 608 returns control to main control block 602 and analysis is concluded.

Figure 7:
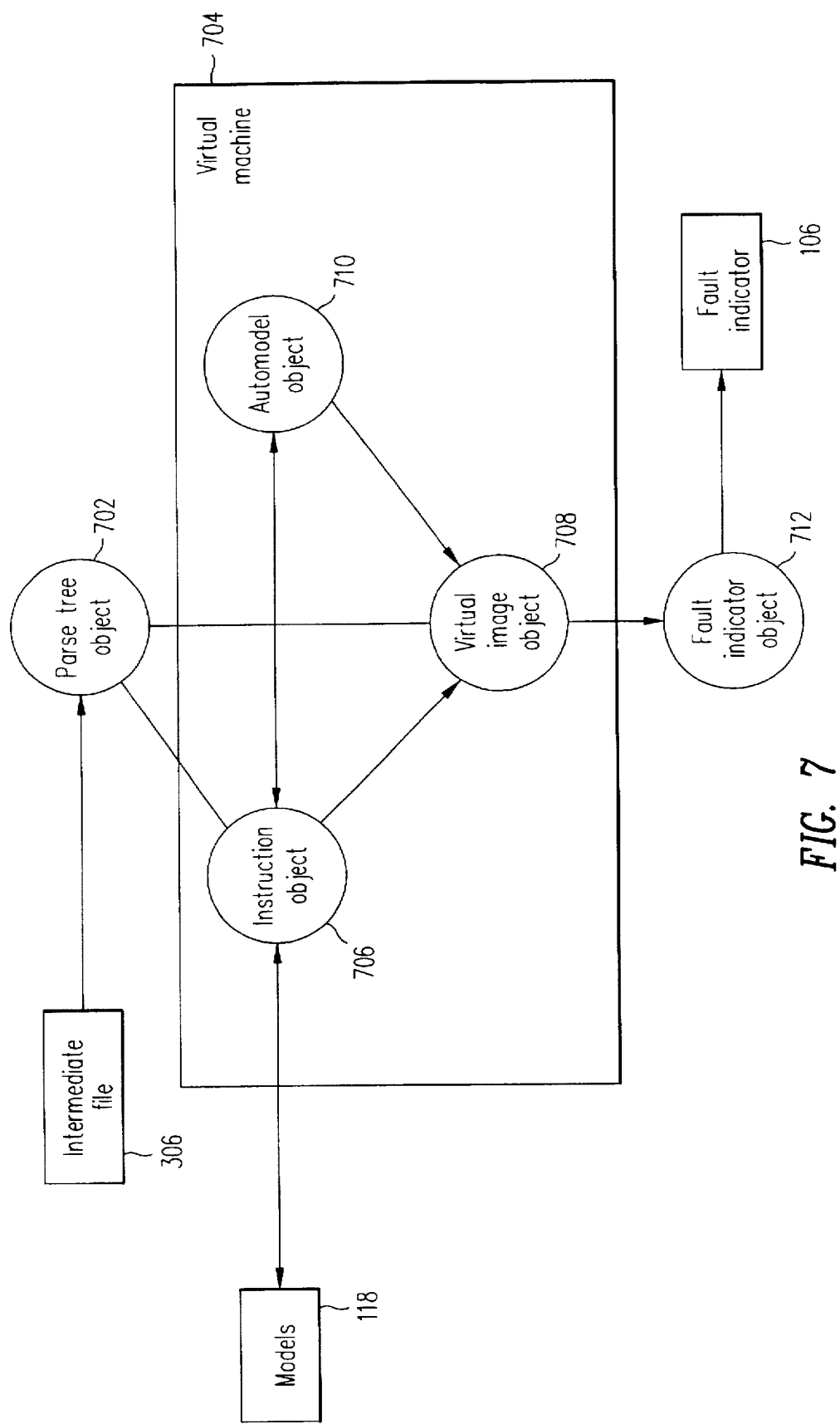
FIG. 7 is a block diagram of a functional view of the per function control block of FIG. 6.

The majority of processing performed by analysis engine 308 occurs within per function control block 606. A functional description of per function control block 606 is presented in FIG. 7. Per function control block 606 is built upon five main objects. An object is a conceptual grouping of functions and associated data. By designing per function control block 606 with an object based methodology, analysis engine 308 has greater extensibility and is easier to maintain. Extensibility is increased because functionality can be added within a particular object without affecting other objects. Objects interact by using carefully defined interfaces. Maintenance within one object will not affect other objects as long as the interfaces are observed. Thus, it is easy to maintain analysis engine 308 and perform localized corrections, as opposed to having to make wholesale corrections throughout analysis engine 308.

Parse tree object 702 traverses multiple code paths in computer program 104 as represented by parse tree structure 304. As it traverses a code path, parse tree object 702 processes an instruction along the code path by retrieving its operator along with the corresponding operands. The operator and operands retrieved are passed to instruction object 706 for simulation. Parse tree object 702 also passes function calls to instruction object 706 for emulation. Both simulation of instruction execution and emulation of function calls will be described in greater detail below.

Virtual machine 704 simulates the execution and internal representation of computer program 104 on a computer. Virtual machine 704 consists of instruction object 706, virtual image object 708 and automodel object 710. Instruction object 706 interprets operators passed by parse tree object 702. Furthermore, instruction object 706 executes models 118 corresponding to the operator or function being processed. The effect of executing a model 118 is to appropriately modify the memory model. The memory model is described below in greater detail.

Virtual image object 708 maintains the virtual image (not shown). The virtual image is a structural model of computer memory ("memory model"). Virtual image object 708 keeps track of locations in the memory model, what values have been stored at each location during the course of "execution" of computer program 104, and what tests have been performed on particular memory model locations. Virtual image object 708 also maintains a set of primitives, referred to as vim primitives, that operate on the values in memory. The model of computer memory and vim primitives will be described below in greater detail.

Automodel object 710 is responsible for constructing a model 118 of the function currently under analysis. After execution of each code path within a function, auto model object 710 queries virtual image object 708 to obtain information relevant to the input to output mapping performed by the function. The model 118 that is created by auto model object 710 is an abstraction of the information obtained from virtual image object 708 over multiple code paths. Models 118 and the information required to build them will be discussed below in greater detail.

The majority of programming errors detected are found in virtual image object 708; however, the actual fault indicators 106 are generated in fault indicator object 712. Fault indicator object 712 receives information identifying the programming error. In one embodiment of the present invention, the information is assembled and a fault indicator 106 is presented to the user in the form of an error message. More description of error message processing is given below.

Analyzer Construction

In one embodiment of the present invention, the source code which represents the different components of analyzer 202 is implemented in groupings called packages. A package is a logically related subset of a larger computer program which provides an associated set of services to the computer program. For one embodiment of the present invention, Table 1 lists all is of the packages that form analyzer 202.

TABLE 1

| Package | Description | Packages Used |
| --- | --- | --- |
| ana | analyzer | none |
| auto | automodelling | bot,conf,ctx,vim, ins,sym |
| bot | utilities | none |
| conf | configuration | bot,err |
| cph | choice point history | bot,conf |
| ctx | execution context | bot |
| edg | parser | none |
| eng | main control block | bot,conf,mcil, exe,err |
| err | error reporting | bot,conf,edg,ctx |
| exe | execution | bot,conf,auto, ins,sym,vim,ctx |
| ins | instructions | bot,conf,ctx,vim, auto,cph,err |
| mcil | multiple intermediate files | bot,conf,edg |
| sym | symbol table | bot,edg,vim |
| vim | virtual image | bot,conf,ctx,err |

The "Packages Used" column in Table 1 refers to other packages accessed by the package listed in the "Package" column. A package is dependent on all other packages that it accesses. Therefore, the "Packages Used" column gives a list of package dependencies. Dependencies are noted because a package may be adversely affected by a malfunction in a package that it depends upon.

Bot: Utilities Package

Bot, the utilities package, provides general purpose functions for manipulating strings, files, filenames, memory, and collections. These utilities insulate other packages from portability problems. In the embodiment of FIG. 2, analyzer 202 is executed on CPU 204. If a different CPU is used, resources offered by the operating environment might change. The bot package shields all other packages from these changes. Furthermore, the utilities in the bot package provide a uniform calling convention for packages that need to use system resources. Having uniform calling conventions for often used functions increases the maintainability of analyzer 202. The bot package does not depend on any other package.

Table 2 provides a reference to the utilities provided by the bot package contained in one embodiment of the present invention.

TABLE 2

| Utility | Description |
|---------|-------------|
| bot_col | collections; fixed and variable sized arrays and lists |
| bot_date | date handling |
| bot_debug | debugging printing and topics |
| bot_fio | file input and output |
| bot_fname | file names |
| bot_mem | memory allocation, reallocation, freeing |
| bot_str | string handling |
| bot_sys | miscellaneous system calls |

Collections

The bot_col utility supports collections. A collection is conceptually an ordered set or bag (i.e., allowing duplicates) of members. Members can be used as keys, in which case some additional data can be associated with each member.

Collections have a type, contents description, and size. The type is simply an uninterpreted integer used for comparing the expected type against the actual type of a collection. Thus, collections are explicitly typed, meaning that each collection expects a specific class of data. The contents description specifies what the collection is comprised of: bits, integers, copied strings, etc. The size of a collection is the number of members in the collection.

In one embodiment of the present invention collections of the following items are supported:

booleans pointed-to strings (where the collection simply stores a pointer to a string)

copied strings (where the collection allocates memory for the string and copies it over)

integers pointers (where the collection has no information about what is being pointed to)

bytes (where the collection has no information about the structure of those bytes).

In analyzer 202, common uses for collections are:

fixed-size arrays of bits (suppression codes, choice point history)

variable size lists of strings where look-up by name is important (configuration options)

the symbol table: variable-sized with an uninterpreted pointer as an index fixed-size of stored values for chunks and for fetched values fixed-size subsets of arrays of stored values per-path external tables (in auto package)

collections of predicates collections of outcomes (in a model)

collections of externals (in an outcome)

the model table: variable-sized with a model identifier as an index collections of function pointers (produced by mcil)

A collection is created by invoking the bot_col_create utility and supplying an initial size and a maximum size. The initial size may be zero elements and the maximum size may be unbounded. One embodiment of the present invention defines a constant called BOT_COL_NO_MAX_SIZE which is passed to the bot_col_create utility to indicate the collection size is unbounded. Fixed-size collections are created by setting the initial size value equal to the maximum size value. Fixed-size collections allow for some optimized implementations. For example, fixed-size boolean collections are implemented as bits. Collections can also be created by invoking the bot_col_copy utility to copy an existing collection or bot_col_subset utility to take a subset of an existing collection.

Each member of a collection can have some associated raw data. Having associated raw data with a member is useful for implementing symbol tables as collections. A symbol table is a mapping of names to values. A symbol table implemented as a collection would represent a name as a member and its value as the associated raw data.

In one embodiment of the present invention, collections are often used to implement arrays. Members are added to the array by using the bot_col_add_member utility which returns the index of the new member. Members at a particular index are retrieved from an array by invoking the bot_col_get_member utility. Both the value of a member and its associated raw data can be retrieved by invoking the bot_col_get_member_and_raw utility. The value of the member of an array is replaced by using the bot_col_replace_member utility.

It is often necessary to iterate through the members of an array. Moving through the members of an array is typically done using a for loop and is well understood in the art. The bot_col_get_num_members utility returns the size of the array and can be used to establish the upperbound of the for loop. As mentioned above, inside the body of the for loop, bot_col_get_member can be used to retrieve each member of the array.

In one embodiment of the present invention, look-up tables are typically implemented as collections. The bot_col_lookup_member utility can be used to return the index of a member with a particular value. A look-up table identifies a correspondence between an input value and output value. Look-up tables are well understood in the prior art.

Detailed Description of Analysis Engine 308

Figure 8:
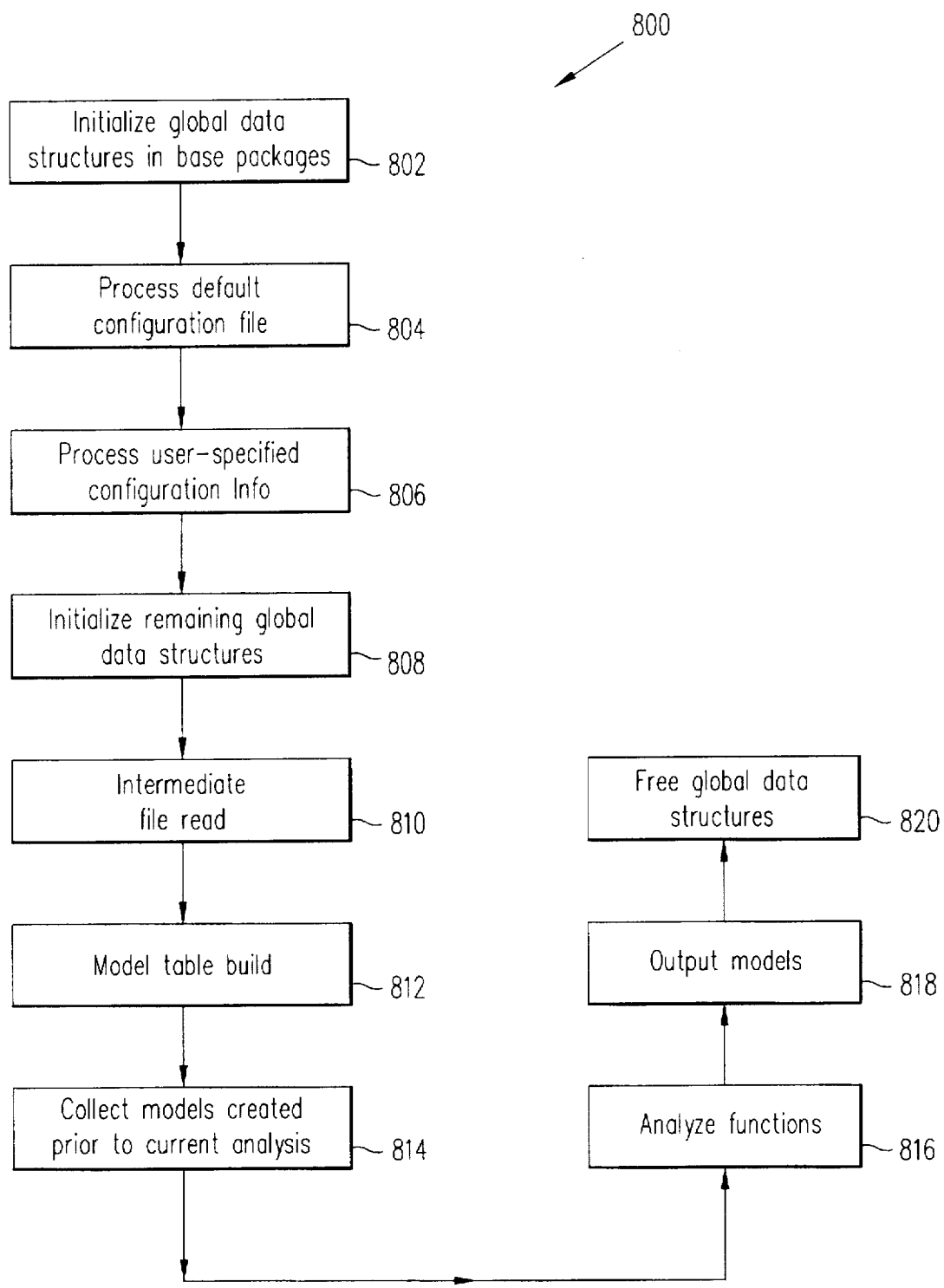
FIG. 8 is a block diagram representing the processing performed by the analysis engine of FIG. 3.

As mentioned earlier, analysis engine 308 is invoked by the user from the command line (or indirectly by automated tools) to generate fault indicators 106 and models 118. According to one embodiment of the present invention, processing in analysis engine 308 is illustrated by block diagram 800 (FIG. 8). Processing begins with initialize global data structures in base packages action 802 (hereinafter "action 802") where global data structures required by four base packages are initialized. The four base packages are the bot, err, ctx and conf packages. Action 802 performs the setup required by analysis engine 308 to process computer program 104.

All packages use utilities provided by the bot package. Therefore, global data structures required by the bot package are initialized first. After initialization, the utilities in the bot package are available to the other packages. Next, the global data structures in the err package are initialized so that the err package is available to handle any errors encountered in processing configuration options. After err package processing, an execution context block 2100, a global data structure defined by the ctx package, is allocated and cleared. The err package refers to execution context block 2100 for context information inserted into error messages. Execution context block 2100 is described below in greater detail. Once execution context block 2100 is initialized, the global data structures of the conf package are initialized. In the embodiment of FIG. 8, initializing the global data structures of the bot, err, ctx and conf packages is performed by routines. In the embodiment of Microfiche Appendix A, the routines to initialize the global data structures of the bot, err, ctx and conf packages are labeled respectively bot__begin, err__begin, ctx__begin and conf__begin. Processing transfers from action 802 to process default configuration file action 804 (hereinafter "action 804").

Configuration options influence much of the processing performed by analysis engine 308. Accordingly, as the necessary setup has been accomplished in action 802, configuration options are processed in action 804. Configuration options are stored within configuration files 110. A default configuration file 110 contains the default option settings. The default configuration file 110 provides a standard configuration for analysis engine 308.

The default configuration file 110 is processed within action 804. First the default configuration file is located. In one embodiment of the present invention, the default configuration file is stored in the home directory of analyzer 202. After default configuration file 110 is located, the default option settings are loaded into analysis engine 308. The option settings are read in one at a time until all the options contained in the default configuration file are loaded. In the embodiment of FIG. 8, default configuration file 110 is processed by a routine. In the embodiment of Microfiche Appendix A, action 804 is performed by the conf__load__defaults routine which uses the conf__read__file routine to read in all of the options. The conf__read__file routine iterates line by line through a configuration file 110 and uses the conf__parse__option routine to parse each line of the configuration file and retrieve an option. The function performed by action 804 is well known to one of ordinary skill in the art.

Configuration options control the level of analysis performed by analysis engine 308 and the type and quantity of output produced by analysis engine 308. For example, configuration options can determine the number of paths executed in the code being tested, what errors are reported, the style in which they are reported and where certain errors are reported. For the embodiment of FIG. 8, a list of configuration options and a description of each is contained in Appendix B.

Processing transfers from action 804 to process user-specified configuration info action 806 (hereinafter "action 806") where a user-specified configuration file 110 is processed. A user has the option of customizing the processing performed within analysis engine 308 by specifying a configuration file 110 on the command line within command line information 108. The configuration options set in a user-specified configuration file 110 override the corresponding options found in the default configuration file 110.

In one embodiment of the present invention, the optional user-specified configuration file 110 is identified using a "-config" control word on the command line. The "-config" control word is followed by blank space and then the name of a user specified configuration file 110. For example, "-config custom" identifies a user-specified configuration file 110 called "custom".

Action 806 first determines if the user specified an optional configuration file 110. If not, no more processing is required by action 806. If a user-specified configuration file 110 is identified, processing continues in a manner similar to action 804. Within action 806, the user-specified option settings are loaded into analysis engine 308. These user specified option settings override the corresponding default settings that were set in action 804. The option settings are read in one at a time until all the options contained in the user-specified configuration file 110 are loaded. In the embodiment of FIG. 8, user-specified configuration files 110 are processed by a routine. In the embodiment of Microfiche Appendix A, action 806 is performed by the conf__load routine which uses, as does the conf__load__defaults routine, the conf__read__file routine to read in all of the options.

Action 806 also processes any command line configuration options specified by the user. Multiple configuration options can be specified on the command line within command line information 108. In one embodiment of the present invention, control line configuration options (and their values) are preceded by a "-prefix__opt" control word. The "-prefix__opt" control word is followed by an assignment of a value to a configuration option set off by quotation marks. In other words, a command line configuration option specification has the following form:

-prefix__opt "option name=option value".

For example, the "maximum__paths" configuration option can be set on the command line by specifying:

-prefix__opt "maximum__paths=300".

Appendix B contains various configuration options and permitted option values for one embodiment of the present invention.

Action 806 processes the command line configuration options in a left to right fashion respective to their position on the command line. Any given command line configuration option specification has precedence over all previously specified configuration options whether the configuration options were specified on the command line or contained within a configuration file 110.

Processing transfers from action 806 to initialize remaining global data structures action 808 (hereinafter "action 808") where the remaining packages are initialized in preparation of analyzing computer program 104. After the configuration options are loaded, the manner in which processing will be conducted is known. At this time, global data structures required for processing are initialized. In one embodiment of the present invention, the auto, cph, exe, ins, mcil, sym and vim packages all have global data structures which must be initialized. In the embodiment of FIG. 8, global data structures in a package are initialized using routines. In the embodiment of Microfiche Appendix A, initializing global data structures in packages is accomplished by routines labeled "pkg__begin", where "pkg" stands for the name of the package. For example, the global data structures in the auto package are initialized by the routine labeled "auto__begin".

Processing transfers from action 808 to action intermediate file read 810 (hereinafter "action 810") where intermediate files 306 that are listed on the command line, within command line information 108, are read and preparatory processing is performed. First, the list of intermediate files 306 contained on the command line is retrieved. Then the contents of each intermediate file 306 are read into memory. A user may specify multiple intermediate files 306, separated by blank space, on the command line.

Preprocessor 302 inserts analyze function list 310 into every intermediate file 306 built. Analyze function list 310 contains all the functions in the corresponding intermediate file 306 that are to be analyzed (i.e., the list of all functions defined by the program represented by parse tree structure 304). A composite list of all analyze function lists 310 from all intermediate files 306 specified on the command line is created to form an analyze function master list identifying all functions to analyze.

Once the name of all functions that require analysis are known, processing continues to determine the name of all called functions. A "called function" denotes a function which is transferred (usually temporarily) control of execution. A list of all called functions is generated by looping through the analyze function master list. For each function needing analysis, the corresponding parse tree structure 304 is traversed and any functions called are noted. Action 810 determines both the names of all the called functions and also the order of function calls.

Analysis engine 308 emulates the execution of a called function. Analysis engine 308 can perform a more robust emulation of a called function if it can execute a corresponding model 118. Otherwise, analysis engine 308 performs a minimal emulation consisting of indicating the called function executed normally.

Once names of all the called functions are collected, it is possible to collect all the models existing for those functions. Additionally, the order of function calls generated within action 810 permits analysis engine 308 to tailor the ordering of function analysis to conduct a more thorough examination of the overall program. As much as possible, analysis engine 308 will analyze and model a function before that function needs to be emulated in another part of the analysis. The proper order of function analysis is determined by doing a topological sort of the function call ordering information at the end of action 810. The topological sort produces an ordered function call list. Functions are processed in the order presented in the ordered function call list. Topological sorting is well understood in the prior art.

Figure 10:
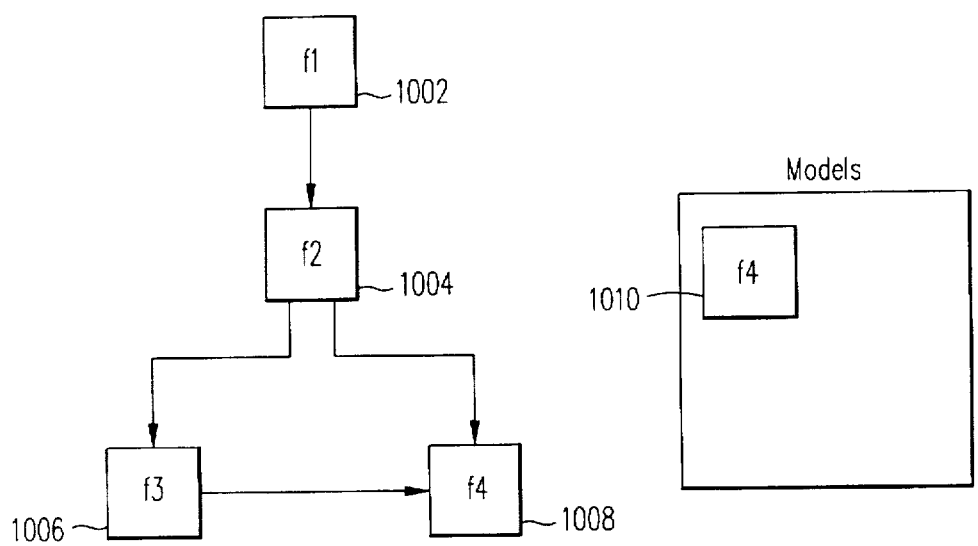
FIG. 10 is an illustration of a sample function call ordering and external behavior function model inventory that exists at the beginning of processing by the analysis engine of FIG. 3.

Example 1, illustrated in FIG. 10, presents a sample function call ordering. Referring to FIG. 10, function F1 1002 calls function F2 1004. Function F2 1004 calls functions F3 1006 and F4 1008. In this example, functions f1 1002, f2 1004 and f3 1006 are on the analyze function master list (i.e. require analysis). The list of called functions includes f2 1004, f3 1006 and f4 1008. Of these functions, only a model of function f4 1008, f4 model 1010, exists at the start of analysis. So, f4 model 1010 is executed to emulate calls to function f4 1008. Beyond which models exist at the start of analysis, it is the function call ordering that determines which function is analyzed first. Analyzing f1 1002 first, before a model of f2 1004 is built, results in minimal emulation of f2 1004. Function f1 1002 could be analyzed in more detail if f2 1004 was analyzed and modeled first. Similar reasoning leads to the conclusion to analyze and model f3 1006 before analyzing f2 1004. Once f3 1006 is analyzed and modeled, a more thorough analysis of f2 1004 is possible which ultimately leads to better analysis of f1 1002.

Figure 9:
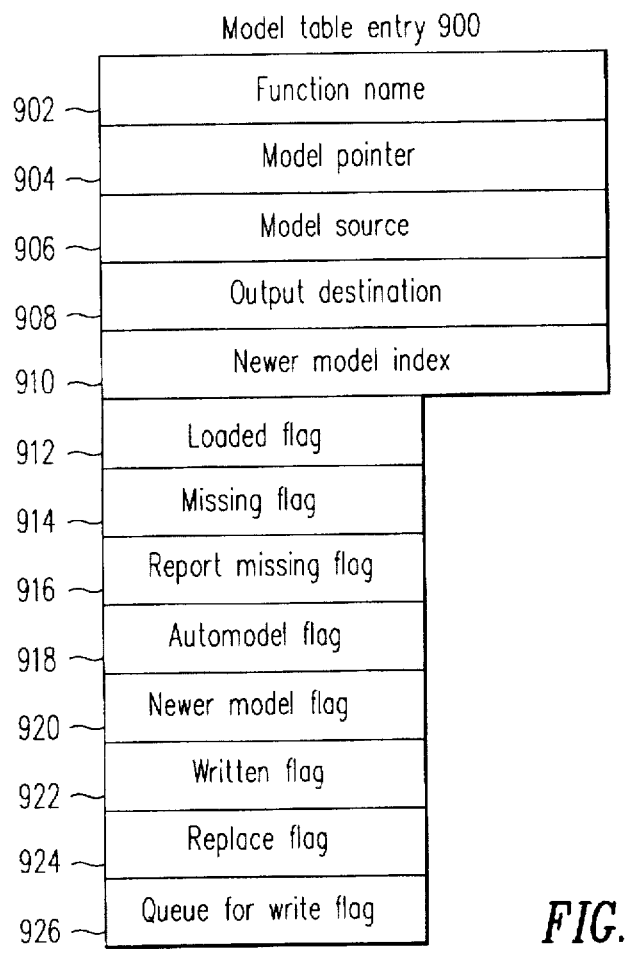
FIG. 9 is an illustration of a model table entry employed in one embodiment of the present invention.

Processing transfers from action 810 to action model table build 812 (hereinafter "action 812") where the model table is built. The model table is a collection of pointers to model table entries 900. Each model table entry 900 corresponds to a called function on the called function list. Model table entry 900 is illustrated in FIG. 9. Model table entry 900 includes fields: "function name" 902, "model pointer" 904, "model source" 906, "output destination" 908, "newer model index" 910, "loaded flag" 912, "missing flag" 914, "report missing flag" 916, "automodel flag" 918, "newer model flag" 920, "written flag" 922, "replace flag" 924 and "queue for write flag" 926.

Field "function name" 902 specifies the identifier of the function associated with model table entry 900. Field "model pointer" 904 points to a model 118 represented by model table entry 900. Field "model source" 906 specifies where the model pointed to by "model pointer" 904 was read from. Field "output destination" 908 points to the file where to write the model pointed to by "model pointer" 904. Field "newer model index" 910 specifies an index of an entry in the model table which points to a more recent version of a model for the same function that the instant model table entry 900 is associated with.

"Loaded flag" 912 indicates if a model has been loaded for this table entry. "Missing flag" 914 indicates if the special "missing model" has been assigned to this table entry. "Report missing flag" 916 indicates if a "missing model" message has been issued regarding this table entry. "Automodel flag" 918 is true if the model pointed to by "model pointer" 904 was created by the automodeller during the current analysis. "Automodel flag" 918 is false even if the model was originally made by the automodeller outside the context of the current analysis. "Newer model flag" 920 indicates if the automodeller has added a model table entry 900 representing an automodeller generated model 118 for the same function that the instant model table entry 900 is associated with. "Written flag" 922 indicates if the model was written out to a file. "Replace flag" 924 indicates if the automodeller replaced the model 118 pointed to by "model pointer" 904. Finally, "queue for write flag" 926 is true if the model should be written out at the end of analysis; otherwise it is false.

First, within action 812, a collection is created to embody the model table. A collection of pointers is created because the model table is a set of pointers to model table entries 900. At the time the collection for the model table is created, there are no entries in the table. Next, the initial entries in the model table are created; meaning, members are added to the model table collection that point to model table entries 900. In one embodiment of the present invention, the model table collection is built by a routine. In the embodiment of Microfiche Appendix A, routine ins__mt__read controls the building of the model table and calls the bot__col__create__ collection utility routine to create the model table collection.

Action 812 next creates the initial model table entries pointed to by the model table. Action 812 loops through each function on the list of called functions constructed within action 810. For each function on that list, a model table entry 900 is allocated and initialized. Field "function name" 902 is set to the name of the current called function. Then the model table entry 900 is set to indicate the missing model by setting field "missing flag" 914 to true. A pointer to the newly created model table entry is inserted into the model table by adding a member to the model table collection. Also, flag "replace flag" 924 is turned on to signify that the missing model should be replaced by a model 118 generated by the automodeller. In this manner processing iterates through the called function list. Thus, after action 812 completes, there is one model table entry 900 pointed to by the model table for every function on the called function list. In one embodiment of the present invention, the model table is initialized through a routine. In the embodiment of Microfiche Appendix A, routine mcil__get__next__model__to__read iterates through the list of called function names, routine ins__mt__insert creates a model table entry 900 and initializes it to indicate the missing model, and the bot__col__add__ member utility routine is used to add members to the model table collection. Processing transfers from action 812 to model collection action 814 (hereinafter "action 814").

Action 814 collects any previously built models 118 corresponding to each model table entry 900 referenced in the model table (i.e., for all the functions on the called functions list). The first step in the search for available models 118 is to construct a list of locations to search for model files. A model file is a file that contains models, and, by convention, a model file is recognized by a distinguishing file extension identifier. For example, "mod" and "mar" are two extensions that identify a model file. The "mod" extension denotes a model file that contains current models 118 and the "mar" extension denotes a model file that contains archived models 118. Multiple models 118 may be stored in a single model file. A model file may have index information at the beginning and end of the file that indicates which functions are modeled in the file.

Typically, model files are located in directories and the list of places to search for files is a set of directories. Each directory in the set is searched for model files. All files with appropriate file extensions are processed. For each file selected, the model file is allocated and opened. After opening the model file, the index is scanned to determine if any of the models 118 in the file correspond to a function needed for analysis. This is done by comparing function names in the model file index to names on the called function list. For each match, unless "loaded flag" 912 is set to true in the model table entry 900 representing the matched function, the corresponding model 118 is parsed and copied into memory. A pointer to the copied model 118 is put into the corresponding model table entry 900 at field "model pointer" 904. The "missing flag" is turned off for that model table entry 900. Also, for that same model table entry 900, "loaded flag" 912 is set to true and "replace flag" 924 is set to false. When set to true, "loaded flag" 912 means action 814 should ignore all subsequent models 118 that match the function represented by the model table entry 900. After all matches are processed, processing for the selected model file is complete and the model file is closed and deallocated. Models 118 are described below in greater detail. In one embodiment of the present invention action 814 is performed by a routine. In the embodiment of Microfiche Appendix A, routine ins_mt_read finds the previously built models 118 and routine ins_mt_parse parses a model within a model file.

Action 814 also generates a list of files, the output model files list, which designates the output destinations for models 118 built during analysis. The output model files list is dynamically built as models 118 are inserted into model table entries 900. When a model 118 is linked to a model table entry 900, the output model files list is checked to see if there is a corresponding output model file with the same file name as the source intermediate file 306 for the function represented by the model 118 and with a file extension of "mod". If the sought after output model file is not found then it is added to the output model files list. A model 118 built to represent a function is stored in the output model file corresponding to the intermediate file which originally defined the function. For example, if intermediate file "tes-t.il" contained function f1, then a model 118 built to represent function f1 is stored in output model file "test.mod". When action 814 initializes a model table entry 900, field "output destination" 908 is set to record the name of the output model file corresponding to the intermediate file 306 containing the function identified in field "function name" 902. Model files are described below in more detail. Processing transfers from action 814 to analyze functions action 816 (hereinafter "action 816").

Action 816 analyzes all of the functions on the analyze function master list. The order of processing is controlled by the ordered function call list. Functions are analyzed in order from the first function to the last function on the ordered function call list. For each function, the corresponding parse tree structure 304 is read into memory. Analysis of a function produces fault indicators 106 (if an error is detected) and a model 118 representing the function analyzed. When analysis of the function is complete, the parse tree structure 304 that was read into memory is discarded. In this fashion, by storing the parse tree structure 304 for only as long as needed, memory resources of CPU 204 are conserved. A detailed account of the per-function processing performed in action 816 is described below. Processing transfers from action 816 to output models action 818 (hereinafter "action 818").

Action 818 is responsible for storing the models 118 created by action 816. Each output model file in the output model files list is processed in turn. First, a model output file is created, allocated and opened. Next, action 818 iterates through the model table and queries each model table entry 900. If field "output destination" 908 equals the name of the current model output file and flag "queue for write flag" 926 is true, then the model 118 pointed to by field "model pointer" 904 is stored in the current model output file. "Written flag" 922 is set to true. When processing is complete for the last file in the output model files list, control transfers to free global data structures action 820 (hereinafter "action 820").

Processing concludes with action 820 where storage cleanup is conducted. In the embodiment of FIG. 8, global data structures in a package are freed or cleaned up using routines. In the embodiment of Microfiche Appendix A, global data structures in a package are freed or cleaned up by executing a routine labeled "pkg_end", where "pkg" stands for the name of the package. For example, global data structures in the err package are cleaned up by the routine labeled "err_end". "Pkg_end" routines are run for the following packages: bot, err, conf, auto, cph, ctx, exe, ins, mcil, sym and vim. At this point, processing of computer program 104 is completed.

Function Analysis

As described above, analysis of the functions listed on the analyze function master list occurs in action 816. The ordered function call list (created by the topological sort executed in action 810) controls the order in which the functions are analyzed. Action 816 loops through the ordered function call list and for each function on the list performs per-function processing as shown in block diagram 1100 (FIG. 11). The instant function under analysis is designated the current function. Per-function processing begins with initialize per-function data structures action 1102 (hereinafter "action 1102").

Action 1102 allocates or initializes any data structures that are used on a per-function basis. In the embodiment of FIG. 11, per-function data structures in a package are allocated or initialized by using routines. In the embodiment of Microfiche Appendix A, routines labeled "pkg_begin_function", where "pkg" stands for the name of the package, allocate or initialize per function data structures in a package. For example, per-function data structures in the exe package are allocated by the routine labeled "exe_begin_function". "Pkg_begin_function" routines are invoked in the following package order: ctx, mcil, err, vim, sym, ins, cph, auto and exe.

Action 1102 also posts information to execution context block 2100. Execution context block 2100 is shown in FIG.

21. Execution context block 2100 includes fields: "filename" 2102, "function name" 2104, "current function" 2106, "current iteration" 2108, "current statement" 2110, "current line number" 2112, "current expression" 2114, "emulation depth" 2116 and "emulation context list" 2118.

Field "filename" 2102 identifies the source file containing the current function. Field "function name" 2104 identifies the current function. Field "current function" 2106 is a pointer to a node in the parse tree structure 304 currently being processed that uniquely identifies the current function. Field "current iteration" 2108 refers to a count of the number of paths in the current function that have been analyzed. Field "current statement" 2110 is a pointer to a node in the parse tree structure 304 currently being processed that identifies the statement currently under analysis. Field "current line number" 2112 identifies the line in the source file of field "filename" 2102 containing the statement currently under analysis. Field "current expression" 2114 is a pointer to a node in the parse tree structure 304 currently being processed that identifies the expression currently under analysis. Field "emulation depth" 2116 is the depth in a nested function call of the function in field "function name" 2104. Field "emulation context list" 2118 is a collection of context information for each function called in a nested function call. A function call is "nested" when it is used as an argument to another function call or it uses another function call as one of its own arguments. Field "emulation depth" 2116 and "emulation context list" 2118 are only meaningful when the expression currently under analysis is a function call.

Action 1102 sets "filename" 2102, "function name" 2104 and "current function" 2106. In one embodiment of the present invention, a routine is used to initialize the first three fields of execution context block 2100. In the embodiment of Microfiche Appendix A, the routine labeled "ctx_begin_function" initializes the first three fields of execution context block 2100. Processing transfers to load parse tree structure action 1104 (hereinafter "action 1104") after per-function data structures are allocated or initialized and global data structures are updated with function level information.

Action 1104 reads into memory the parse tree structure 304 that represents the current function. Processing transfers from action 1104 to analyze paths action 1108 (hereinafter "action 1108").

Action 1108 analyzes the current function by tracing simulated execution of multiple code paths through the current function. Action 1108 keeps executing code paths until either the number of maximum paths has been reached (if the maximum_path option has been set) or there are no more code paths to execute. The maximum_path option allows users to set a limit on the amount of analysis performed for each function. When the maximum_path option is set, it sets an upper boundary on the number of paths analyzed (even if some code paths in the current function are not traversed). Action 1108 performs a loop that first finds a path to execute and then executes that path.

Action 1108 finds a path using a deterministic choice point history. The execution of a function is modeled as a choice point history (CPH) tree that consists of choice point nodes and choice edges. A CPH tree is of a similar structure as the parse tree illustrated in FIG. 5. The root node of the CPH tree is the first unresolved choice point in the current function, leaf nodes are function returns and function exits. As mentioned earlier, a choice point is a point in a program where a selection is made between one of two or more alternative sets of program statements based upon the value of a condition or predicate. A choice point node corresponds to a choice point which analysis engine 308 does not have enough information to resolve. Choice point nodes contain a pointer to the node in the parse tree structures 304 that corresponds to the unresolved choice point in the current function. Choice edges correspond to the different possible resolutions of a choice point. For example, a test for equality can resolve to either true or false. A choice point node corresponds to the equality test. This particular choice point node will have two choice edges; one choice edge will correspond with the "true" result and one with the "false" result.

A choice point history is deterministic in the sense that each path is replicable. If in different executions of the code each unresolved choice point is resolved in the same way, then the same path through the code is followed. Each choice point node has a fixed number of choice edges. That means that the number of paths leading away from an unresolved choice point node is fixed. Although the number is unknown before execution, the number is determined the first time a choice must be made for the choice point node. The whole CPH tree structure is unknown before execution of the current function. The CPH tree is dynamically constructed during analysis of the current function.

The CPH tree is constructed during program execution using a modified breadth-first construction method. Action 1108 maintains a "current level" value. The current level value indicates which choice point nodes have been added to the CPH tree. At any given time, all nodes in the CPH tree that are one or more levels above the current level have been visited. Thus, all their choice edges are determined.

Action 1108 picks a new path to execute by randomly picking an unvisited choice edge coming out from a node that is one level above the current level and walking back to the root node. In this way, action 1108 determines a path that starts at the root node and traverses the CPH tree to the selected node one level above the current level. If an unvisited choice edge coming from a node one level above the current level cannot be found, then the current level value is increased by one and the step is repeated. Increasing the current level value means analysis has moved down one level in the CPH tree. If the current level value is increased and there are still no unvisited choice edges coming out from a node one level above the current level, then no more possible paths can be found. In one embodiment of the present invention, a new path is determined by a routine. In the embodiment of Microfiche Appendix A, the "cph_path_find" routine determines a new path.

For each path determined, action 1108 creates a memory model, simulates the effect on the memory model of instructions along the code path, emulates any function calls on the code path, generates fault indicators 106 upon detecting errors and gathers information necessary to building a model 118 of the current function. A detailed account of this per path processing performed in action 1108 is described below. Processing transfers from action 1108 to gather function externals action 1110 (hereinafter "action 1110").

Action 1110 gathers the externals for the current function for future use during model creation. Action 1110 puts the collected externals into global variables. During later processing, model creation routines will extract these externals from the global variables. A function external is an object within a function that can be referenced outside the function or that has values which persist across function calls, e.g., local static variables. The two most common examples of a function external are parameters and return values. Once the externals of the current function are stored, processing is transferred from action 1110 to release parse tree structure action 1112 (hereinafter "action 1112").

Action 1112 releases the parse tree structure 304 representing the current function. Releasing the parse tree structure 304 representing the current function as soon as it is not needed provides for efficient use of memory resources. In one embodiment of the present invention, action 1112 is performed by a routine. In the embodiment of Microfiche Appendix A, the routine mcil_release_memory_region releases the parse tree structure 304. Processing transfers from action 1112 to free or clean up per-function data structures action 1114 (hereinafter "action 1114").

Per-function processing concludes with action 1114 where storage that is used on a per-function basis is cleaned up. In one embodiment of the present invention, per-function data structures in a package are freed or cleaned up using routines. These routines are invoked in the following package order: exe, auto, cph, ins, sym, vim, err, mcil and exe. In particular, the respective auto package routine creates a model 118 for the current function. Automodelling is described below in greater detail. In the embodiment of Microfiche Appendix A, routines labeled "pkg_end_function", where "pkg" stands for the name of the package, clean up or free storage used on a per-function basis. For example, per-function data structures in the vim package are freed by the routine labeled "vim_end_function". "Pkg_end_function" routines are invoked in the reverse order of "pkg_begin_function" routines. At the completion of action 1114, per-function processing terminates.

Path Analysis

As described above, action 1108 analyzes the current function by tracing multiple simulated execution code paths. Action 1108 traverses the parse tree structure 304 representing the current function (hereinafter referred to as the "current parse tree structure 304") one time for each path analyzed. For each path analyzed, action 1108 performs per-path processing as shown in block diagram 1200 (FIG. 12). The instant path under analysis is designated the current path. Per-path processing begins with read pragmas action 1202 (hereinafter "action 1202").

Action 1202 determines if a pragma is defined for the current function. A pragma is an Intrinsa directive that sets control for a function or statement immediately following the pragma. A user can specify configuration options by embedding an Intrinsa pragma into the source code of a function. A pragma placed immediately before a function applies to the entire function. For example the following pragma applies to all statements in the main function.

```
#pragma INTRINSA "supress=null_pointer, uninitialized"
int main ( )
{
    int i,j;
    j = 1 + 2;
    return 0;
}
```

Details about the "suppress" configuration options can be found in Appendix B.

When action 1202 finds a pragma, it first saves the current settings of the configuration options specified by the pragma, and then sets those configuration options according to the values stated in the pragma. Processing transfers from action 1202 to initialize per-path data structures action 1204 (hereinafter "action 1204").

Action 1204 allocates or initializes any data structures that are used on a per-path basis. In the embodiment of FIG. 12, per-path data structures in a package are allocated or initialized by executing a routine. These routines are invoked in the following package order: ctx, mcil, err, vim, sym, ins, cph, auto and exe. In the embodiment of Microfiche Appendix A, the routines executed in action 1204 are labeled "pkg_begin_path", where "pkg" stands for the name of the package. For example, per-path data structures in the sym package are allocated by the routine labeled "sym_begin_path".

The chunk table is an example of a per-path data structure created by action 1204. The chunk table contains the set of all modelled memory and is used for storage management and leak detection purposes. In one embodiment of the present invention, the chunk table is implemented as a collection of pointers to chunks. Chunks are modelled pieces of known memory and are described below in greater detail. Conceptually, every path traced is a different execution of the function, so a new memory model is created to support each execution. In one embodiment of the present invention, the chunk table is created by a routine. In the embodiment of Microfiche Appendix A, the "vim_begin_path" routine creates the chunk table.

Figure 13:
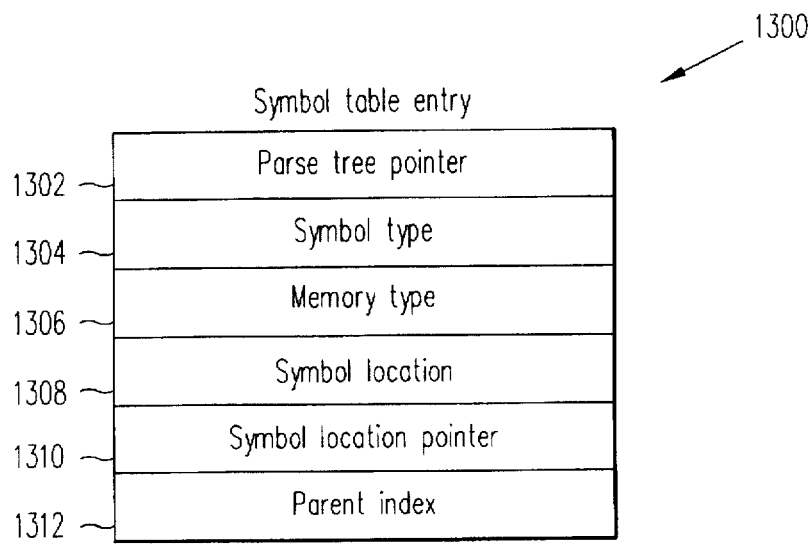
FIG. 13 is an illustration of a symbol table entry employed in one embodiment of the present invention.

Another per-path data structure created by action 1204 is the symbol table. The symbol table associates parse tree nodes containing names (the "symbol") with locations in the memory model. The symbol table is a collection of pointers to symbol table entries 1300. Each symbol table entry 1300 corresponds to a variable used in the current function. Symbol table entry 1300 is shown in FIG. 13. Symbol table entry 1300 includes fields: "parse tree pointer" 1302, "symbol type" 1304, "memory type" 1306, "symbol location" 1308, "symbol location pointer" 1310 and "parent index" 1312. Locations in the memory model are described below in greater detail.

Field "parse tree pointer" 1302 points to the node in the current parse tree structure 304 that defines the symbol represented by the symbol table entry 1300. Field "symbol type" 1304 identifies the kind of symbol represented by the symbol table entry 1300. In one embodiment of the present invention, some possible values for the field "symbol type" 1304 are "variable", "constant", "routine", "dereference" and "return_value". Field "memory type" 1306 describes the type of memory used to hold values for the symbol represented by the symbol table entry 1300. Memory types are described below in more detail. Field "symbol location" 1308 is an encoded pointer to the chunk that stores values for the symbol represented by the symbol table entry 1300. Encoded pointers will be described below in more detail. Field "symbol location pointer" 1310 is an encoded pointer to a chunk that stores an encoded pointer to the chunk pointed to by "symbol location" 1308 (i.e., a pointer to the value for the symbol being described). Field "parent index" 1312 is used only for dereferences. A dereference refers to a value pointed to by a pointer.

When the symbol table entry represents a dereferenced value, field "parent index" 1312 holds the index into the symbol table of the pointer followed to arrive at the dereferenced value. For example, if the symbol table entry is for *P (the value pointed to by P) then field "parent index" 1312 will contain the index in the symbol table of pointer P.

Action 1204 also posts information to execution context block 2100. Action 1206 updates the count in field "current iteration" 2108 by one (indicating the number of the instant path). Processing transfers to layout return value action 1206 (hereinafter "action 1206").

Action 1206 lays out modeled memory for the return value of the current function. Action 1206 also puts the return value into the symbol table. First, action 1206 determines the amount of memory required to represent the return value. This amount, the length of the return value, is measured in bytes. Then, action 1206 calls memory creation unit 1500 with the amount of memory needed to represent the return value. Memory creation unit 1500 creates a piece of modeled memory to hold the return value and returns to action 1206 an encoded pointer to the newly created location in the memory model. Operation of memory creation unit 1500 is described below in greater detail. Next, action 1206 lays out a pointer to the return value location just created. In the embodiment of FIG. 12, pointers are four (4) bytes long. As before, action 1206 calls memory creation unit 1500 to create an appropriate sized piece of modeled memory and is returned an encoded pointer to the newly created model memory location. Action 1206 stores the encoded address of the location of the return value into the location for the pointer to the return value. Finally, action 1206 places the return value in the symbol table.

Action 1206 creates a symbol table entry 1300. A pointer to the parse tree node containing the return value is placed in field "parse tree pointer" 1302. A symbol type of "variable" is placed in field "symbol type" 1304. "Return value" is placed into field "memory type" 1306. An encoded pointer to the first location created to hold the return value is placed in "symbol location" 1308. An encoded pointer to the second location created to store a pointer to the return value is placed in field "symbol location pointer." 1310. Field "parent index" 1312 is not used because action 1206 is not storing a pointer dereference in the symbol table. In one embodiment of the present invention, a symbol table entry 1300 is placed in the symbol table by a routine. In the embodiment of Microfiche Appendix A, the routine labeled "sym_add_symbol" places a symbol table entry 1300 into the symbol table. Processing transfers to process statements along path action 1208 (hereinafter "action 1208").

Action 1208 is responsible for traversing the current path and imitating execution of each statement. Action 1208 performs processing that is appropriate to either simulate or emulate the execution of each individual statement type. A detailed discussion of the processing of action 1208 is presented below under the heading "Statement Analysis". After action 1208 finishes processing each statement along the current path, processing transfers to order symbol table action 1210 (hereinafter "action 1210"). In one embodiment of the present invention, action 1208 is realized by a routine. In the embodiment of Microfiche Appendix A, the routine labeled "exe_execute_statement" performs the function of action 1208.

Action 1210 sorts the symbol table to impose the same order on the symbol table for each path traversed by analysis engine 308. Automodelling requires that the results of different paths be compared. Sorting the symbol table makes it easier to compare the result of executing the current path with the results of executing other paths. In one embodiment of the present invention, the symbol table is sorted in alphabetical order.

The reason for sorting the symbol table is best described by way of example. During automodelling, as described later, every symbol in the symbol table needed for automodelling purposes is examined. If the symbol table entry 1300 is a pointer, the pointer chain is followed. Each location along the pointer chain is labeled with the name of the symbol at the head of the chain preceded by one asterisk ("*") for each level of indirection required to reach the location. For example, referring to FIG. 14a, p 1412 is a pointer in symbol table 1410 that points to "Loc1" location 1416. "Loc1" location 1416, being one level of indirection removed from pointer p 1412, is labeled "*p". In turn, "Loc1" location 1416 points to "Loc2" location 1418.

"Loc2" location 1418, being two levels of indirection removed from pointer p 1412, is labelled "**P".

Figure 14A:
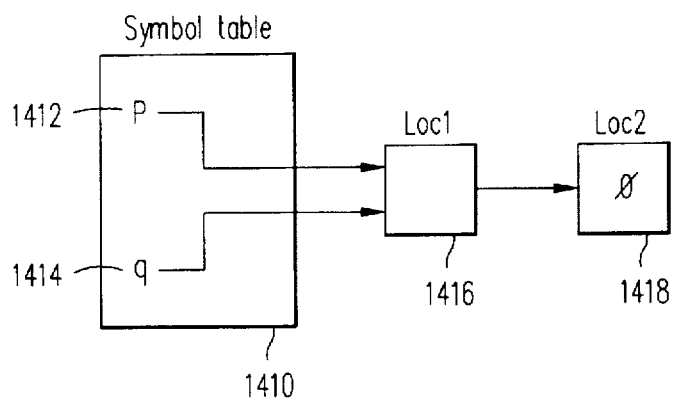
FIG. 14a is a high level depiction of two pointers in a symbol table and their linkages to modeled memory used in the order symbol table block of FIG. 12.
Figure 14B:
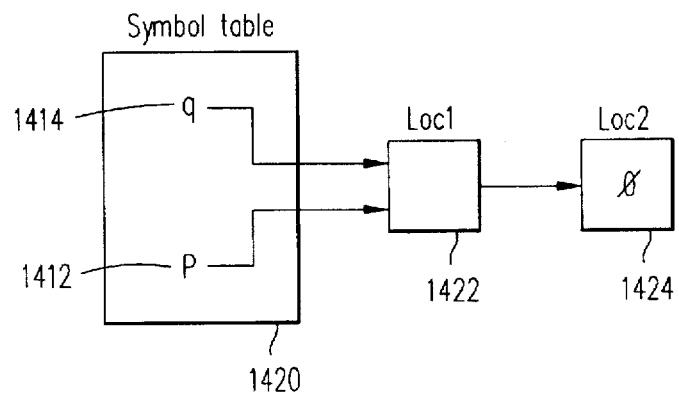
FIG. 14b is a high level depiction of the two pointers from FIG. 14a (and their linkages to modeled memory) placed, in reverse order from FIG. 14a, into the symbol table used in the order symbol table block of FIG. 12.

Symbols are put into the symbol table in the order they are encountered along the path of a function. Symbols may be encountered in a different order when traversing different paths of a function. In FIG. 14a, pointer p 1412 was encountered on the code path before pointer q 1414 and thus p 1412 is in symbol table 1410 before q 1414. In FIG. 14b, representing a different path through the same function, pointer q 1414 is encountered before pointer p 1412. Thus, in FIG. 14b, q 1414 is recorded in symbol table 1420 before p 1412.

Pointers p 1412 and q 1414 point to a shared memory model location 1422 (Loc1) that points to a memory model location 1424 containing the value zero (Loc2). Performing the labeling step described above on symbol table 1410 in FIG. 14a leads to the result of "*p=0". This result derives from labeling "Loc1" location 1416 as *p based on starting the chain with pointer p 1412. Performing the labeling operation on symbol table 1420 in FIG. 14b leads to the result of "*q=0". This result derives from labelling location 1422 (Loc1) as *q based on starting the chain with pointer q 1414. Although both paths have the same actual result, it is hard to merge the outcomes because of their disparate expression ("*p=0" as compared to "*q=0").

Sorting the symbol table ensures that pointer p 1412 will always be processed before pointer q 1414. That way, both paths express the result as "*p=0". By ordering the symbol table, the result of the two paths can be collapsed into a single outcome. Thus, ordering the symbol table allows automodelling processing to easily compare the results of different paths. In one embodiment of the present invention, ordering the symbol table is accomplished by a routine. In the embodiment of Microfiche Appendix A the routine "sym_order_table" orders the symbol table. Processing transfers from action 1210 to leak detection action 1212 (hereinafter "action 1212").

Action 1212 performs leak detection processing. Action 1212 loops through all of modeled memory and scans the information about memory allocation accumulated during analysis of the current path. Action 1212 identifies any chunk of memory that will be leaked when the current function exits. A piece of memory is leaked when it is allocated, but it will not be pointed to by any symbol after the function exits. Action 1212 also detects leaked resources. A detailed explanation of the processing performed by action 1212 is given below under the heading "Leak Detection". Processing transfers from action 1212 to reset pragma_options action 1214 (hereinafter "action 1214").

Action 1214 restores any configuration options set in action 1202. If a pragma is defined for the current function, then action 1214 sets the configuration options specified in the pragma to the values saved in action 1202. Action 1214 transfers processing to free or clean up per-path data structures action 1216 (hereinafter "action 1216").

Per-path processing concludes with action 1216 where storage that is used on a per-path basis is cleaned up and global data structures are updated with information about the current path. In the embodiment of FIG. 12, per-path data structures in a package are freed or cleaned up by executing routines. These routines are called in the reverse package order of the routines executed in action 1204. The routines called by action 1216 are invoked in the following package order: exe, auto, cph, ins, sym, vim, err, mcil and ctx. In the embodiment of Microfiche Appendix A, the routines called by action 1216 are labeled "pkg_end_path", where "pkg" stands for the name of the package. For example, per-path data structures in the exe package are freed by the routine labeled "exe_end_path". The routine executed by action 1216 corresponding to the auto package is of particular importance in that it gathers information about the "execution" of the current path to help in creating a model 118 for the current function. Automodelling is described below in greater detail. At the completion of action 1216, per-path processing terminates.

Memory Creation Unit 1500

As described above, memory creation unit 1500 creates data structures required to model memory. The memory model created by analysis engine 308 represents memory used by a program during execution. Analysis engine 308 creates a structural memory model because the model imitates the internal composition of a value rather than the value as a single unit. For example, in one embodiment of the present invention that analyzes C language programs, a long integer is represented as a composition of four, individually addressable bytes as opposed to one single addressable value. However, the memory model is not physically contiguous as is the heap storage used by many computer programs to store temporary values.

The memory model is comprised of the chunk table, chunks 1700 and stored values 1800 linked together by pointers. As mentioned earlier, the chunk table records all of the modeled memory. A chunk 1700 models one or more contiguous memory locations. A stored value 1800 holds the value stored in one or more memory locations (i.e., a chunk 1700). Chunks 1700 and stored value 1800 are described below in greater detail. Create memory unit 1500 processing commences with capture-origin information action 1502 (hereinafter "action 1502").

Figure 16:
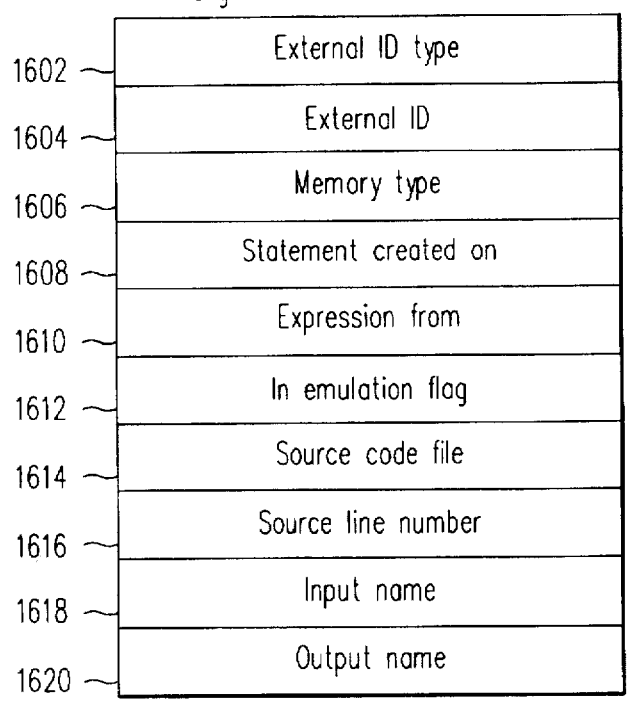
FIG. 16 is an illustration of an origin context structure employed by the memory creation unit of FIG. 15.

Action 1502 keeps track of the context in which memory is created. Action 1502 creates an origin context structure 1600 which encapsulates context information at the time memory creation unit 1500 started processing. Origin context structure 1600 is stored in chunk 1700 as described later. Origin context structure is shown in FIG. 16. Origin context structure 1600 includes fields: "external id type" 1602, "external id" 1604, "memory type" 1606, "statement created on" 1608, "expression from" 1610, "in emulation flag" 1612, "source code file" 1614, "source line number" 1616, "input name" 1618 and "output name" 1620.

Field "external id type" 1602 indicates the type of item that storage is created for. In one embodiment of the present invention, possible item types are "symbol", "stored value", "string", "return value" and "unknown". "Stored values" are discussed below and "unknown" means the item type cannot be determined. Items of type "symbol" and "string" are well understood by one of ordinary skill in the art. Field "external id" 1604 contains a pointer to a node in the current parse tree structure 304 that uniquely identifies the item triggering the creation of modeled memory.

Field "memory type" 1606 categorizes what the memory is being created for. As will be described in more detail later, field "memory type" 1606 is used for modelling purposes. If the memory is being created for an item visible outside the function, then it will be used in automodelling. In one embodiment of the present invention, the types of memory modeled are: constant, global, dereference of global, static, dereference of static, local, parameter, dereference of parameter, heap memory, resource definition, resource, temporary, unknown, address constant, character constant and zero constant. One of ordinary skill in the art will understand constant, global, local, static, parameter and return value items.

As mentioned earlier, a dereference refers to the value pointed to by a pointer. For example, dereference of global indicates a memory location that holds a value pointed to by a global variable. The memory type of "unknown" indicates that the piece of memory modeled is not visible outside the function. Items of memory type "unknown" are not used in creating a model 118 for the current function. Temporary values come from intermediate steps of computations performed by the current function and are identified in the current parse tree structure 304. Heap memory is memory allocated by the current function. For example, a "malloc (10)" function call in the C language creates 10 bytes of heap memory. Resources and resource definitions indicate objects used by a function such as files and windows.

The more general "constant" memory type is distinguished from the specific cases of address, character and string constant to allow for optimization of processing within analysis engine 308. Because zero is an often used number, analysis engine 308 models only one instance of the constant zero for every use in the current function. Leak detection processing is improved because only address constants, as opposed to other constant types, are dereferenced. Overall efficiency is improved because a check to determine if an item is a valid pointer does not have to be made on character constants. Optimized memory management and decision making improve the performance of analysis engine 308.

Field "statement created on" 1608 is a pointer to the parse tree node in the current parse tree structure 304 that identifies the statement containing the item identified in field "external id" 1604. Field "expression from" 1610 is a pointer to the parse tree node in the current parse tree structure 304 that identifies the expression containing the item identified in field "external id" 1604. Flag "in emulation flag" is true when modeled memory is being created for the execution of a model 118. Field "source code file" 1614 identifies the name of the source code file which contains the current function. Field "source line number" 1616 identifies the line number in the source code file identified by field "source code file" 1614 of the statement identified by field "statement created on" 1608. Field "input name" 1618 contains the name of the original stored value associated with the piece of modeled memory being created. Field "output name" 1620 contains the name of the final value associated with the piece of modeled memory being created. Field "input name" 1618 and field "output name" 1620 are used by the automodeller to record if the memory location being modeled is accessible at the beginning ("input name" 1618) or ending ("output name" 1620) of the current function. After origin context structure 1600 is properly filled in, processing transfers to action 1504.

Figure 17:
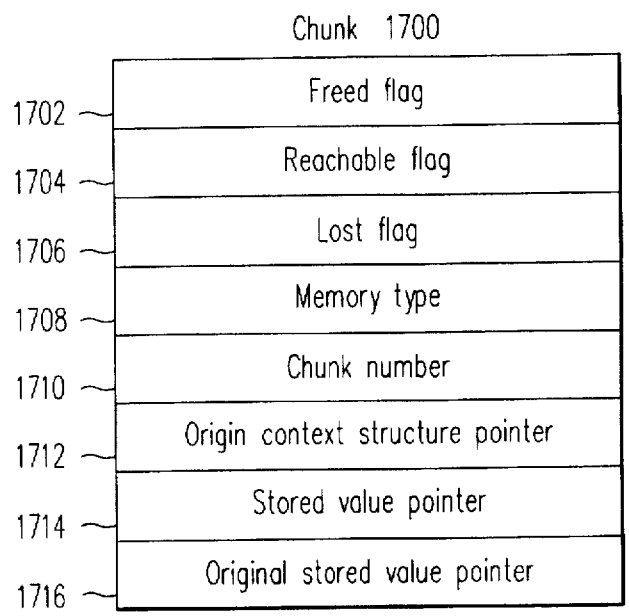
FIG. 17 is an illustration of a chunk data structure employed by the memory creation unit of FIG. 15.

Action 1504 creates a model for one or more contiguous memory locations. A memory location is the smallest unit of memory that can be explicitly and uniquely specified by means of an address. Typically, computer memory is byte addressable, and thus, a location is one byte. Action 1504 models memory using a chunk 1700. Chunk 1700 is shown in FIG. 17. Chunk 1700 includes fields: "freed flag" 1702, "reachable flag" 1704, "lost flag" 1706, "memory type" 1708, "chunk number" 1710, "origin context structure pointer" 1712, "stored value pointer" 1714 and "original stored value pointer" 1716.

Flag "freed flag" is true when the memory locations modeled by chunk 1700 have been freed. Flag "reachable flag" 1702 is used by leak detection processing to determine if the memory location is reachable. Flag "lost flag" 1706 is true when it can not be determined if the memory modeled is freed or leaked. With lost memory, it is possible that nothing will point to the memory after the function exits, but just because there is no record of a pointer to the memory does not mean that such a pointer does not exist. For example, memory can be allocated and then passed to a routine which is modeled by the missing model. Analysis engine 308 can not ascertain what happened to the allocated memory passed into the routine. Thus, the memory is marked as "lost". Field "memory type" 1708 holds the same information as field "memory type" 1606 described above. Field "chunk number" 1710 is a unique identifier for chunk 1700. Field "origin context structure pointer" 1712 points to the origin context structure 1600 created in action 1502. Field "stored value pointer" 1714 points to the current value in the modeled memory location. Field "original stored value pointer" 1716 points to the original value in the modeled memory location.

First, action 1504 iterates through the chunk table looking at chunks 1700 to determine if a chunk 1700 can be reused. If action 1504 can not reuse any chunks 1700 then it must create a new chunk 1700. A pointer to the new chunk 1700 is put into the chunk table. Chunk number 1710 is assigned a number that uniquely identifies new chunk 1700. Flags "freed flag" 1702, "reachable flag" 1704 and "lost flag" 1706 are initialized to false. Field "memory type" 1708 is set to equal "memory type" 1606 set in action 1502. Field "origin context structure pointer" 1712 is set to point to the origin context structure 1600 built in action 1502. Processing then transfers to model values action 1506 (hereinafter "action 1506") to create the stored value set.

Figure 15:
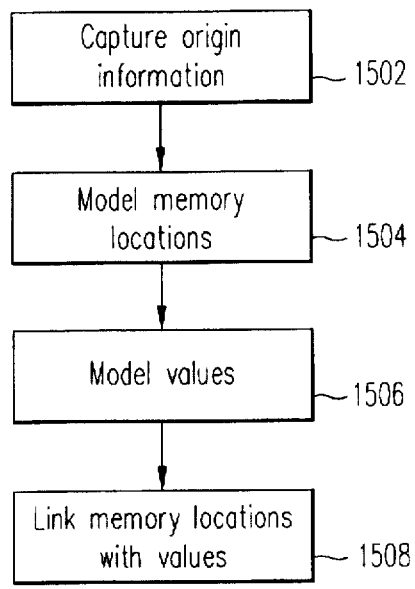
FIG. 15 is a block diagram representing the processing performed by one embodiment of the memory creation unit of this invention.

Action 1506 models values placed into the location modeled by the chunk 1700 created in action 1504. Memory creation unit 1500 models values by creating stored value sets. A stored value set is a collection of stored values. Each stored value is a data structure that represents one unit of memory. In the embodiment of FIG. 15, memory creation unit 1500 imitates the memory management characteristics of the C computer language. The C computer language allocates values as contiguous sets of bytes. Each stored value represents one byte of memory. Thus, a set of stored values represents the collection of bytes used to store one value. For example, a regular integer is typically four bytes long. Action 1506 models an integer by creating four stored values and putting them in a stored value set.

Figure 18:
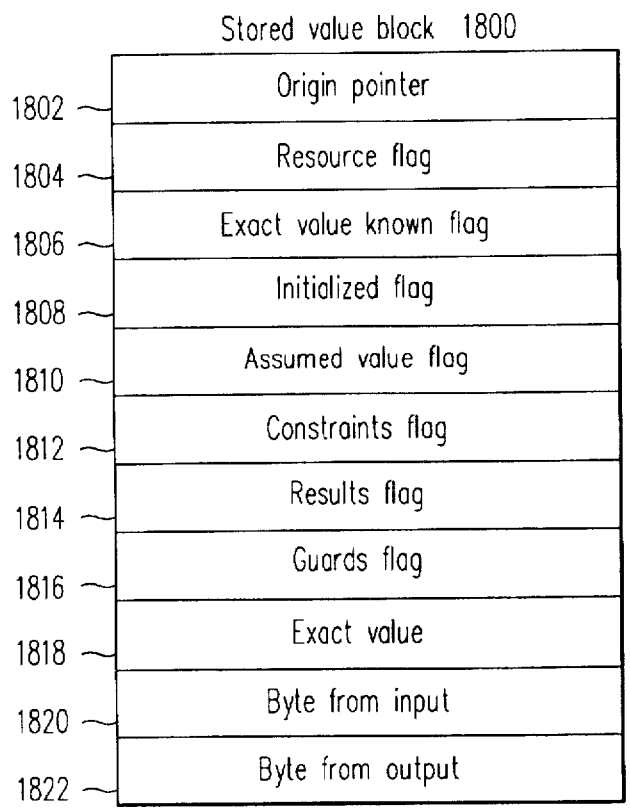
FIG. 18 is an illustration of a stored value block employed by the memory creation unit of FIG. 15.

Action 1506 creates one stored value for each byte of memory being created. A pointer to each stored value created is put into a stored value set. Thus, a stored value set is a collection of pointers to stored values. A stored value is represented by a stored value block 1800. Stored value block 1800 is shown in FIG. 18. Stored value block 1800 contains the following fields: "origin pointer" 1802, "resource flag" 1804, "exact value known flag" 1806, "initialized flag" 1808, "assumed value flag" 1810, "constraints flag" 1812, "results flag" 1814, "guards flag" 1816, "exact value" 1818, "byte from input" 1820 and "byte from output" 1822.

Field "origin pointer" 1802 points to the origin context structure 1600 created in action 1502. Flag "resource flag" 1804 identifies if this data structure represents a stored value or a stored resource. Flag "resource flag" 1804 is always false if the data structure represents a stored value. Resources are represented in an analogous manner to stored values, except that a stored resource block 1900 is used instead of a stored value block 1800. Stored resource blocks 1900 are described below. Flag "exact value known flag" 1806 is true when field "exact value" 1818 contains a valid value. Flag "assumed value flag" 1810 is true if this value was assumed during processing. Flag "constraints flag" 1812 is true if this value can be used in a constraint in a model 118. Flag "results flag" 1814 is true if this value can be used in a result in a model 118. Flag "guards flag" 1816 is true if this value can be used in a guard in a model 118. Constraints, results and guards are described in more detail under the "Modelling Concepts" heading. Field "exact value" 1818 contains the exact value stored in the modeled memory location. Field "byte from input" 1820 identifies the particular byte in the original stored value set (pointed to by "original stored value pointer" 1716) corresponding to this stored value. Field "byte from output" 1822 identifies the particular byte in the final stored value set (pointed to by "stored value pointer" 1714) corresponding to this stored value.

Figure 19:
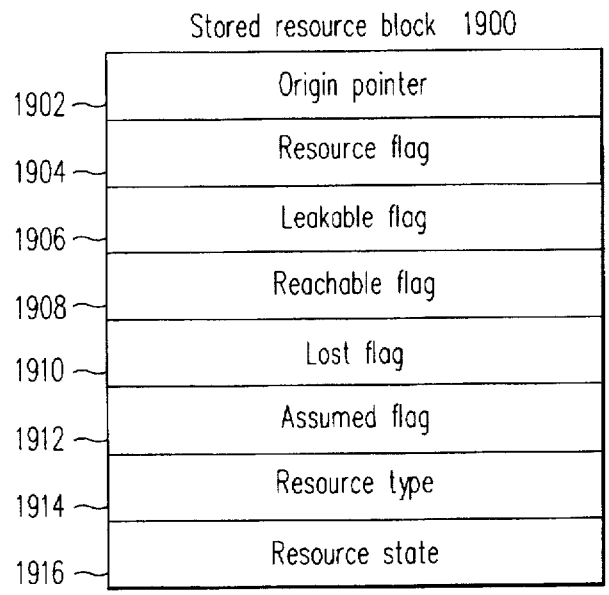
FIG. 19 is an illustration of a stored resource block employed by the memory creation unit of FIG. 15.

Alternatively, if memory creation unit 1500 is called to model memory for a resource then action 1506 will create a stored resource block 1900. Stored resource block 1900 is shown in FIG. 19. Stored resource block 1900 contains the following fields: "origin pointer" 1902, "resource flag" 1904, "leakable flag" 1906, "reachable flag" 1908, "lost flag" 1910, "assumed flag" 1912, "resource type" 1914 and "resource state" 1916.

Field "origin pointer" 1902 points to the origin context structure 1600 created in action 1502. Flag "resource flag" 1904 identifies if this data structure represents a stored value or a stored resource. Flag "resource flag" 1904 is always true if the data structure represents a stored resource. Flag "leakable flag" 1906 is true when the resource may not be pointed to after the current function exits. Flag "reachable flag" 1908 is used in leak detection processing as described below. Flag "lost flag" 1910 indicates analysis engine 308 can not predict if the resource is pointed to after the current function terminates. Flag "assumed flag" 1912 is true when the resource was assumed during processing in analysis engine 308. Fields "resource type" 1914 and "resource state" 1916 hold the type and state respectively of the resource requiring modeled memory. After the needed number of stored value blocks 1800 or stored resource blocks 1900 are created and placed in a stored value set, processing transfers to link memory locations with values action 1508 (hereinafter "action 1508").

Action 1508 links the modeled value (or resource) to the modeled memory location. If this is the first stored value set for chunk 1700, both stored value pointer 1714 and original stored value pointer 1716 are set to point to the stored value set created in action 1506. Otherwise, only stored value pointer 1714 is set to point to the stored value set created in action 1506. In this manner, the original stored value set for a location and the most recent stored value set for a location are remembered in chunk 1700. Intermediate instances of a stored value are discarded because they are not needed for automodelling purposes. A model 118 describes the results a function obtains and not how the results are reached. Thus, only the initial and final instances of a stored value and not the intermediate instances are examined for automodelling purposes.

Figure 20:
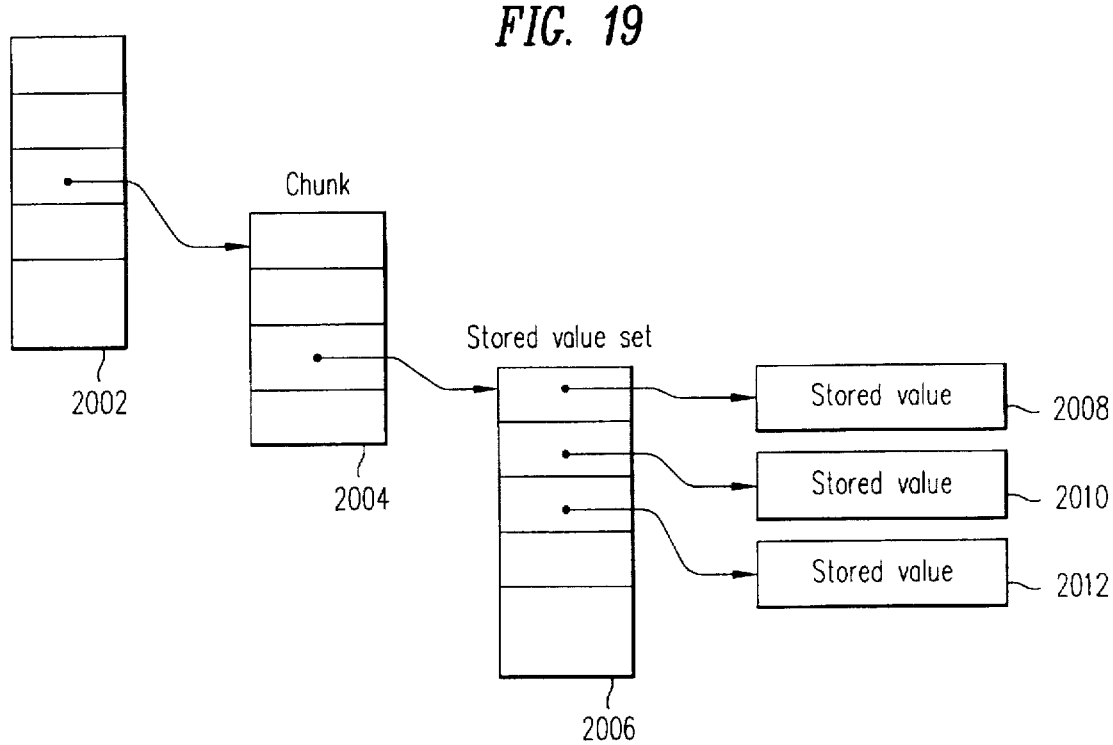
FIG. 20 is a high level depiction of the linkages between data structures created by the memory creation unit of FIG. 15.
Figure 21:
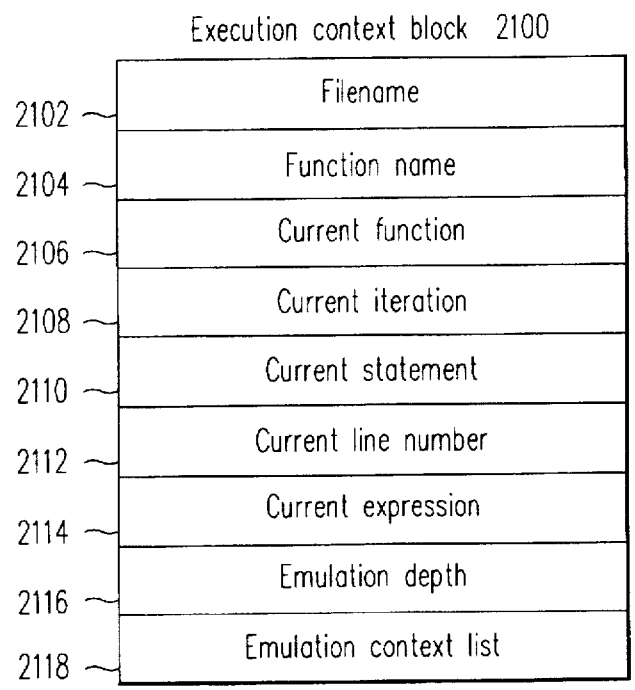
FIG. 21 is an illustration of an execution context block employed by the initialize per-functions data structures block of FIG. 11.

Processing for memory creation unit 1500 terminates and action 1508 returns to the caller of memory creation unit 1500 an encoded pointer to the newly modeled memory. An encoded pointer consists of a pointer to chunk 1700 plus an offset into the stored value set pointed to by stored value pointer 1714. Encoded pointers are required because a location in modeled memory is a simulated memory location. For example, refer to the simplified diagram of the linkage between data structures used to model memory shown in FIG. 20. Chunk 2004 is located through an entry in chunk table 2002. In turn, chunk 2004 contains a pointer to the associated stored value set 2006. Offset into stored value set 2006 are pointers to stored values 2008, 2010 and 2012. Thus, in modeled memory, unlike a true memory location, a value cannot be accessed with a simple physical address. So, modeled memory locations or, more simply, locations are encoded pointers to stored value blocks 1800.

Leak Detection

As discussed above, leaks are detected in action 1212 at the end of path analysis after the statements in a path have been processed. Memory Leaks are detected using a mark and sweep method. First, action 1212 iterates through the chunk table and marks each chunk as unreachable. A chunk 1700 is marked as unreachable by setting flag "reachable flag" 1704 to false. Next, action 1212 iterates through each external in the symbol table and traverses only pointer chains. Action 1212 marks each chunk 1700 found through the pointer chain as reachable. A chunk 1700 is marked as reachable by setting flag "reachable flag" 1704 to true. After processing the symbol table, action 1212 iterates through the chunk table examining each chunk 1700. For each chunk, if it is heap storage, not freed, not lost and still marked as unreachable then that chunk is reported as leaked. In one embodiment of the present invention, a memory leak is reported with a corresponding fault indicator 106.

Action 1212 also reports resource leaks. Another iteration is made through the chunk table, but this time action 1212 searches for all chunks 1700 with field "memory type" 1708 set to indicate a resource. For each chunk defining a resource, the corresponding stored resource block 1900 is queried. If the resource is not reachable and it is not in one of the recognized states than it is reported as leaked. The recognized states are closed, freed, released, or deleted. In one embodiment of the present invention, a resource leak is reported with a corresponding fault indicator 106.

Statement Analysis

Figure 22:
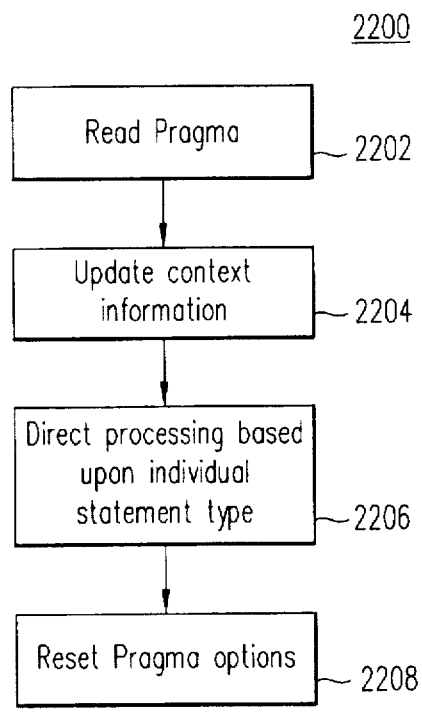
FIG. 22 is a block diagram representing the processing performed in the process statements along path block of FIG. 12.

Action 1208, as described earlier, is responsible for imitating execution of each statement along the current path. The instant statement under analysis is designated the current statement. Action 1208 identifies and distributes the current statement for further processing. Action 1208 is illustrated in the block diagram of FIG. 22. Processing for action 1208 begins with read pragma action 2202 (hereinafter "action 2202").

Action 2202 determines if a pragma is defined for the current statement. As presented above, a pragma is an Intrinsa directive that sets control for a function or statement immediately following the pragma. An Intrinsa pragma placed into the source code immediately before a statement specifies configuration options to control that specific statement only. For example the following pragma applies only to the statement "a=1+2;".

---
pragma INTRINSA "supress=null_pointer, uninitialized"
a = 1 + 2;
b = a;
---

Details about the "suppress" configuration option can be found in Appendix B. If action 2202 finds a pragma, then it first saves the current settings of the configuration options specified by the pragma, and then sets those configuration options according to the values stated in the pragma. Processing transfers from action 2202 to update context information action 2204 (hereinafter "action 2204").

Action 2204 posts context information to execution context block 2100. Current statement 2110 is set to point to the node in the current parse tree structure 304 representing the current statement. Current line number 2112 is set to the line number in the file storing the current function that contains the current statement. Processing transfers from action 2204 to direct processing based upon individual statement type action 2206 (hereinafter "action 2206").

Action 2206 processes individual statements by distributing them to statement units for further processing. Action 2206 first identifies the type of statement being analyzed. Action 2206 then transfers processing control to the corresponding statement unit. With respect to the embodiment of FIG. 22, Table 3 illustrates the correspondence between type of statement and the statement unit called. The modules listed in the "statement unit" column are explained below in more detail. The statement types listed in the "statement type" column are well understood by one of ordinary skill in the art. When control returns to action 2206, processing is transferred to action reset pragma options 2208 (hereinafter "action 2208").

TABLE 3

| Statement Type | Statement Unit |
|---|---|
| block statement | block unit |
| expression | expression unit |
| if-else statement | if-else unit |
| while statement (loop) | while loop unit |
| do while statement (loop) | do while loop unit |
| label statement | label unit |
| goto statement | goto unit |
| return statement | return unit |
| for statement (loop) | for unit |
| switch statement | switch unit |
| variable initialization statement | variable initialization unit |

Action 2208 restores any configuration options set in action 2202. If a pragma is defined for the current statement, then action 2208 sets the configuration options specified in the pragma to the values saved in action 2202. Action 2208 returns processing control to the action control originated from.

Figure 23:
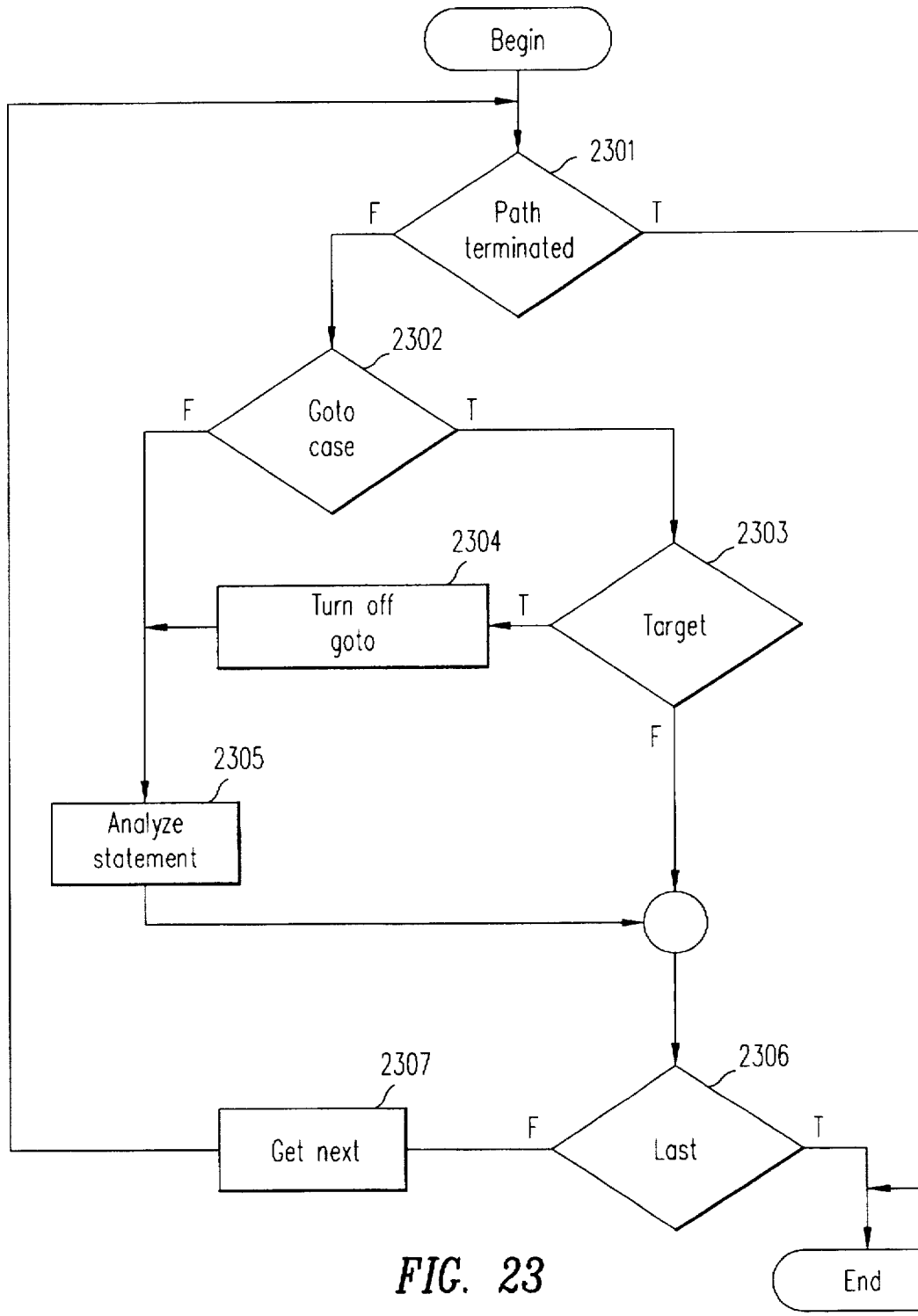
FIG. 23 is a logic flow diagram of one embodiment of the block unit of this invention.

Now turning to the explanation of statement units, the block unit performs a loop through the statements within a block statement. A block statement, often called a compound statement, is a set of statements that forms one syntactic unit. Typically, a block statement is the highest level statement in a function written in the C programming language. The block unit is shown in greater detail as logic flow diagram 2300 (FIG. 23).

In path terminated decision 2301 (hereinafter "decision 2301"), a check is made to see if the instant block has been terminated. If a null or exit statement has been previously processed, analysis of the current block statement is complete and processing according to logic flow diagram 2300, and thus the block unit, terminates. If the instant block is still active, processing transfers to goto case decision 2302 (hereinafter "decision 2302") which determines if a goto statement is being processed. In the embodiment of FIG. 23, goto processing is identified by querying a goto parameter. In the embodiment of Microfiche Appendix A, the goto parameter is named "goto_statement". If the goto parameter indicates that a goto statement is being simulated, processing transfers to target decision 2303 (hereinafter "decision 2303"); otherwise processing control is transferred to analyze statement action 2305 (hereinafter "action 2305").

Decision 2303 tests to see if the statement which is the target of the active goto statement has been reached. Decision 2303 compares the pointer to the current parse tree node representing the current statement in the block with the pointer to the current parse tree node representing the goto target statement. If the two pointers match, then the current statement in the block is the goto target statement. If the goto target statement has been reached, then processing transfers to turn off goto action 2304 (hereinafter "action 2304"). If the current statement in the block is not the goto target statement, then processing transfers to last decision 2306 ("decision 2306").

Action 2304 sets the goto parameter to false to indicate that there is not an active goto statement being processed. After action 2304 completes, processing transfers to action 2305. Action 2305 analyzes the current statement in the block. Action 2305 retrieves the pointer to the node in the current parse tree structure 304 representing the current statement in the block and recursively transfers that pointer along with processing control to action 1208. When control returns to action 2305, processing transfers to last decision 2306.

Decision 2306 determines if the last statement in the instant block statement has been processed. If decision 2306 resolves to true then processing according to logic flow diagram 2300, and thus the block unit, terminates. Otherwise, the last statement has not been reached and processing transfers to get next action 2307 (hereinafter "action 2309"). Action 2307 gets the next statement in the block and transfers control to decision 2301 to continue processing the instant block statement.

Figure 24:
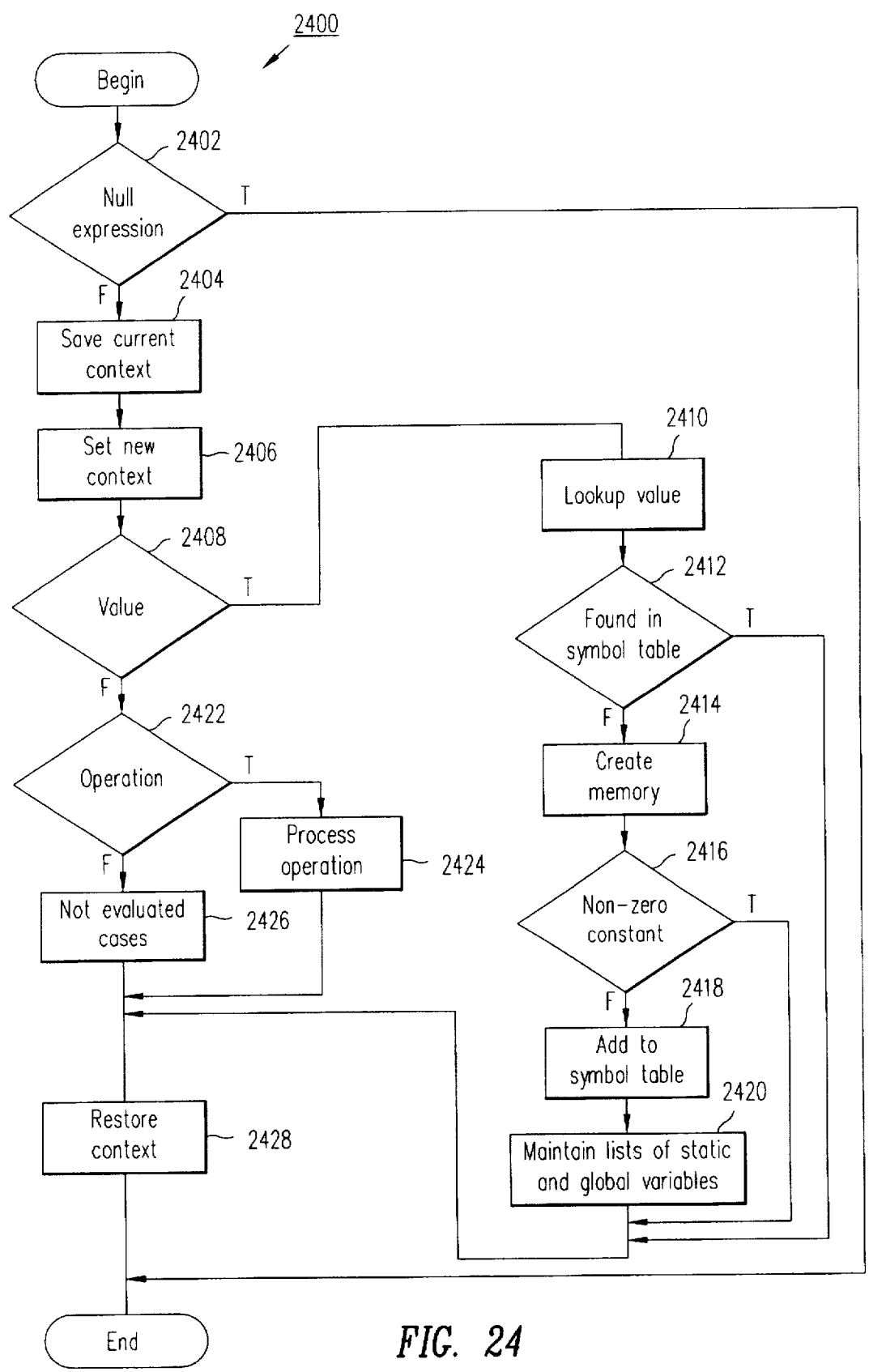
FIG. 24 is a logic flow diagram of one embodiment of the expression unit of this invention.

The expression unit processes expressions. As input, the expression unit receives a pointer to a node in the current parse tree structure 304 that represents the expression to be processed. As output, the expression unit returns a pointer to a location holding the result of the expression. The term "expression" is used herein as it is defined in Kernighan and Ritchie, *The C proramming language*, 185 (Prentice-Hall 1978). A statement can be constructed from an expression by following it with a semi-colon. In one embodiment of the present invention, the expression unit is implemented by a routine. In the embodiment of Microfiche Appendix A, the expression unit is implemented by the "exe_evaluate_expr" routine. The expression unit is shown in greater detail as logic flow diagram 2400 (FIG. 24).

Expression processing starts with null expression decision 2402 (hereinafter "decision 2402"). Decision 2402 determines if the input expression equals the null expression. When the input expression is equal to the null expression no action is required, and processing according to logic flow diagram 2400, and thus the expression unit, terminates. Otherwise, when the input expression is not the null expression, processing transfers to save current context action 2404 (hereinafter "action 2404"). Action 2404 saves the value of current expression 2114. Processing transfers to set new context action 2406 (hereinafter "action 2406") which stores the pointer to the node in the current parse tree structure 304 representing the input expression into current expression 2114. After the old context information has been saved and a new context set, processing transfers to value decision 2408 (hereinafter "decision 2408").

Decision 2408 determines if the input expression is a value. Referring back to the earlier discussion of parse trees, values are leaf nodes in the parse tree. In one embodiment, a value can be a constant, variable, variable address or routine address. If the input expression is a value then processing will transfer to look up value action 2410 (hereinafter "action 2410"); otherwise, processing transfers to operation decision 2422 (hereinafter "operation 2422").

Action 2410 determines the value of the input expression. Parse tree structure 304 has a unique declaration node for each value. A declaration node has information about a value such as its type and its contents. Action 2410 retrieves from the node representing the input expression a pointer to the corresponding declaration node. A pointer to a declaration node is also referred to herein as an external_id. It is the external_id that is used to look up a symbol in the symbol table. It is from the referenced declaration node that the contents of the value are determined. If the referenced declaration node does not contain the contents of the value, the value is flagged as "unknown". Processing transfers from action 2410 to found in symbol table decision 2412 (hereinafter "decision 2412").

Decision 2412 determines if the value has been stored in the symbol table. Action 2412 compares the external_id found in action 2410 with parse tree pointer 1302 in the symbol table entries. If a match is found then the value is in the symbol table and processing transfers to restore context action 2428 (hereinafter "action 2428"). If the value is not found in the symbol table, processing transfers to create memory action 2414 (hereinafter "action 2414").

Action 2414 lays out modeled memory for the current expression (i.e., for a value). Action 2414 is analogous to action 1206, discussed earlier, which lays out modeled memory for the return value of the current function. First, action 2414 determines the amount of memory required to represent the current expression. Then, action 2414 calls memory creation unit 1500 to model the amount of memory needed to represent the current expression. Action 2414 then stores the contents of the current expression (found in the referenced declaration node) in the newly modeled memory. When the current expression is a variable, action 2414 lays out a pointer to the current expression location just created. Action 2414 calls memory creation unit 1500 to create a pointer sized piece of modeled memory. Action 2414 stores the encoded address of the location of the current expression into the location for the pointer to the current expression. Processing transfers from action 2414 to non-zero constant decision 2416 (hereinafter "decision 2416").

Decision 2416 determines if the current expression is a non-zero constant. If the current expression is a non-zero constant then processing transfers to action 2428; otherwise, processing transfers to add to symbol table action 2418 (hereinafter "action 2418"). Action 2418 creates a symbol table entry 1300 to represent the current expression and then stores the newly created symbol table entry 1300 into the symbol table. Zero is the only constant put into the symbol table. Zero is placed in the symbol table as an optimization to avoid repeatedly modelling memory every time a constant zero is used. Processing transfers from action 2418 to maintain lists of static and global variables action 2420 (hereinafter "action 2420").

Action 2420 maintains, for automodelling purposes, a list of global variables and a list of static variables. Variable type information is recorded in the declaration node corresponding to the current expression. In one embodiment of the present invention, a variable can be of type global, static or local. If the current expression is a global variable then action 2420 updates the global variable list, and if the current expression is a static variable then action 2420 will update the static variable list. Processing transfers from action 2420 to action 2428.

If the input expression is not a value, then operation decision 2422 (hereinafter "decision 2422") will determine if the current expression is an operation. If the current expression is an operation then processing transfers to process operation action 2424 (hereinafter "action 2424"). Action 2424 is described below in greater detail. If the current expression is not an operation then processing transfers to not evaluated cases action 2426 (hereinafter "action 2426"). Action 2426 will issue an appropriate error code if the current expression cannot be identified. If the current expression is not supported by analysis engine 308 then no action is taken. For example, in the embodiment of FIG. 24, C++ expressions "new" and "delete" are not supported. Processing transfers from action 2426 to action 2428.

Action 2428 restores the value saved in action 2404 to current expression 2114. Then processing according to logic flow diagram 2400, and thus the expression unit, terminates. Upon termination, the expression unit transfers control to the site control originated from.

Figure 25A:
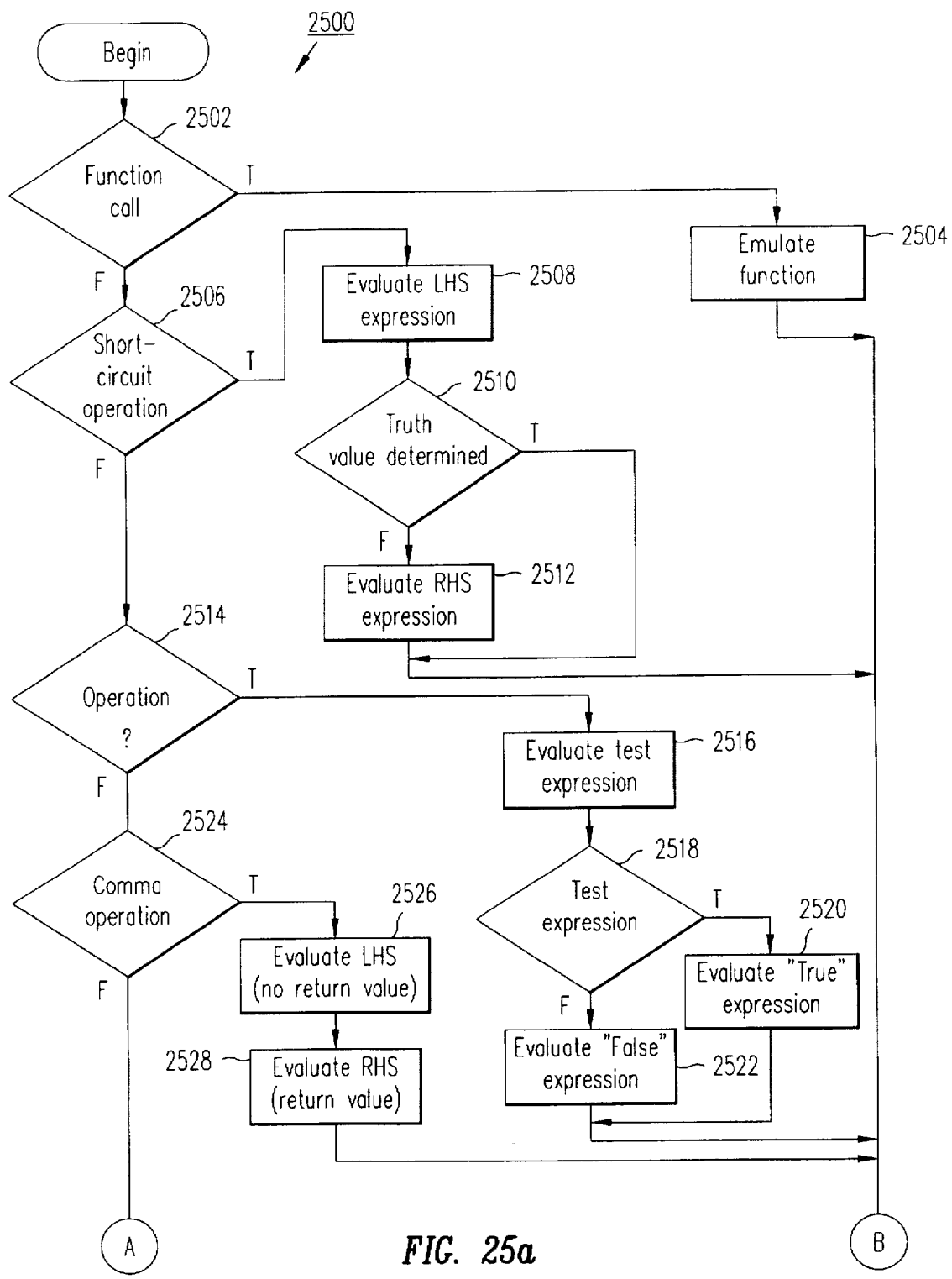
FIG. 25a is a logic flow diagram describing part of the processing performed in process operation action 2424 of FIG. 24.
Figure 25B:
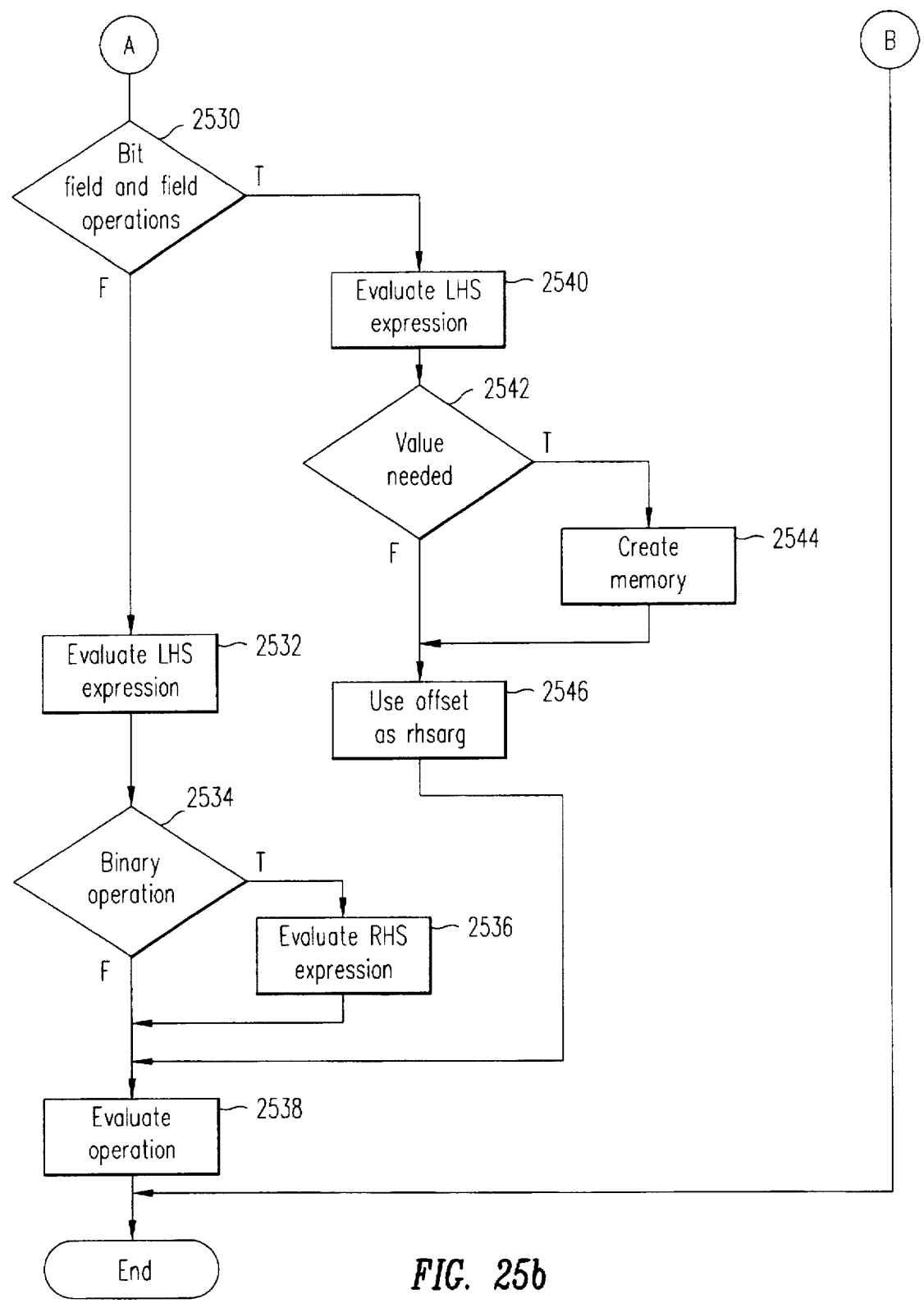
FIG. 25b is a logic flow diagram completing the description begun in FIG. 25a of the processing performed in process operation action 2424 of FIG. 24.

Action 2424, processing an operation, is illustrated in logic flow diagram 2500 (FIGS. 25a, 25b). Action 2424 determines what type of operation the current expression represents and performs appropriate processing. Operation expressions are composed of an operator and one or more operands. Operands are also expressions. Processing begins in function call decision 2502 (hereinafter "decision 2502") which determines if the current expression represents a function call. If the current expression is a function call, then processing transfers to emulate function action 2504 (hereinafter "action 2504") which emulates the function called; otherwise, processing transfers to short-circuit operation decision 2506 (hereinafter "decision 2506").

Action 2504 emulates a function by executing its corresponding model 118. Executing a model 118 allows action 2504 to determine what impact the corresponding function will have on the memory model (the external effects of the function). If the function to be executed is represented by the missing model, then action 2504 simply assumes the function call completes successfully. Presented in Appendix F is pseudo code of one embodiment used to implement action 2504. When action 2504 completes, processing according to logic flow diagram 2500, and thus action 2424, is terminated.

Decision 2506 checks if the current expression is a short-circuit operation. The short-circuit operators logical AND (&&) and logical OR (||) are called such because evaluation of the operation will stop as soon as the truth value of the operation is determined (possibly before all operands are evaluated). If the current expression is a short-circuit operation processing transfers to evaluate LHS expression action 2508 (hereinafter "action 2508"). Action 2508 evaluates the left-hand side expression of the operation (i.e., the left-hand side operand) by transferring process control to the expression unit (action 2402). After evaluating the left-hand side expression, processing transfers to truth value determined decision 2510 (hereinafter "decision 2510") which decides if the truth value of the input expression has been determined. If the input expression is logical AND and the left-hand side expression evaluated to false or the input expression is logical OR and the left-hand side expression evaluated to true, then the truth value of the input expression is determined and processing according to logic flow diagram 2500, and thus action 2424, is terminated. Otherwise, processing transfers to evaluate RHS expression action 2512 (hereinafter "action 2512") which evaluates the right-hand side of the current expression (i.e., right-hand side operand) by transferring processing to the expression unit (action 2402). After the right-hand side expression is evaluated, processing according to logic flow diagram 2500, and thus action 2424, is terminated. In one embodiment of the present invention, the processing of action 2424 is performed by a routine. In the embodiment of Microfiche Appendix A, the "exe_evaluate_operation" routine performs action 2424 processing.

If the current expression is not a short-circuit operation, processing transfers to question mark operation decision 2514 (hereinafter "decision 2514") which determines if the current expression is the ternary operator "?:". If the current expression is the question mark operation, processing transfers to evaluate test expression action 2516 (hereinafter "action 2516") which evaluates the test expression of the question mark operation. The test expression is evaluated by calling the expression unit. After the test expression is evaluated, processing transfers to test expression decision 2518 (hereinafter "decision 2518") which examines the truth value of the test expression. If the test expression evaluated to true, processing transfers to evaluate "true" expression action 2520 (hereinafter "action 2520") which evaluates the expression corresponding to a "true" test expression result. Otherwise, processing transfers to evaluate "false" expression action 2522 (hereinafter "action 2522") which evaluates the expression corresponding to a non-true test expression result. After either action 2520 or action 2522, processing according to logic flow diagram 2500, and thus action 2424, terminates.

If the current expression is not the question mark operation, processing transfers to comma operation decision 2524 (hereinafter "decision 2524") which determines if the current expression is the comma operation. If the current expression is the comma operation, processing transfers to evaluate LHS (no return value) action 2526 (hereinafter "action 2526"). Action 2526 evaluates the left-hand side expression of the comma operation. Action 2526 does not want a value returned for the left-hand side expression so it passes a null pointer to the expression unit. After evaluation of the left-hand side expression, processing transfers to evaluate RHS (return value) action 2528 (hereinafter "action 2528") which evaluates the right-hand side expression of the comma operation. Action 2528 needs a return value so it calls the expression unit with a pointer to a location for the result of the expression. After action 2528, processing according to logic flow diagram 2500, and thus action 2424, terminates.

If the current expression is not a comma operation, processing transfers to bit field and field operations decision 2530 (hereinafter "decision 2530") which determines if the current expression is a bit field or a field operation. If the current expression is a bit field or a field operation, that means the operator references a field in a structure and processing transfers to evaluate LHS expression action 2540 (hereinafter "action 2540").

Action 2540 evaluates the left-hand side operand (i.e., the LHS expression) by calling the expression evaluation unit. The left-hand side expression is a pointer to the structure referenced by the bit field or field operation. After the left-hand side expression is evaluated, processing control transfers to value needed decision 2542 (hereinafter "decision 2542").

Decision 2542 determines if the bit field or field operation fetches a value out of the structure. If the operation requires a value then processing transfers to create memory action 2544 (hereinafter "action 2544"); otherwise, processing control transfers to use offset as rhs arg action 2546 (hereinafter "action 2546"). Action 2544 creates memory for the value referenced by the operation. Action 2544 calls memory creation unit 1500 to create a piece of modeled memory large enough to hold the value resulting from the structure reference. After the needed modeled memory is created, processing transfers to action 2546.

Action 2546 prepares to call the operation unit by filling in the argument info block 2600 corresponding to the right-hand side operand with field offset information rather than location information. Argument info blocks 2600 are described below in greater detail. Processing control transfers to evaluate operation action 2538.

If the current expression is not a bit field or a field operation, then processing transfers to evaluate LHS expression action 2532 (hereinafter "action 2532"). If processing control reaches action 2532, then it is known the current expression does not require special case processing and "normal" operation processing begins. Action 2532 evaluates the left-hand side of the current expression. All operations will have at least a left-hand side operand. After the left-hand side expression has been evaluated, processing transfers to binary operation decision 2534 (hereinafter "decision 2534") which determines if the current expression is a binary operation. If the current expression is a binary operation, processing transfers to evaluate RHS expression action 2536 (hereinafter "action 2536") which evaluates the right-hand side of the current expression. Processing transfers to evaluate operation action 2538 (hereinafter "action 2538") either after the right-hand side expression has been evaluated or it has been determined the current expression is a unary operation.

Figure 26:
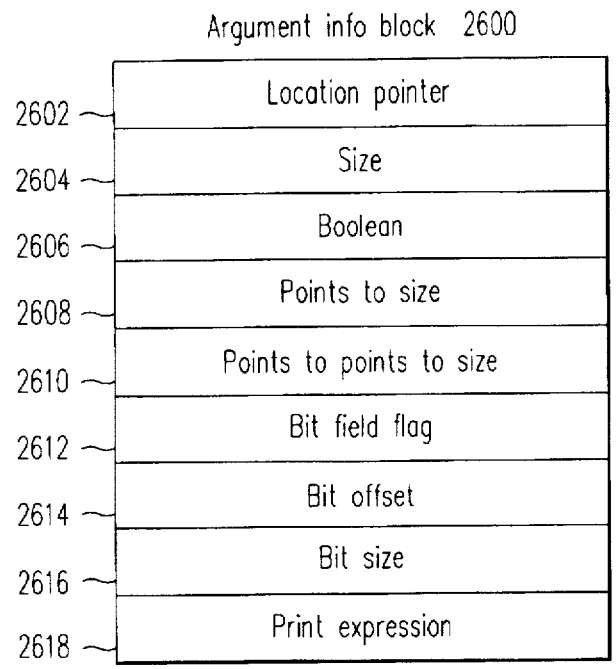
FIG. 26 is an illustration of an argument info block employed by evaluate operation action 2538 of FIG. 25b.

Action 2538 evaluates the operation by calling the operation unit with the operator representing the operation to be evaluated and each operand of the operator packaged in an argument info block 2600 (FIG. 26). As mentioned earlier, when the current expression is a bit field or field operation, the argument info block 2600, corresponding to the right-hand side operand, actually represents an offset into a structure as opposed to a modeled memory location. Argument info block 2600 contains the following fields: "location pointer" 2602, "size" 2604, "boolean" 2606, "points to size" 2608, "points to points to size" 2610, "bit field flag" 2612, "bit offset" 2614, "bit size" 2616 and "print expression" 2618.

Field "location pointer" 2602 is set to the encoded pointer for the modeled memory of the argument corresponding to the instant argument block 2600. Each operand is described by a separate argument block 2600. Field "size" 2604 is set to the size of the memory pointed to by field "location pointer" 2602. Some operations return a boolean value and the returned boolean value is stored in field "boolean" 2606. Field "points to size" 2608 holds the size of whatever is pointed to by the value in the modeled memory location pointed to by field "location pointer" 2602. Field "points to points to size" 2610 holds the size of whatever is pointed to by the value in the location pointed to by the value referenced by field "location pointer" 2602. Flag "bit field flag" 2612 is on when the location pointed to by field "location pointer" 2602 is a bit field. Field "bit offset" 2614 indicates the starting point of the bit field. Field "bit size" 2616 holds the size in bits of the bit field. Field "print expression" 2618 stores, in printable format, the expression containing the value described in argument info block 2600.

After returning from the operation unit, processing according to logic flow diagram 2500, and thus action 2424, terminates. Upon termination, action 2424 transfers processing to action 2428 (FIG. 24).

Figure 27:
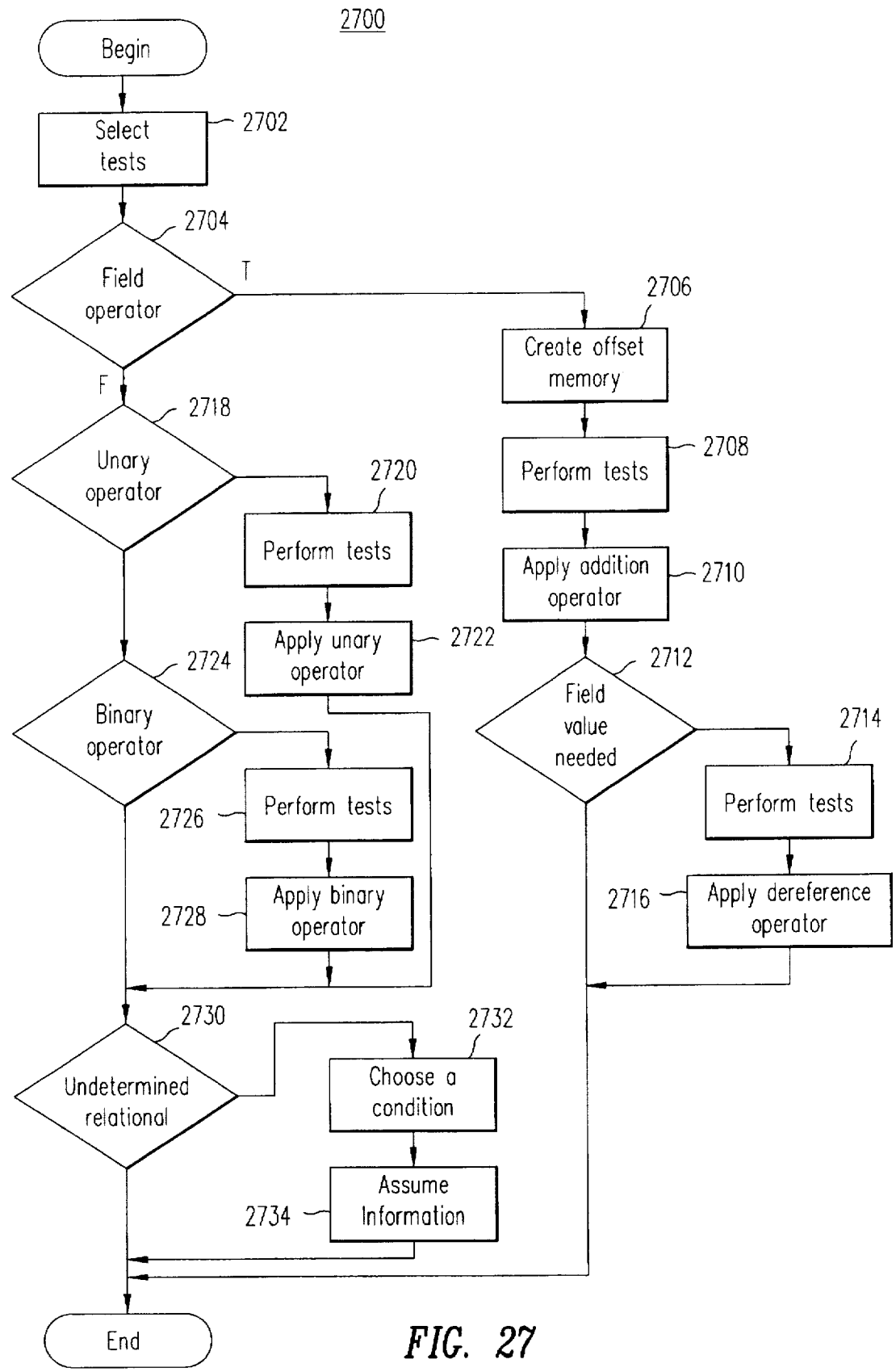
FIG. 27 is a logic flow diagram of one embodiment of the operation unit of this invention.

The operation unit is illustrated in logic flow diagram 2700 (FIG. 27). In general, the operation unit executes a built-in model to determine the result of the operation. A built-in model is analogous to a model 118. Tests are performed, similar to a model constraint, that make sure whatever must be true for the operation to be performed is true. Then results are generated, similar to a model result, which describe what is known to be true after the operation is executed. The operation unit always returns the location of a result. It is possible that the returned location will be null.

Operation unit processing begins with select tests action 2702 (hereinafter "action 2702"). In one embodiment of the present invention, operation unit processing is performed by a routine. In the embodiment of Microfiche Appendix A, the routine "ins_evaluate_operation" performs operation unit processing.

Action 2702 selects the tests to be performed for the operation being evaluated. The tests available to be performed are "comparable", "valid_pointer", "initialized", and "non_zero". The "comparable" test determines if two pointers point into the same stored value set. Because analysis engine 308 does not duplicate memory exactly, two pointers can only be compared if they point into the same piece of modeled memory. The "valid_pointer" test determines if the location contains a valid pointer—a pointer to a currently used piece of modeled memory. The "initialized" test determines if there is a value in the given location. The "initialized" test looks at the stored value block 1800 corresponding to the location and checks flag "initialized flag" 1808 to determine if the value is initialized. The "non_zero" test determines if a location contains a value other than the constant zero. This test is used to screen for a divisor that equals zero. For each operation, the tests applied and the operands the tests are applied against are listed in Appendix C.

After the proper tests are selected processing transfers to field operator decision 2704 (hereinafter "decision 2704"). Decision 2704 determines if the operator being analyzed is a bit field or field operator. If the operator being analyzed is a field operator, then processing transfers to create offset memory action 2706 (hereinafter "action 2706"); otherwise, processing transfers to unary operator decision 2718 (hereinafter "decision 2718").

Action 2706 creates a piece of modeled memory to hold the offset in the field structure that is stored in the argument info block 2600 corresponding to the right-hand side argument. The offset is stored into the newly created modeled memory location. Processing transfers to perform tests action 2708 (hereinafter "action 2708").

Action 2708 performs the tests selected in action 2702. For each test to be performed, action 2708 calls the vim primitive test unit with the operator being analyzed, the argument info block 2600 corresponding to the operand being tested, and a condition variable which will report if the test was successful or not. The vim primitive test unit queries the memory model to perform the indicated test. The vim primitive test unit is described below in more detail. After all the tests selected have been performed, processing transfers to apply addition operator action 2710 (hereinafter "action 2710").

Action 2710 evaluates the pointer addition operator by calling the vim primitive evaluate unit with the operator being analyzed, the argument info block 2600 corresponding to the left-hand side operand (i.e., the location of the structure), the argument info block 2600 corresponding to the right-hand side operand (i.e., the location of the offset into the structure), a pointer to the result location and the condition variable to hold the truth value if one is generated by the operation. The vim primitive evaluate unit manipulates the memory model to achieve the result of the indicated operation. The vim primitive evaluate unit is discussed below in more detail. The result of the pointer addition operator is a pointer to the referenced field in the structure. After the addition operation is evaluated processing transfers to field value needed decision 2712 (hereinafter "decision 2712").

Decision 2712 determines if the field operator requires the value of the field. A field operator requires a value when it returns the contents of the referenced field in the structure. If the field value is needed, processing transfers to perform tests action 2714 (hereinafter "action 2714"); otherwise, processing according to logic flow diagram 2700, and thus the operation unit, terminates.

Action 2714 performs the tests selected in action 2702 in a manner similar to action 2708. After the tests have been performed processing transfers to apply dereference operator action 2716 (hereinafter "action 2716"). Action 2716 evaluates the pointer dereference operator by calling the vim primitive evaluate unit with the operator being analyzed, the argument info block 2600 corresponding to the left-hand side operand (i.e., pointer to the referenced field in the structure), a pointer to the result location and the condition variable to hold the truth value if one is generated by the operation. The vim primitive evaluate unit manipulates the memory model to achieve the result of the indicated operation. The pointer dereference operation returns the contents of the referenced field in the structure. After the pointer dereferenced operator is evaluated, processing according to logic flow diagram 2700, and thus the operation unit, terminates.

Decision 2718 determines if the operator being analyzed is a unary operator. If the operator being analyzed is a unary operator, processing transfers to perform tests action 2720 (hereinafter "action 2720"); otherwise, processing falls through to binary operator decision 2724 (hereinafter "decision 2724"). Action 2720 performs the tests selected in action 2702 in a manner similar to action 2708. After all the tests selected have been performed, processing transfers to apply unary operator action 2722 (hereinafter "action 2722"). Action 2722 evaluates the unary operation by calling the vim primitive evaluate unit with the operator being analyzed, the argument info block 2600 corresponding to the left-hand side operand, a pointer to the result location and the condition variable to hold the truth value if one is generated by the operation. After the unary operation is evaluated processing transfers to undetermined relational decision 2730 (hereinafter "decision 2730").

If the operator is not a unary operator then processing transfers to decision 2724 which determines if the operator is a binary operator. If the operator is a binary operator processing transfers to perform tests action 2726 (hereinafter "action 2726"); otherwise, processing falls through to decision 2730. Action 2726 performs the tests selected in action 2702 in the same manner as action 2720. After the tests have been performed processing transfers to apply binary operator action 2728 (hereinafter "action 2728").

Action 2728 evaluates the binary operation by calling the vim primitive evaluate unit with the operator being analyzed, the argument info block 2600 corresponding to the left-hand side operand, the argument info block 2600 corresponding to the right-hand side operand, a pointer to the result location and the condition variable to hold the truth value if one is generated by the operation. After the binary operation is evaluated processing transfers to decision 2730.

Decision 2730 checks to see if the evaluated operation was a relational operation that evaluated to the "don't know" value. One consequence of modeled memory not being an exact duplicate of real memory is that modeled memory uses three valued truth logic. A truth value in modeled memory can be either "true", "false" or "don't know". The "don't know" condition results from an incomplete knowledge of true memory. If the operation resulted in a "don't know" condition then the three valued truth logic of modeled memory must be converted to two value truth logic. If decision 2730 resolves to true then processing transfers to choose a condition action 2732 (hereinafter "action 2732"). Action 2732 chooses a condition by calling CPH choose condition unit. CPH choose condition unit is described below in more detail. Once a choice is made, action 2732 sets flag "assumed value flag" 1810 on (true) in the stored value block 1800 corresponding to the location. Processing transfers to assume information action 2734 (hereinafter "action 2734").

Whenever a choice is made in action 2732, modeled memory must be updated to indicate the implications of that choice. Choosing an expression result has ramifications for the operands used in that expression. For example consider the code sample below.

```
f (int i)
{
    if(i == 0)
        return i;
}
```

If no information is known about the variable i, then the evaluation of i equivalent to zero will return a "don't know" value. The value "don't know" is returned by the vim primitive evaluate unit because there is no information to make a comparison between the variable i and the constant zero. If the choice is made to assume i is equivalent to zero then, to ensure consistent usage of the variable i in future statements along the code path, memory must be updated to reflect that i is equal to zero. Action 2734 calls the vim assume unit to properly update modeled memory. The vim assume unit is described below in detail. Upon return from the vim assume unit, processing according to logic flow diagram 2700, and thus the operation unit, terminates. Upon termination, processing control is returned to the site control originated from.

Choosing a condition to resolve a choice point is performed by the CPH choose condition unit. The CPH choose condition unit is illustrated in logic flow diagram 3300 (FIG. 33). Processing begins with choice made decision 3302 (hereinafter "decision 3302"). Decision 3302 determines if the choice to be made corresponds to a part of the path constructed in action 1108. If the choice to be made is already represented by a choice point on the path determined in action 1108 then processing transfers to take choice action 3304 (hereinafter "action 3304"). Action 3304 makes the choice directed by the path constructed in action 1108 and processing according to logic flow diagram 3300, and thus the CPH choose condition unit, terminates.

If decision 3302 returns a false, then no choice has been predetermined and processing transfers to random choice action 3306 (hereinafter "action 3306"). Recall that the unresolved choice point the CPH choose condition unit was called to resolve corresponds to a choice point node. Also, the possible resolutions of the unresolved choice point correspond to choice edges emanating from that choice point node. Action 3306 picks a result (a choice) by making a random selection among the unvisited choice edges. After the selection is made, processing transfers to update CPH tree action 3308 (hereinafter "action 3308").

Action 3308 marks the edge choice selected in the choice point node. If this choice point node is not already on the CPH tree than action 3308 inserts it into the tree. After the CPH tree has been updated, processing according to logic flow diagram 3300, and thus the CPH choose condition unit, terminates. Upon termination, processing control returns to the site control originated from. In one embodiment of the present invention, the CPH choose condition unit is performed by a routine. In the embodiment of Microfiche Appendix A, the "cph_choose_condition" routine performs CPH choose condition unit processing.

Figure 28:
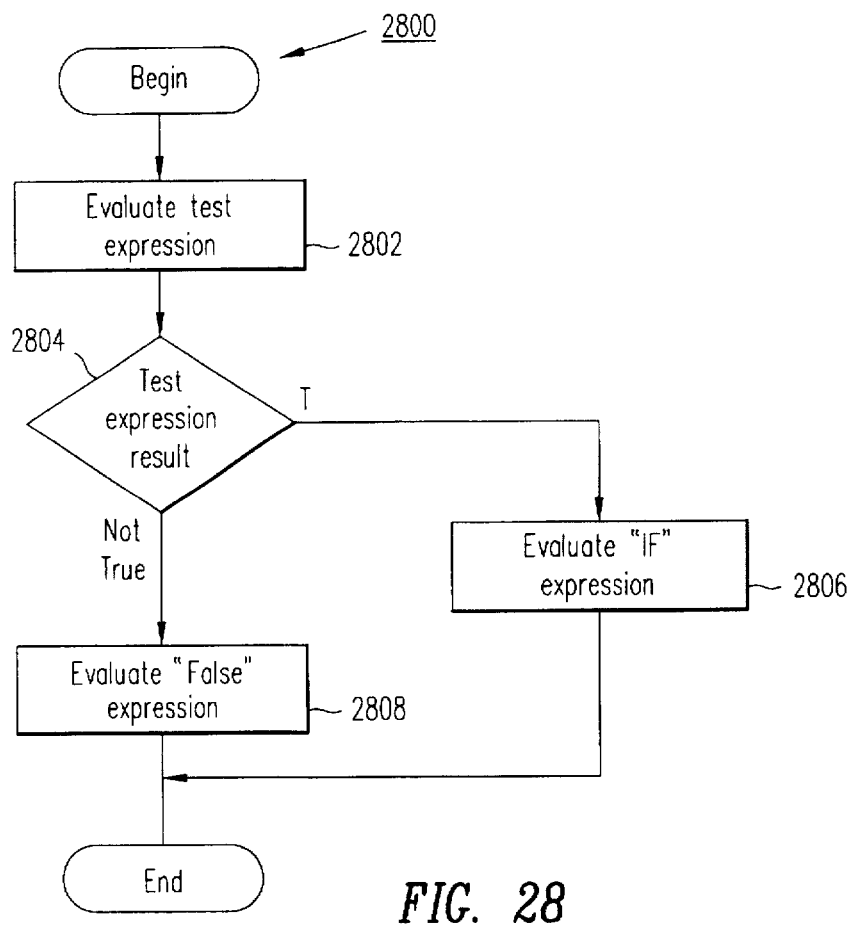
FIG. 28 is a logic flow diagram of one embodiment of the if-else unit of this invention.

The if-else unit processes the if-else statement. The if-else unit is shown in greater detail as logic flow diagram 2800 (FIG. 28). If-else unit processing begins with evaluate test expression action 2802 (hereinafter "action 2802"). Action 2802 evaluates the test expression of the if-else statement. As discussed earlier, an expression is evaluated by calling the expression unit (action 2402). After the test expression is evaluated, processing transfers to test expression result decision 2804 (hereinafter "decision 2804") which examines the result of the test expression. If the test expression evaluated to true, processing transfers to evaluate "if" expression action 2806 (hereinafter "action 2806") which evaluates the if expression. Otherwise, processing transfers to evaluate "false" expression action 2808 (hereinafter "action 2808") which evaluates the false expression. Processing in logic flow diagram 2800, and thus the if-else unit, terminates after either action 2806 or 2808. Upon termination, the if-else unit transfers control to the site control originated from.

Figure 29:
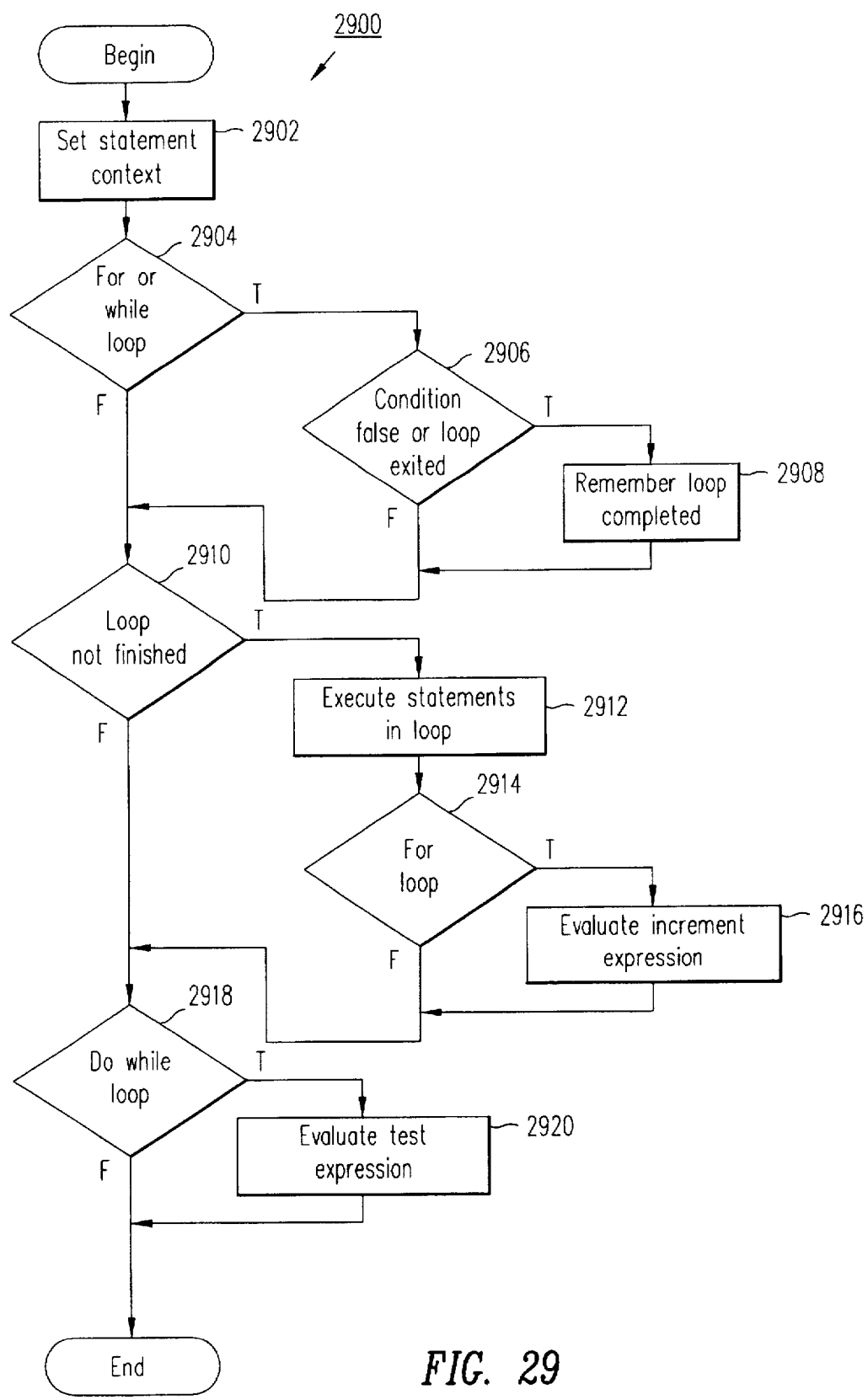
FIG. 29 is a logic flow diagram of one embodiment of the loop execution unit of this invention.

The while loop, do while loop, and for units all call the loop execution unit to perform processing for their corresponding statements. The only difference between the three units is that the for unit evaluates an initialization statement prior to calling the loop execution unit. The for unit evaluates the initialization statement by transferring processing control to action 1208. The loop execution unit is shown in greater detail as logic flow diagram 2900 (FIG. 29). In one embodiment of the present invention, the loop execution unit is performed by a routine. In the embodiment of Microfiche Appendix A, the routine "exe_loop" performs loop execution unit processing.

Loop execution unit begins processing with set statement context action 2902 which updates field "current statement" 2110 in the execution context block 2100 to point to the loop statement. Processing transfers to for or while loop decision 2904 which determines if the current statement is a for or while loop. If the current statement is a for or while loop, processing transfers to condition false or loop exited decision 2906 (hereinafter "decision 2906"). Otherwise, processing falls through to loop not finished decision 2910 (hereinafter "decision 2910").

Decision 2906 evaluates the test condition expression by calling the expression evaluation unit. Decision 2906 determines if the condition is false or the loop has exited. Basically, this means the test is evaluated before the body of the loop. If the loop condition is false or the loop has exited, processing transfers to remember loop completed action 2908 which turns a loop finished flag on to remember the loop has completed. Otherwise, processing transfers to decision 2910.

Decision 2910 queries the loop finished flag to determine if the loop has completed. If the loop has not completed processing transfers to action 2912. Otherwise, processing transfers to do while loop decision 2918 (hereinafter "decision 2918"). Action 2912 executes all the statements in the loop body. Each statement is executed by calling action 1208. When each statement in the loop body has been executed, processing transfers to for loop decision 2914 which determines if the current statement is a for loop. If the current statement is a for loop, processing transfers to action 2916 which evaluates the increment expression by calling the expression unit. After the increment expression has been evaluated, or if the current statement is not a for loop, processing transfers to decision 2918.

Decision 2918 determines if the current loop is a do while loop. If the current loop is a do while loop processing transfers to evaluate test expression action 2920 which evaluates the loop test expression by calling the expression unit. In the case of a do while loop, the test is evaluated after the body of the loop. After the final test expression has been evaluated or if the current loop is not a do while loop, processing according to logic flow diagram 2900, and thus the loop execution unit, terminates. The loop execution unit simulates only one execution of a loop body. Upon termination the loop execution unit returns control to the site control originated from.

Figure 30A:
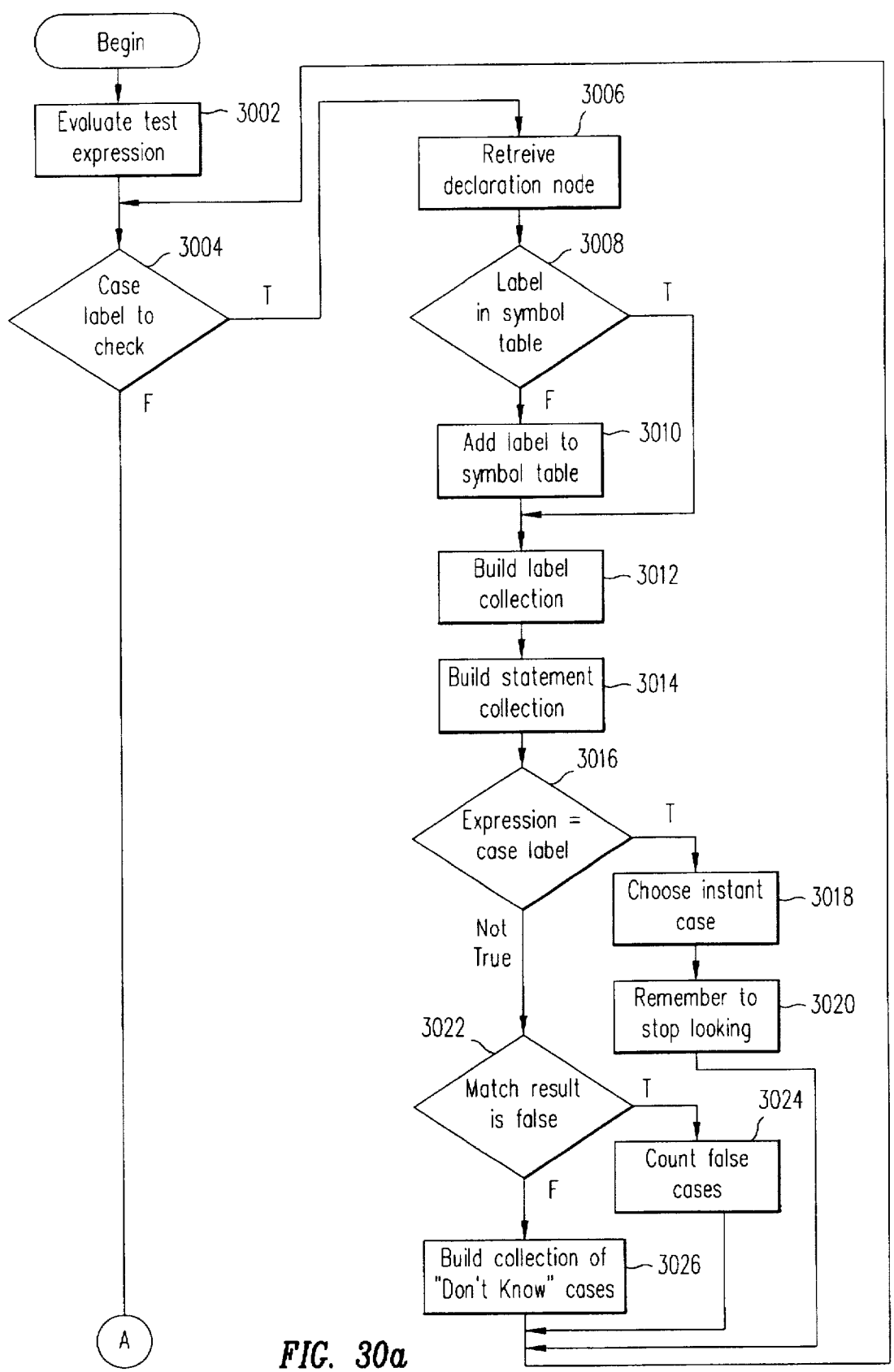
FIG. 30a is a logic flow diagram of part of one embodiment of the switch unit of this invention.
Figure 30B:
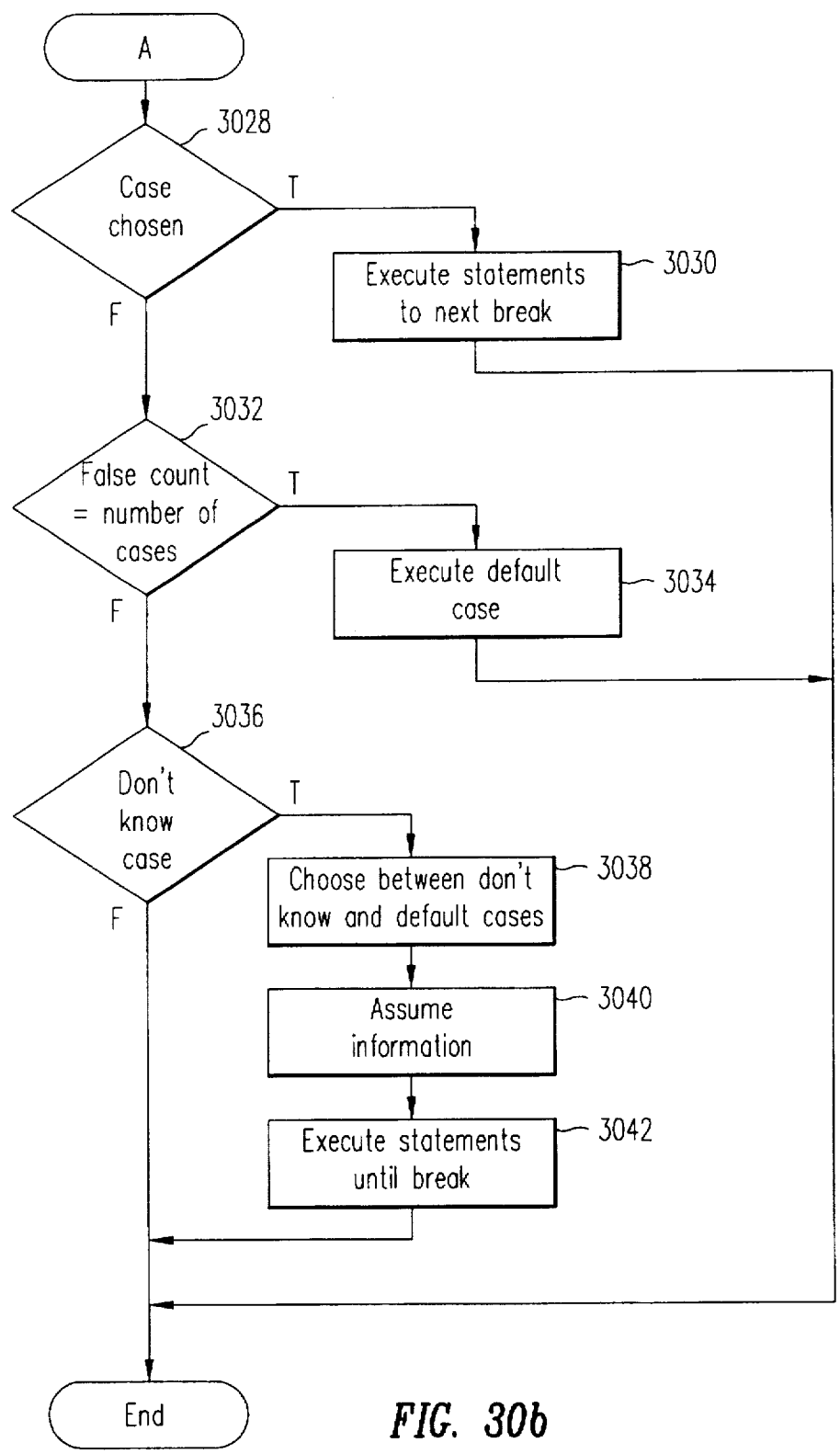
FIG. 30b is a logic flow diagram completing the description begun in FIG. 30a of the switch unit.

The switch unit processes switch statements. The switch unit is illustrated in logic flow diagram 3000 (FIGS. 30a, 30b). Switch unit processing begins with evaluate test expression action 3002 which evaluates the switch test expression. The switch test expression is evaluated through a call to the expression unit. Control transfers to case label to check decision 3004 which determines if any more case labels have to be examined and if there are any more case labels left to check. If there is still a need to examine case labels and there are still more to check, processing transfers to retrieve declaration node action 3006 (hereinafter "action 3006"); otherwise, processing transfers to case chosen decision 3028 (hereinafter "decision 3028").

Action 3006 retrieves the declaration node for the next case label to process. Processing transfers from action 3006 to label in symbol table decision 3008 which determines if the case label is in the symbol table. If the case label is in the symbol table, processing transfers to build label collection action 3012 (hereinafter "action 3012"). Otherwise, processing transfers to add label to symbol table action 3010 (hereinafter "action 3010") which adds the case label to the symbol table.

Action 3010 creates a symbol table entry 1300 to represent the case label. The newly created symbol table entry 1300 is then stored in the symbol table. Processing transfers from action 3010 to action 3012. Action 3012 stores the case label into a label collection to build a collection of all the case labels reviewed. Processing transfers from action 3012 to build statement collection action 3014 which builds a collection of pointers to the first statement in a case. There is one pointer for each case label reviewed. After the statement collection is updated, processing transfers to expression equal case label decision 3016 (hereinafter "decision 3016").

Decision 3016 matches the result of the switch test expression with the case label. If the result of the switch test expression is equal to the case label then processing transfers to choose instant case action 3018 (hereinafter "action 3018"). Action 3018 indicates that the statements corresponding to the instant case label are to be executed. Processing transfers to remember to stop looking action 3020 (hereinafter "action 3020") which sets a flag to indicate no more case labels should be checked. Processing transfers from action 3020 to decision 3004.

If the result of the switch test expression was not equal to the instant case label then processing transfers to match result is false decision 3022 which determines if the match returned false. When the match returned false, processing transfers to count false cases action 3024 (hereinafter "action 3024") which counts the number of false matches. If the equality of the result of the switch test expression and the case label could not be determined, processing transfers to build collection of "don't know" cases action 3026 (hereinafter "action 3026"). Action 3026 adds the instant case label into a collection of case labels that corresponds to all the cases in which decision 3016 could not determine a result. Processing transfers from action 3024 and action 3026 to decision 3004.

Case chosen decision 3028 determines if a case has been chosen. If a case has been chosen, processing transfers to execute statements to next break action 3030 which executes the statements in the chosen case until the next break statement is reached. Statements are executed by calling action 1208. Once all the statements in the case are executed processing according to logic flow diagram 3000, and thus the switch unit, terminates.

If a case has not yet been chosen, processing transfers to false count equals number of cases decision 3032 which determines if the count of false cases equals the number of cases in the switch statement. If the-count of false cases equals the number of cases, that means none of the case labels match the switch test expression result and processing transfers to execute default case action 3034 (hereinafter "action 3034) which executes the statements in the default case. The statements are executed by calling action 1208. Once action 3034 completes, processing according to logic flow diagram 3000, and thus the switch unit, terminates. If the count of false cases does not equal the number of cases in the switch statement, processing falls through to don't know case decision 3036 (hereinafter "decision 3036").

Decision 3036 determines if there is a label in the collection of "don't know" cases. If there is a label in the "don't know" case, processing transfers to choose between don't know and default cases action 3038 (hereinafter "action 3038"). Otherwise, processing in the switch unit terminates.

Action 3038 chooses a case to execute among the "don't know" cases and the default case. Action 3038 determines which case to choose by calling the CPH choose condition unit (FIG. 33). The CPH choose condition unit is discussed above in greater detail. Processing transfers from action 3038 to assume information action 3040 (hereinafter "action 3040") which assumes information based on the choice made in action 3038. Action 3040 is analogous to action 2734 (FIG. 27) of the operation unit. Action 3040 calls the vim assume unit to update modeled memory based on the choice made in action 3038.

Processing transfers from action 3040 to execute statements until break action 3042 which executes the statements in the chosen case until the next break statement is encountered. The statements are executed through a call to action 1208. After the statements are executed, processing according to logic flow diagram 3000, and thus the switch unit, terminates. Upon termination, the switch unit returns processing control to the site control originated from.

The variable initialization unit processes variable initialization statements. The variable initialization unit is illustrated as logic flow diagram 3100 (FIG. 31). Variable initialization unit processing begins in evaluate initialization action 3102 which evaluates the initialization expression. The initialization expression is evaluated by calling the expression unit. After the initialization expression is evaluated, processing transfers to find variable declaration node action 3104 (hereinafter "action 3104") which locates the declaration node for the variable receiving the assigned value. Processing transfers from action 3104 to evaluate assignment action 3106 which evaluates the assignment by calling the operation unit. The operation unit is called with the assignment operator. After the assignment is evaluated, processing according to logic flow diagram 3100, and thus the variable initialization unit, terminates.

The return unit processes return statements. The return unit is illustrated as logic flow diagram 3200 (FIG. 32). The return unit begins processing with return expression decision 3202 which determines if the return statement has an expression. If the return statement does have a return expression, processing transfers to evaluate expression action 3204 (hereinafter "action 3204"). Otherwise, the return unit terminates.

Action 3204 evaluates the expression by calling the expression unit. After the return expression is evaluated, processing transfers to look up return value in symbol table action 3206 (hereinafter "action 3206") which looks up the return value in the symbol table. Action 3206 retrieves field "symbol location" 1308 from the symbol table entry 1300 corresponding to the return value. Processing transfers to evaluate assignment action 3208 (hereinafter "action 3208") which evaluates an assignment of the return expression to the return symbol. Action 3208 is analogous to action 3106 (FIG. 31) of the variable initialization unit. The assignment is evaluated by calling the operation unit with the assignment operator. After the assignment is evaluated, processing according to logic flow diagram 3200, and thus the return unit, terminates.

The label unit processes a label which introduces a statement. A label is an identifier followed by a colon (':'). The term "identifier" is used herein as it is defined in Brian W. Kernighan and Dennis M. Ritchie, *The C Programming Language*, 179 (Prentice-Hall 1978). In one embodiment, the label unit simply performs flow-through processing, such that the label unit transfers processing control to the site control originated from.

The goto unit directs the flow of control of the current path to proceed to the statement indicated in the goto statement (goto "target" statement). The goto unit sets the goto parameter, mentioned earlier, to true. The goto unit retrieves the pointer to the node in the current parse tree structure 304 representing the goto target statement and transfers that pointer along with processing control to action 1208. When control returns to the goto unit processing terminates and the goto unit transfers control to the site control originated from. In one embodiment of the present invention, the goto unit is implemented by a routine. In the embodiment of Microfiche Appendix A, goto unit 2300 is implemented by the "exe_goto_statement" routine.

Virtual Image Object 708

Virtual Image Object 708 builds, updates and examines the memory model. Virtual Image Object 708 is made up of four units: memory creation unit 1500 (previously described), vim primitive test unit, vim primitive evaluate unit and vim assume unit. These four units of Virtual Image Object 708 perform tests and operations on the memory model; these tests and operations are referred to as vim primitives. Vim primitives are not performed directly against stored values of the memory model, but against retrieved copies of the stored values called fetched values. The use of fetched values is analogous to a computer program placing a value in a register prior to manipulating it. Information about one particular use of a vim primitive is collected in a predicate. Predicates can be logged for later use in automodelling. Vim primitives, fetched values, predicates, the primitive evaluate unit and the assume unit are discussed below in more detail.

In one embodiment of the present invention, there are eighteen separate vim primitives. The vim primitives are: true_as_condition, false_as_condition, initialized, valid_or_null_pointer, valid_pointer, invalid_pointer, valid_offset, comparable, incomparable, freeable, freed_memory, new_memory, non_zero, lost, int_to_float, float_to_int, state_eq and state_ne. Vim primitive "true_as_condition"

instructs a vim unit to indicate if the specified location evaluates to "true". Vim primitive "false_as_condition" instructs a vim unit to indicate if the specified location evaluates to a value other than "true". Vim primitive "initialized" instructs a vim unit to indicate if the specified location contains an initial value.

Vim primitive "valid_or_null_pointer" instructs a vim unit to indicate if the specified location contains either a valid pointer, a pointer to a currently used piece of modeled memory, or the null pointer which designates the location does not currently point anywhere. Vim primitive "valid_pointer" instructs a vim unit to indicate if the specified location contains a valid pointer—a pointer to a currently used piece of modeled memory. Vim primitive "invalid_pointer" instructs a vim unit to indicate if the specified location does not contain a pointer to a currently used piece of modeled memory.

Vim primitive "valid_offset" instructs a vim unit to indicate if the specified location contains a valid offset into an identified structure or array. Vim primitive "comparable" instructs a vim unit to indicate if two locations point into the same chunk 1700. Vim primitive "incomparable" instructs a vim unit to indicate if two locations fail to point into the same chunk 1700. Vim primitive "freeable" instructs a vim unit to indicate if the specified location contains memory that is freeable. Vim primitive "freed_memory" instructs a vim unit to free the indicated location. Vim primitive "new_memory" instructs a vim unit to allocate a new location in the memory model.

Vim primitive "non_zero" instructs a vim unit to indicate if the specified location contains a value other than the zero constant. Vim primitive "lost" instructs a vim unit to indicate if the specified location has been marked as lost memory. Vim primitive "int_to_float" instructs a vim unit to convert the value in a specified location from an integer representation to a floating point representation. Vim primitive "float_to_int" instructs a vim unit to convert the value in a specified location from a floating point representation to an integer representation. Vim primitive "state_eq" instructs a vim unit to indicate if the specified location represents a resource in a state equal to the given state. Finally, vim primitive "state_ne" instructs a vim unit to indicate if the specified location represents a resource in a state not equal to the given state.

Figure 34:
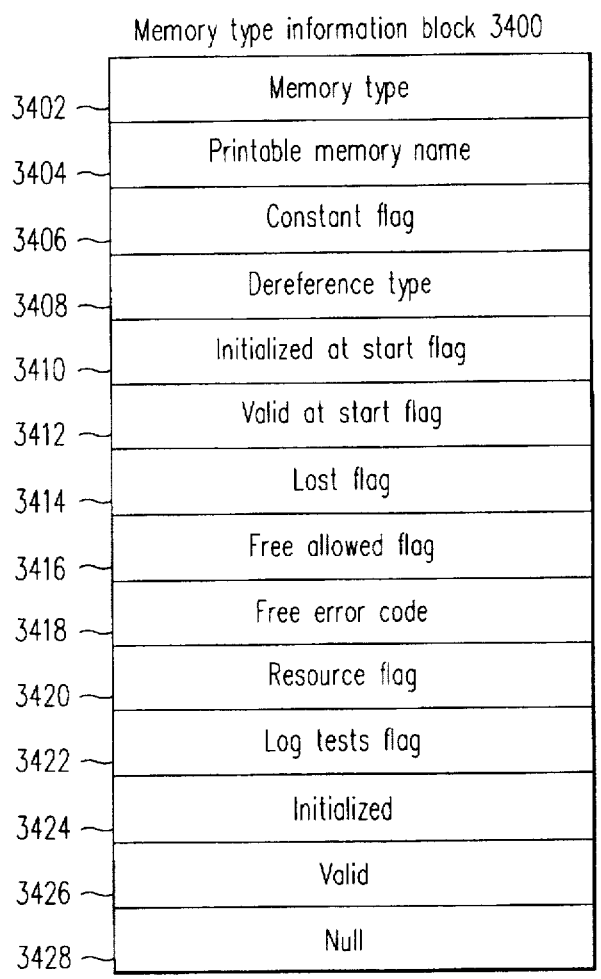
FIG. 34 is an illustration of a memory type information block employed in one embodiment of the present invention.
Figure 36:
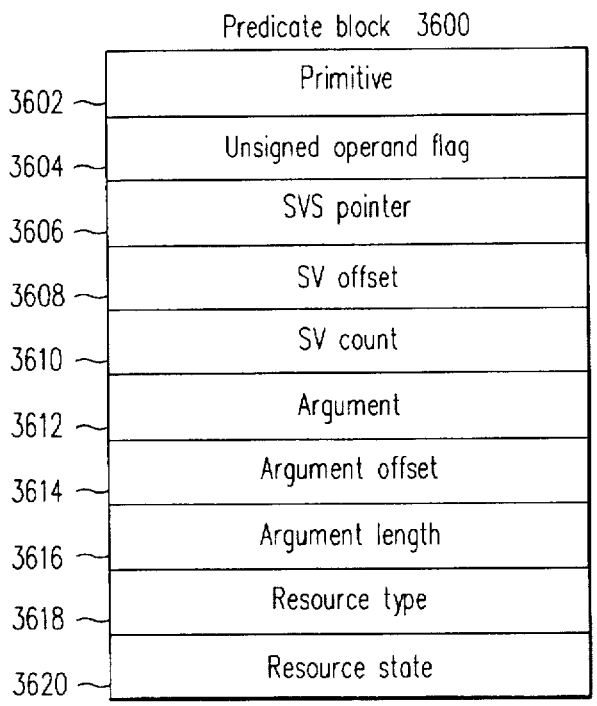
FIG. 36 is an illustration of a predicate block employed in one embodiment of the present invention.

Evaluating vim primitives often requires understanding the particular characteristics of the type of memory modeled by a location. The different types of modeled memory were discussed earlier under the "Memory Creation Unit 1500" heading. For each different type of memory modeled there is a corresponding memory type information block 3400 (FIG. 34). Memory type information block 3400 identifies the particular characteristics of the corresponding memory type. Memory type information block 3400 contains the fields: "memory type" 3402, "printable memory name" 3404, "constant flag" 3406, "dereferenced type" 3408, "initialized at start flag" 3410, "valid at start flag" 3412, "lost flag" 3414, "free allowed flag" 3416, "free error code" 3418, "resource flag" 3420, "log tests flag" 3422, "initialized" 3424, "valid" 3426 and "null" 3428.

Field "memory type" 3402 identifies the type of memory represented by the instant memory type information block 3400 (also referred to as the "instant memory type"). Field "printable memory name" 3404 specifies the name of the instant memory type in printable format. Field "printable memory name" 3404 is used in error message generation. Flag "constant flag" 3406 is set on when the instant memory type is a constant. If a memory type is a constant, locations of that type cannot accept assignments. Field "dereference type" 3408 indicates, when applicable, the type of memory pointed to by the instant memory type.

Flag "initialized at start flag" 3410 is set on when the instant memory type is initialized. Flag "valid at start flag" 3412 is set on when the instant memory type is a valid pointer. Flag "lost flag" 3414 is set on when the instant memory type can be lost. Flag "free allowed flag" 3416 is set on when the instant memory type is permitted to be freed. Field "free error code" 3418, if applicable, specifies the error code generated on freeing the instant memory type.

Flag "resource flag" 3420 is set on when the instant memory type refers to a resource. Flag "log tests flag" 3422 is set on when tests made against locations of the instant memory type must be logged. Field "initialized" 3424 specifies if a location can be identified as initialized from the instant memory type. Field "valid" 3426 specifies if a location can be identified as valid from the instant memory type. Field "null" 3428 specifies if a location can be identified as null from the instant memory type.

Fetched values are used as working copies of values contained in stored values. A fetched value is described by a fetched value block 3500. Fetched value block 3500 is shown in FIG. 35. Fetched value block 3500 contains the fields: "number of bytes" 3502, "exact value known flag" 3504, "exact value pointer" 3506, "predicate collection pointer" 3508, "format of value" 3510, "value as real" 3512, "value as unsigned integer" 3514, "resource type" 3516, "resource state" 3518, "initialized flag" 3520, "valid pointer" 3522, "non-zero flag" 3524, "new predicates flag" 3526, "changed flag" 3528, "assumed flag" 3530, "svs pointer" 3532, "svs offset" 3534, "from location flag" 3536, "location" 3538, "chunk origin" 3540, "memory type" 3542, "sv subset pointer" 3544, "expression pointer" 3546 and "dereference flag" 3548.

Field "number of bytes" 3502 specifies the number of bytes the described value represents. Flag "exact value known flag" 3504 is set on when the described value is completely known. Field "exact value pointer" 3506, when applicable, points to a byte array containing the exact value. The size of the byte array pointed to equals the number contained in field "number of bytes" 3502. Field "predicate collection pointer" 3508 points to a collection of all the predicates that apply to the instant fetched value. Field "format of value" 3510 indicates the type of format of the described value. Field "value as real" 3512, when field "format of value" 3510 indicates a real value, specifies the described value in a real number format. Field "value as unsigned integer" 3514, when field "format of value" 3510 indicates something other than a real value, specifies the described value in an integer format.

Field "resource type" 3516, if applicable, indicates the type of resource associated with the described value. Field "resource state" 3518, if applicable, indicates the state of the resource associated with the described value. Flag "initialized flag" 3520 is set on when the described value is initialized. Field "valid pointer" 3522 indicates if the fetched value is a valid pointer. Flag "non-zero flag" 3524, when true, signals that the fetched value is not the zero constant. Flag "new predicates flag" 3526 indicates if any predicates have been added to the predicate collection pointed to by "predicate collection pointer" 3508. Flag "changed flag" 3528 signals if the fetched value has been changed by any vim primitive. The fetched value must be stored back into the memory model when it is changed by a vim primitive. Flag "assumed flag" 3530 indicates if the fetched value has been assumed by a vim primitive. The fetched value must overwrite the corresponding stored value when it has been assumed by a vim primitive.

Field "svs pointer" 3532 points to the stored value set from which the fetched value originated. Field "svs offset" 3534 contains the starting offset of the fetched value in the stored value set pointed to by field "svs pointer" 3532. Flag 3536 "from location flag" indicates if the contents of the fetched value came from a modeled memory location. Field "location" 3538 points to the location in modeled memory from which the fetched value originated. Field "chunk origin" 3540 points to the origin context structure 1600 pointed to by the chunk 1700 that points to the stored value set pointed to by field "svs pointer" 3532. Field "memory type" 3542 specifies what kind of memory is used by the fetched value.

Field "sv subset pointer" 3544 points to a collection containing a subset of the stored values contained in the stored value set pointed to by field "svs pointer" 3532. Field "expression pointer" 3546 contains a pointer to a node in the current parse tree structure 304 representing the expression containing the fetched value. Flag "dereference flag" 3548 indicates if the fetched value is actually a dereference of the value in the expression indicated by field "expression pointer" 3546.

Predicates store information about a particular application of a vim primitive as applied to a left-hand side operand and potentially a right-hand side operand. A predicate is represented by a predicate block 3600. Predicate block 3600 contains the fields: "primitive" 3602, "unsigned operand flag" 3604, "svs pointer" 3606, "sv offset" 3608, "sv count" 3610, "argument" 3612, "argument offset" 3614, "argument length" 3616, "resource type" 3618 and "resource state" 3620.

Field "primitive" 3602 specifies the type of vim primitive recorded by this predicate. Flag "unsigned operand flag" 3604 indicates if the vim primitive represented by this predicate (referred to as the represented vim primitive) was applied to an unsigned operand. Field "svs pointer" 3606 points to the stored value set corresponding to the value the represented vim primitive applies to. Field "sv offset" 3608 specifies the offset of the first stored value in the stored value set pointed to by "svs pointer" 3606 that the represented vim primitive applies to. Field "sv count" 3608 specifies the number of stored values the represented vim primitive applies to. Field "argument" 3612, if applicable, points to the right-hand side operand of the predicate. Field "argument offset" 3614 specifies the first stored value for the right-hand side operand. Field "argument length" 3616 specifies the number of stored values used to represent the right-hand side operand. Field "resource type" 3618 indicates the type of resource when the vim primitive is a resource primitive. Field "resource state" 3620 indicates the resource state when the vim primitive is a resource primitive.

The vim primitive test unit performs tests against the contents of the memory model. Appendix D contains pseudo code of one embodiment used to implement the vim primitive test unit. The vim primitive evaluate unit updates the memory model to reflect the effect of evaluating the specified operation. Appendix D contains pseudo code of one embodiment used to implement the vim primitive evaluate unit. The vim assume unit updates the memory model to reflect the consequences of resolving an unresolved choice point with CPH choose condition unit. Appendix D contains pseudo code of one embodiment used to implement the vim assume unit.

Fault Indicator Object 712

Figure 37:
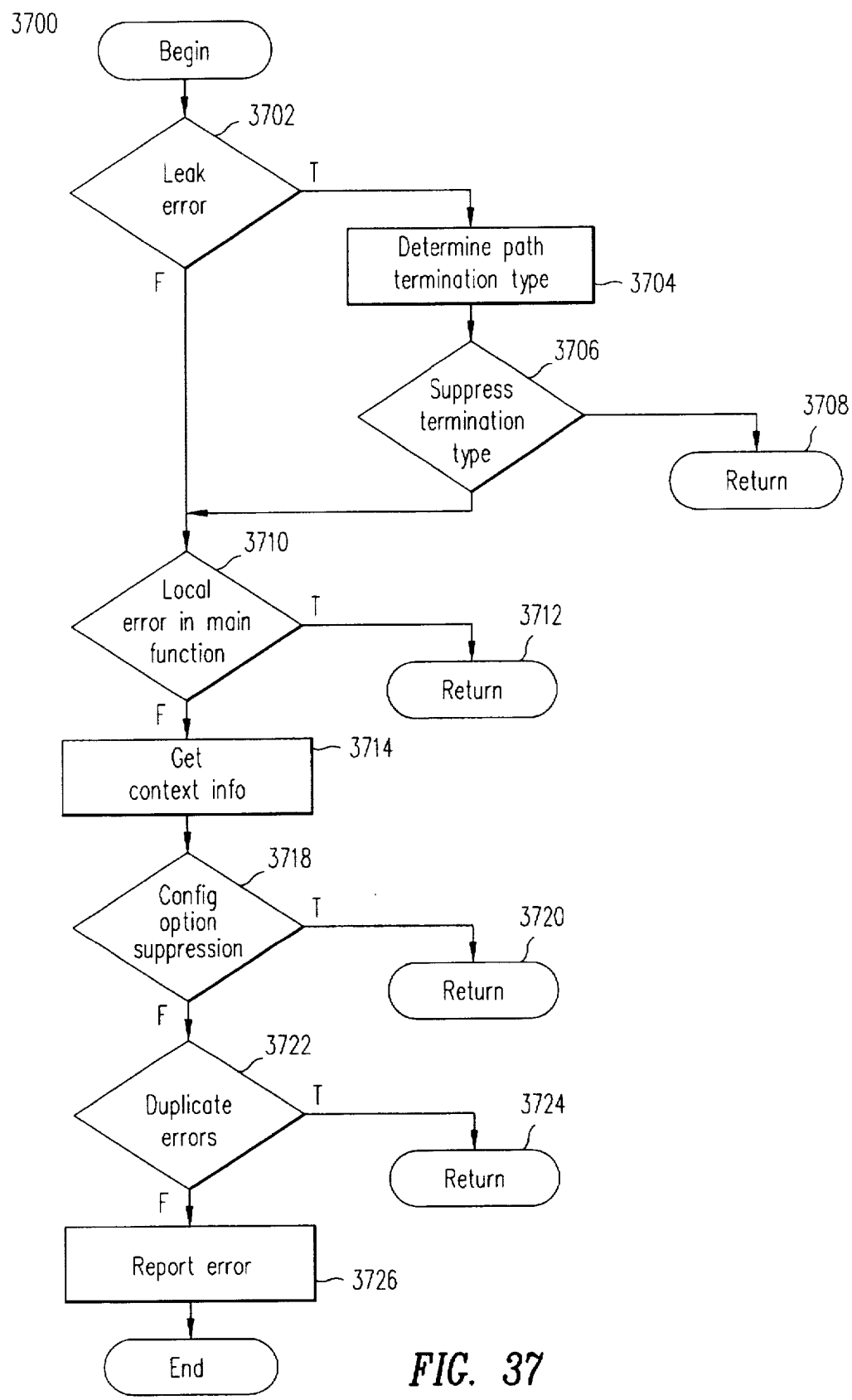
FIG. 37 is a logic flow diagram of one embodiment of the error generation unit of this invention.

Fault indicator object 712 produces fault indicators 106 to report the programming errors detected by analyzer 202. Fault indicator object 712 processing is performed by the error generation unit. The error generation unit is shown in greater detail as logic flow diagram 3700 (FIG. 37). In the embodiment of FIG. 37, fault indicators 106 are in the form of error messages.

Processing in the error generation unit begins with leak error decision 3702 (hereinafter "decision 3702") which determines if the programming error detected is a memory or resource leak. If the error is a leak then processing control will transfer to determine path termination type action 3704 (hereinafter "action 3704"); otherwise, processing control falls through to local error in main function decision 3710 (hereinafter "decision 3710").

Action 3704 determines how the path that produced the leak terminated. A path can terminate in one of three ways: on exit, on longjump or on return. Once the type of path termination is discovered, processing control transfers to suppress termination type decision 3706 (hereinafter "decision 3706"). Decision 3706 determines if a configuration option has been set to suppress leak errors on paths terminated in the manner of the path that produced the leak. If such a configuration option has been set, then processing transfers to return 3708 which terminates processing according to logic flow diagram 3700. Thus, the error generation unit terminates without producing an error message. The configuration options that effect reporting of leak errors are "leaks_on_exit", "leaks_on_longjmp" and "leaks_on_ return". More information on configuration options is presented in Appendix B. If no configuration options are set to suppress the leak error message, then processing transfers to decision 3710.

Decision 3710 determines if the current function name is "main" and the function is returning a pointer to memory local to the "main" function. In such a case (decision 3710 resolves to true), processing transfers to return 3712 which terminates processing according to logic flow diagram 3700. Thus, the error generation unit terminates without producing an error message. When decision 3710 resolves to false, processing control transfers to get context info action 3714 (hereinafter "action 3714").

Action 3714 collects the context information that will be used to fill out the error message generated. The context information allows a user to locate the programming error in the code. Action 3714 determines the file name of the file that contains the faulty function and the line number within the function where the error was detected. Action 3714 also collects the name of function in error, the number of the path in which the error occurred and the expression which contains the error. If the error occurred during emulation of a function, action 3714 collects the name of the emulated function, the name of the file containing the emulated function, and the number of the line in that file corresponding to the line in the emulated function where the error was detected. After data collection in action 3714 completes, processing transfers to config option suppression decision 3718 (hereinafter "decision 3718").

Decision 3718 determines if a configuration option has been enabled that prevents the reporting of the detected error. When such a configuration option is specified (decision 3718 resolves to true), processing transfers to return 3720 which terminates processing according to logic flow diagram 3700. Thus, the error generation unit terminates without producing an error message. The relevant configuration options are "report" which directs the production of only specific error messages and "suppress" which directs the suppression of specific error messages. More information on particular configuration options is presented in Appendix B. When decision 3718 resolves to false, processing control transfers to duplicate errors decision 3722 (hereinafter "decision 3722").

Decision 3722 determines if the detected error is a duplicate of a previously reported error. There are three different ways in which an error is classified a duplicate error. First, an error is a duplicate if a previous error occurred in the same filename and statement. Second, an error is a duplicate if it is the missing model error for a previously reported missing model. Third, an error is a duplicate if the stored value set causing the detected error is the same stored value set that caused a previously reported error. When the detected error is a duplicate error (decision 3722 resolves to true), processing transfers to return 3724 which terminates processing according to logic flow diagram 3700. Thus, the error generation unit terminates without producing an error message. When decision 3722 resolves to false, processing control transfers to report error action 3726 (hereinafter "action 3726").

Action 3726 prints an error message corresponding to the type of detected error. Prior to printing, the error message is filled in with the context information collected in action 3714. After the error message is printed, processing according to logic flow diagram 3700, and thus the error generation unit, terminates. Upon termination, the error generation unit returns processing control to the site control originated from.

Automodelling
General Information

A model 118 is a summary representation of the behavior of a corresponding function. A model 118 contains only the function's externally visible behavior, that is, the behavior seen by the function's callers.

When analyzing a function that calls another, analyzer 202 uses a model of the called function to determine its behavior. This greatly simplifies and speeds up analysis; analyzer 202 doesn't need the source code of the called function, and doesn't need to take the time to analyze it.

Models are automatically generated by analyzer 202. As it analyzes a function it remembers what the function does, and when it is finished analyzing the function it constructs the function's model 118.

The analyzer reads and writes models 118 in a special modelling language, described in Appendix G. Users can also write models 118 in that language; this is done for functions for which there is no source, and thus which cannot be analyzed and automatically modeled.

Modelling Concepts

There are five basic modelling concepts: externs, constraints, results, outcomes and guards.

Externs are simply the variables in a function that can be seen outside of it. Specifically these are parameters, globals, and statics. Since a model 118 encapsulates only externally visible behavior, these are the only variables that can appear in a model 118.

Constraints are conditions that must be true when a function is entered. If, for example, a function assumes that one of its parameters is a valid pointer, then the function's model 118 will contain a constraint requiring that. The constraint will be tested when the function is called and the model 118 evaluated, and if the constraint does not hold, then analyzer 202 will report an error.

Results are, in contrast to constraints, conditions that are true when the function returns. If a function returns zero, for example, that would be a result. Results are then used by analyzer 202 in further analysis. If the return value of a called function were then assigned to a variable, for example, the return result of the called function's model 118 would be assigned to the variable during analysis.

Outcomes are the cases that a function is divided into. Most functions contain conditionals (if-thens, switches, for loops, etc.), and this conditional execution must be represented in models 118—otherwise every modeled function would do the same thing every time it was called. On the other hand, models 118 need to be simpler than the functions they model—otherwise they would be no faster to evaluate then the function itself. A function is divided into cases based on the value it returns; each of these cases is an outcome. The function malloc, for example, returns a pointer to allocated memory if it succeeds, and a 0 (NULL) if it fails; the model for malloc has two outcomes. More generally, analyzer 202 divides return values into the following cases:

the function returns zero;

the function returns one;

the function returns minus one;

the function returns a value not restricted to one of the above three;

the return value is unknown;

the function does not return a value (for void functions);

the function longjumps; and the function exits.

These outcome types were chosen because they represent reasonable tradeoffs between speed (few outcome types) and completeness of information (many outcome types).

When a model has more than one outcome analyzer 202 must choose which outcome to use. Often this choice is based on input values. Guards are the mechanism used to represent these choices. For example, the following function has two outcomes: returns-one and returns-zero.

```
int f (int i)
{
    if(i == 0)
        return 1;
    else
        return 0;
}
```

This function only returns one if the parameter is zero, and only returns zero if the parameter is nonzero. Each outcome will have a guard embodying the proper condition.

The guards have exactly the same form as constraints, but their meaning is different. A constraint means "if this outcome is chosen and the condition in the constraint does not hold then report an error;" a guard means "if the condition in the guard does not hold then do not choose this outcome." If the condition cannot be evaluated (for example if the value of i above is not known), then a condition is assumed (here, a value for i) and an outcome chosen.

The Automodeller

The automodeller constructs a model 118 as a function is analyzed. At the end of each path through the current function, during action 1216, structures in the memory model are scanned to determine the tests performed on each external, which determine the constraints and guards, and the changes made to each external (such as assignment), which determine the results. These constraints and results are packaged into an outcome. At the end of analysis for the current function, within action 1114, all the individual path outcomes are scanned, extraneous operations are removed, and duplicate outcomes are eliminated. The individual outcomes are then packaged into the current function's model, along with the lists of the externs. Appendix E contains pseudo code for one embodiment used to implement the automodeller.

The computer program in Microfiche Appendix A was compiled and linked, in one embodiment, using the UNIX Solaris 2.5® operating system, and the SPARCworks™ 3.0.1 compiler and linker that are provided with a workstation such as the Sun SPARCstationm™ 5 computer system available from Sun Microsystems of Mountain View, Calif. In a second embodiment, the computer program in Microfiche Appendix A was compiled and linked using the Microsoft Visual C++ 4.0 integrated development environment available from Microsoft Corporation of Redmond, Wash. and which can be used on a personal computer using Microsoft Windows NT™3.5.1, which is also available from Microsoft Corporation. Such a personal computer is the Gateway G6-2000 available from Gateway 2000 Inc. of North Sioux City, S. Dak. The particular computer language to which the computer program in Microfiche Appendix A conforms and the computer system on which a computer process defined by the computer program of Microfiche Appendix A is executed are not an essential aspect of this invention. In view of this disclosure, those skilled in the art can implement the invention using a different computer language and/or a different computer system.

The above description is illustrative only and is not limiting. For example, while the disclosed embodiment analyzes functions according to the C computer language, the principles of the present invention are applicable to other computer instruction protocols including, without limitation, those described above. The present invention is limited only by the claims which follow.

APPENDIX B

OPTION DESCRIPTIONS

The following list describes all the configuration options sorted alphabetically. Each option has a default value, which is shown together with an example of use.

automodel_directory   Default = *Current Working Directory/Auto* specifies the directory where new, generated models are written when analysis is complete. By default, analyzer 202 creates a subdirectory named *Auto* in the current directory wherever it runs. You can use the default models subdirectory, *Auto*, or specify a different location using the automodel option. You specify the pathname as absolute or relative to the current working directory.

If you use this option to designate that models get written to a certain directory, set model_generate to *true* (the default) otherwise, nothing is written. Also make certain that you have write access to the directory you specify.

| Option Value | Description |
|---|---|
| *pathname* | the pathname for the models directory |

Sample Usage: automodel_directory = /mymodels - creates a models subdirectory in the mymodels directory.

leaks_on_exit   Default = *None* specifies the type of leak, for example a resource leak or a memory leak, that is reported at program exit.

| Option Value | Description |
|---|---|
| *all* | checks for all types of leaks |
| *resource* | checks for resource leaks |
| *memory* | turns off checking for all types of leaks |
| *none* | turns off checking for all types of leaks |

Sample Usage: leaks_on_exit = all leaks_on_longjmp   Default = *All* specifies the type of leak, for example, a resource leak or a memory leak, to report after calls to the longjmp function.

| Option Value | Description |
|---|---|
| *all* | checks for all types of leaks |
| *resource* | checks for resource leaks |
| *memory* | checks for memory leaks |
| *none* | turns off checking for all types of leaks | leaks_on_return　　　　　　　　　　　　　　　　Default = *All* specifies the type of leak, for example a resource leak or a memory leak, that analyzer 202 reports when the program returns from a function.

| Option Value | Description |
|---|---|
| *all* | checks for all types of leaks |
| *resource* | checks for resource leaks |
| *memory* | checks for memory leaks |
| *none* | turns off checking for all types of leaks |

Sample Usage: leaks_on_return = resource maximum_errors　　　　　　　　　　　　　　　　Default = *All* specifies the total number of errors to report. When the maximum level is reached, analysis stops.

| Option Value | Description |
|---|---|
| *integer* | the value can be any trigger |

Sample Usage: maximum_errors = 300 maximum_file_errors　　　　　　　　　　　　　　Default = *50* specifies the maximum number of errors to report per file. When the maximum level is reached, analysis stops. If you do not specify a scope, all files use this setting.

| Option Value | Description |
|---|---|
| *integer* | the value can be any integer |

Sample Usage:

maximum_file_errors = 75　　(not scoped)

-98-

```
                    maximum_file_errors = 75:file(file1.c)
                                                (scoped)
``` maximum_function_errors                                Default = 50 specifies the maximum number of errors to report
   per function. When the maximum level is reached,
   analysis stops. If you do not specify a scope,
   all functions use this setting.

| Option Value | Description |
   |---|---|
   | *integer* | the value can be any integer |

```
       maximum_file_errors = 150     (not scoped)

maximum_file_errors = 150:file(file1.c)
                                         (scoped)
``` maximum_paths                                          Default = 200 sets a limit on the amount of analysis performed
   for each function. Analyzer 202 automatically
   determines how many execution paths should be
   traced in each function in order to yield good
   coverage for error detection. For large, complex
   functions, this can require many paths that take a
   long time to analyze. You can limit the time
   spent analyzing a function by specifying a maximum
   number of paths. If you specify a maximum, you
   reduce the coverage and make analysis less
   complete, especially for large functions. When
   the maximum level is reached, analysis stops for
   the current function and proceeds to the next
   function.

| Option Value | Description |
   |---|---|
   | *integer* | the value can be any integer |

Sample Usage: maximum_paths = 300 model_generate                                         Default = *true* specifies whether or not generated files are
   written.

| Option Value | Description |
   |---|---|
   | *true* | writes generated files |
   | *false* | does not write generated files |

Sample Usage: model_generate = false model_replace                                          Default = *true* controls the precedence of newly generated
   models 118 versus read-in models 118 during analysis. Read-in models 118 are the product of a preceding analysis done on your code, while newly generated models 118 are created during the current analysis of your code.

This option may be useful when a stable read-in version of a model 118 might be more appropriate. For example, if a function is in the process of being re-implemented and its interface is to remain the same, the model 118 from the previous implementation may be a better candidate for emulation in the early phases of re-implementation.

| Option Value | Description |
| --- | --- |
| *true* | specifies that the newly generated models 118 supersede read-in models during analysis. |
| *false* | specifies that newly generated models 118 do not supersede read-in models 118. |

Sample Usage: model_replace = false models_search_path  Default = *none* lists the directory names in which to search for model files in addition to default models 118. Analyzer 202 searches the directories in the order specified, then loads the default models last.

| Option Value | Description |
| --- | --- |
| *directory name* | specifies a single directory name. |
| *directory list* | specifies a list of directories, separated by commas. |

Sample Usage: model_search_path = \
/eng/project/models, /home/joe/project/models print_config  Default = *false* prints the configuration settings that are used during analysis. Printed output can be controlled by the print_config_file option.

| Option Value | Description |
| --- | --- |
| *true* | prints the settings. |
| *false* | does not print the settings. |

Sample Usage: print_config = true print_config_file                          Default = *stdout* specifies the name of a file where you send the configuration settings if you have print_config with a value of true.

| Option Value | Description |
|---|---|
| *filename* | specifies the file name containing the dump configuration settings. |

Sample Usage: print_config_file = cfgdump print_version                               Default = *false* prints the product version information to *stdout*.

| Option Value | Description |
|---|---|
| *true* | prints the product version. |
| *false* | does not print the product version. |

Sample Usage: print_version = true report                                                   Default = *All* determines which errors are reported during analysis. It has the opposite effect of suppress.

| Option Value | Description |
|---|---|
| *all* | reports all errors. |
| *none* | reports no errors. |
| *invalid_pointers* | reports invalid pointer errors such as dereferencing an invalid pointer. |
| *leaks* | reports memory leak errors. |
| *missing_models* | reports missing model errors. |
| *null_pointers* | reports null pointer errors. |
| *parser* | reports the Intrinsa pragma errors, misplaced Intrinsa pragma, and illegal Intrinsa pragma. |
| *resource_states* | reports resource leak errors. |
| *uninitialized* | reports uninitialized errors. |
| *environment* | reports improper C usage, such as "environment variable not | defined."

| | | |
|---|---|---|
| | *error code number* | reports the errors you specify by number. |

Sample Usage:

| | | |
|---|---|---|
| | report = parser | reports pragma errors, not scoped |
| | report = 15 | reports leaking resource errors, not scoped |
| | report = parser:file(test.c) | reports pragma errors on file test.c, scoped | report_level                                                             Default = *Single line* specifies the amount of error information to display with each error reported.

| Option Value | Description |
|---|---|
| *single line* | displays the first line of the error message. |
| *verbose* | displays additional lines in the error message that contains a more complete description. |

Sample Usage: report_level = verbose suppress                                                                         Default = *None* determines which error codes are ignored during analysis. It has the opposite effect of report.

| Option Value | Description |
|---|---|
| *all* | suppresses all errors. |
| *none* | suppresses no errors (same as *report = all*) |
| *invalid_pointers* | suppresses invalid pointer errors such as dereferencing an invalid pointer. |
| *leaks* | suppresses memory leak errors. |
| *missing_models* | suppresses missing model errors. |
| *null_pointers* | suppresses null pointer errors. |

| | | |
|---|---|---|
| *parser* | suppresses the Intrinsa pragma errors, misplaced Intrinsa pragma, and illegal Intrinsa pragma. | |
| *resource_states* | suppresses resource leak errors. | |
| *uninitialized* | suppresses uninitialized errors. | |
| *environment* | suppresses improper C usage, such as "environment variable not defined." | |
| *error code number* | suppresses the errors associated with that number. | |

Sample Usage:

| | |
|---|---|
| suppress = missing_models | Suppressing missing_models errors, not scoped |
| suppress=22 | Suppresses missing_models errors, not scoped |
| suppress=22:file(test.c) | Suppress missing_models error for file test.c, scoped |

APPENDIX C

The operation unit, in action 2702 (Figure 27), selects tests to apply for each operation. Table D1 lists the tests selected by action 2702. For the embodiment of Figure 27, column "Operation" lists the operations processed by the operation unit. Columns "Comp", "Val Ptr", "Init" and "Non Zero" correspond respectively to the previously discussed "Comparable" test, "Valid_Pointer" test, "Initialized" test and "Non_Zero" test. For each operation, listed in the columns corresponding to tests selected by action 2702 are the operands the selected tests are applied against. The abbreviation "lhs" indicates the left-hand side operand and "rhs" indicates the right-hand side operand. When an asterisk (*) appears in front of an operand abbreviation, that indicates the test is applied against the value the operand points to.

Table D1

| Operation | Comp | Val Ptr | Init | Non Zero |
|---|---|---|---|---|
| Pointer dereference | | | lhs | |
| Integer negation | | | lhs | |
| Floating negation | | | lhs | |
| Logical complement | | | lhs | |
| Type cast | | | lhs | |
| Integer bitwise complement | | | lhs | |
| Integer post increment | | | *lhs | |
| Integer post decrement | | | *lhs | |
| Integer pre increment | | | *lhs | |
| Integer pre decrement | | | *lhs | |
| Floating post increment | | | *lhs | |
| Floating post decrement | | | *lhs | |
| Floating pre increment | | | *lhs | |
| Floating pre decrement | | | *lhs | |

| Operation | Comp | Val Ptr | Init | Non Zero |
|---|---|---|---|---|
| Pointer post increment | | *lhs | | |
| Pointer post decrement | | *lhs | | |
| Pointer pre increment | | *lhs | | |
| Pointer pre decrement | | *lhs | | |
| Integer addition | | | lhs,rhs | |
| Integer subtraction | | | lhs,rhs | |
| Integer multiplication | | | lhs,rhs | |
| Integer division | | | lhs,rhs | rhs |
| Integer equality | | | lhs,rhs | |
| Integer inequality | | | lhs,rhs | |
| Integer greater than | | | lhs,rhs | |
| Integer less than | | | lhs,rhs | |
| Integer greater than or equal | | | lhs,rhs | |
| Integer less than or equal | | | lhs,rhs | |
| Integer assignment | | | lhs,rhs | |
| Floating addition | | | lhs,rhs | |
| Floating subtraction | | | lhs,rhs | |
| Floating multiplication | | | lhs,rhs | |
| Floating division | | | lhs,rhs | rhs |
| Floating equality | | | lhs,rhs | |
| Floating inequality | | | lhs,rhs | |
| Floating greater than | | | lhs,rhs | |
| Floating less than | | | lhs,rhs | |
| Floating greater than or equal | | | lhs,rhs | |

| Operation | Comp | Val Ptr | Init | Non Zero |
|---|---|---|---|---|
| Floating less than or equal | | | lhs,rhs | |
| Floating assignment | | | lhs,rhs | |
| Pointer addition - result dereferenced | | lhs | rhs | |
| Pointer addition - result not dereferenced | | | lhs,rhs | |
| Pointer subtraction - result dereferenced | | lhs | rhs | |
| Pointer subtraction - result not dereferenced | | | lhs,rhs | |
| Pointer assignment | | | lhs,rhs | |
| Modulo | | | lhs,rhs | rhs |
| As eok_padd (from [] in source) | | lhs | rhs | |
| Pointer difference | lhs,rhs | | | |
| Pointer equality | | | lhs,rhs | |
| Pointer inequality | | | lhs,rhs | |
| Pointer greater than | lhs,rhs | | | |
| Pointer less than | lhs,rhs | | | |
| Pointer greater than or equal | lhs,rhs | | | |
| Pointer less than or equal | lhs,rhs | | | |
| Structure assignment | | | lhs,rhs | |
| Block assignment | | | rhs | |
| Integer add assignment | | | lhs,*lhs rhs | |
| Integer subtraction assignment | | | lhs,*lhs rhs | |
| Integer multiply assignment | | | lhs,*lhs rhs | |

| Operation | Comp | Val Ptr | Init | Non Zero |
|---|---|---|---|---|
| Integer divide assignment | | | lhs,*lhs rhs | rhs |
| Remainder assignment | | | lhs,*lhs rhs | rhs |
| Floating add assignment | | | lhs,*lhs rhs | |
| Floating subtraction assignment | | | lhs,*lhs rhs | |
| Floating multiply assignment | | | lhs,*lhs rhs | |
| Floating divide assignment | | | lhs,*lhs rhs | rhs |
| Pointer add assignment | | lhs | lhs,*lhs | |
| Pointer subtraction assignment | | lhs | lhs,*lhs | |
| Left shift assignment | | | lhs,*lhs rhs | |
| Right shift assignment | | | lhs,*lhs rhs | |
| Bitwise and assignment | | | lhs,*lhs rhs | |
| Bitwise or assignment | | | lhs,*lhs rhs | |
| Exclusive or assignment | | | lhs,*lhs rhs | |
| C substring | | lhs | rhs | |
| Struct/union member address | | | lhs,rhs | |
| Struct/union member | | lhs | | |
| Set bit field member | | | lhs,rhs | |
| Access bit field from a value | | lhs | | |
| Extract value of bit field | | lhs | | |
| Left shift | | | lhs,rhs | |
| Right shift | | | lhs,rhs | |

| Operation | Comp | Val Ptr | Init | Non Zero |
|---|---|---|---|---|
| Bitwise and | | | lhs,rhs | |
| Bitwise or | | | lhs,rhs | |
| Exclusive or | | | lhs,rhs | |
| Comma operation[1] | | | | |

[1] Action 2702 does not select any test for the comma operation.

APPENDIX D

The following pseudo code is one embodiment used to implement the vim primitive test unit, the vim primitive evaluate unit and the vim assume unit. Pseudo code for the vim primitive test unit begins with "vim_primitive_test", for the vim primitive evaluate unit with "vim_primitive_evaluate" and the vim assume unit with "vim_primitive_assume".

```
--- entry functions in vim_loc --- vim_primitive_test
        if the test is determined by memory type then
            handle specially (vim_loc_evaluate_memtype)
            and return
        if the primitive is initialized then
            handle specially
                (vim_loc_test_initialized) and return
        log the test (vim_loc_log_pred)
        evaluate the value result
            (vim_primitive_evaluate_to_fv)
        fill in the condition result
            (vim_loc_fill_in_condition)
        if valid_pointer and don't know then attempt to
        resolve
            (vim_attempt_to_ensure_valid_pointer)

vim_primitive_evaluate
        initialize the value result (NULL) and the
            condition result (don't know)
        evaluate the value result
            (vim_primitive_evaluate_to_fv)
        if we need a location but did not evaluate to
            one then create a temporary
                (vim_fv_create_memory)
        if needed then fill in the condition result
            (vim_loc_fill_in_condition)

vim_primitive_assume
        if cph made the choice then log this primitive
            as a guard (vim_loc_log_pred)
        if this is a resource operation then mark the
            resource as not new (it is being assumed
            into existence, not explicitly created)
        assume the primitive (vim_loc_assume_primitive)

vim_primitive_set
        if the primitive is an equality then
            handle specially (copy) (vim_loc_copy) and
            return
        if the memory type of the lhs (target) is a
            constant then return (do nothing)
        if the primitive is initialized then try to
            optimize
            (vim_chunk_attempt_to_set_initialized_quickly)
            if successful then return
        if the primitive is a resource primitive then
```

-109-

```
                    note the change
                        (vim_chunk_set_resource_change)
                    assume the primitive
                        (vim_loc_assume_primitive)
                and return
            if the primitive is memory_freed or memory_lost
                then assume the primitive
                    (vim_loc_assume_primitive) and return
            create a temporary location for the result
                (vim_create_memory)
            assume the primitive for the new location
                (vim_loc_assume_primitive)
            copy the temporary into the lhs (target)
                (vim_loc_copy)
    --- other vim_loc functions --- vim_primitive_evaluate_to_fv
            if the primitive is an assignment then
                handle specially
                    (vim_evaluate_direct_assignment) and
                    return
            determine the format of the primitive
                (vim_primitive_arg_format)
            fetch the lhs (vim_fetch)
            fetch the rhs (if needed) (vim_fetch)
                create a temporary fetched value for the
                result
                    (vim_fv_create_unknown)
                evaluate the primitive
                    (vim_fv_primitive_evaluate)
            if evaluation has produced a location then
                return it
            return the temporary fetched value
        vim_loc_evaluate_memtype
      * test (or evaluate) a primitive based on the memory
      * type only.
                get the chunk and offset
                    (vim_loc_to_chunk_and_offset)
                get the memory type
                    (vim_chunk_get_memory_type)
            if the primitive is initialized then test
                (vim_mem_type_is_init)
                set error code to ERR_USE_UNINIT_MEMORY
            if the primitive is freeable
                test for null (vim_mem_type_is_null)
                if the memory is null then
                    set the error code to
                        ERR_FREE_NULL_POINTER
                    set the result to false
                otherwise
                    test for validity (vim_mem_type_is_valid)
                    set the error code to
                        ERR_FREE_INVALID_POINTER
            if the primitive is valid_pointer
                test for null (vim_mem_type_is_null)
                if the memory is null then
                    set the error code to
```

```
                        ERR_DEREF_NULL_POINTER
            set the result to false
        otherwise
            test for validity
                (vim_mem_type_is_valid)
            set the error code to
                ERR_DEREF_INVALID_POINTER
        if the primitive is true_as_condition or
                int_non_zero then
            set the error code to ERR_ILLEGAL_VALUE
            if the memory is not null
                (vim_mem_type_is_null) then
                    test for validity
                        (vim_mem_type_is_valid)
        if any results evaluated to false then report
            the error vim_loc_to_chunk_and_offset
 * vim_loc_to_chunk_and_offset: split a location into
 * chunk and offset
        decode the location -- pull out the chunk
            number and offset
        look up the chunk in the chunk table
            (vim_chunk_table_get_chunk)

vim_loc_check_and_convert
 * vim_loc_check_and_convert: check a pointer to make
 * sure that it is valid -- i.e., points to a chunk and
 * a byte.  If it does point to a valid offset within a
 * known chunk, return the chunk and byte (index into
 * SV collection) for future processing.
        get the chunk and offset
            (vim_loc_to_chunk_and_offset)
        if the chunk was not valid then report an error
            and return
            (ERROR_DEREF_INVALID_POINTER)
            (vim_generate_err)
        check that the offset does no go beyond the end
            of the chunk (vim_chunk_check_bounds)
        if the offset is invalid then report an error
            (ERROR_DEREF_INVALID_POINTER)
            (vim_generate_err)
        if the value is not a pointer and there was no
            bounds error then mark it valid and return
        get the chunk's freed status
            (vim_chunk_get_freed_status)
        if the chunk has been freed then report an
            error (ERROR_DEREF_POINTER_TO_FREED)
            (vim_generate_err)
        mark the value as fetchable vim_loc_test_initialized
 * vim_loc_test_initialized: test the initialized
 * primitive; special-cased for performance.
        get the chunk (vim_loc_check_and_convert)
        get the stored values from the chunk
            (vim_chunk_get_stored_values)
        loop through all the values
            get the value (vim_sv_col_get_sv)
```

-111-

```
                    if the initialized bit is not set then flag
                        error
                    note on the sv that it was tested for
                        initialized
                if there was an error then report it
                    (ERR_USE_UNINIT_MEMORY)
                    (vim_generate_err)

vim_loc_assume_new_value
            get the chunk (vim_loc_check_and_convert)
            get the stored values from the chunk
                (vim_chunk_get_stored_values)
            loop through all the values
                get the value (vim_sv_col_get_sv)
                set: the initialized flag, the exact value
                    flag, the exact value
                set the assumed flag to false
            if there was an error then report it
                (ERR_USE_UNINIT_MEMORY)
                (vim_generate_err)

vim_loc_copy
    *   After calling this routine with copy_svs==FALSE,
    *   both the source and destination will point to the
    *   SAME stored values.  This is used to implement:
    *       assignment
    *       set
    *       assuming equality operators
    *       store
    *   After calling this routine with copy_svs==TRUE, the
    *   source and destination with have identical copies
    *   of the stored values.  This is used to assume
    *   equality operators.
            get the dest chunk (vim_loc_check_and_convert)
            if it doesn't exist then
                if it's not being duplicated then mark it
                    as lost (vim_mark_lost)
                return
            get the memory type (vim_chunk_get_memory_type)
            if the memory type is a constant
                (vim_mem_type_is_a_constant) then
                return
            if we're setting (not assuming) values then
                record that on dest chunk
                (vim_chunk_record_sv_change)
            get the stored values from the dest chunk
                (vim_chunk_get_stored_values)
            get the src chunk (vim_loc_check_and_convert)
            if it doesn't exist then
                just assume the dest chunk is initialized
                    (vim_loc_assume_initialized)
            get the stored values from the src chunk
                (vim_chunk_get_stored_values)
            record that we've assigned to the dest chunk
                (vim_chunk_record_assigned_to)
            if <all> then (create a constant and copy it
                into all the dest sv's)
                get the bytes in the source constant
                    (vim_sv_col_get_sv)
```

```
                ·get the number of bytes in the dest svs
                allocate the sv's
                loop through the dest svs
                    copy the constant byte (bot_mem_copy)
            loop through all the values
                get the source sv (vim_sv_col_get_sv)
                get the dest sv (vim_sv_col_get_sv)
                if we're copying then
                    get the memory type
                        (ctx_origin_get_memory_type)
                    if the dest memory type is not constant
                        (vim_mem_type_is_a_constant)
                        then copy the sv (bot_mem_copy)
                otherwise
                    replace the sv (vim_sv_col_replace_sv)
            if <all> then set up the chunk expansion method
                if the source has an expansion method
                    (vim_chunk_get_expansion_method)
                    then use it
                        (vim_chunk_set_expansion_method)
                otherwise if the source has a single byte
                    exact value
                    then use it
                        (vim_chunk_set_expansion_method)
                otherwise use "initialized"
                    (vim_chunk_set_expansion_method)

vim_loc_fill_in_condition
     * vim_loc_fill_in_condition: fill in a condition given
     *  either a fetched value or a location and size.
            if we are passed in only a location then fetch
                its associated value (vim_fetch)
            if we know the exact value then
                if the exact value is not 0 then return
                    true
                otherwise return false
            otherwise return don't know vim_loc_log_pred
     * vim_loc_log_pred: log a predicate either in the
     * tests (constraints) or the facts (results)
            check the locations of the arguments
                (vim_loc_check_location)
            if the arguments are not valid locations then
                return
            if the lhs doesn't need to be logged then
                return (vim_need_to_log_svs)
            get the lhs svs (vim_get_svs_for_pred)
            get the rhs svs (if needed)
                (vim_get_svs_for_pred)
            if there exists a stronger predicate then
                return (ignore this one)
                (vim_pred_needs_logging)
            if there is a weaker but similar predicate then
                set the replace flag
                (vim_pred_needs_logging)
            if this is a resource predicate then
                if the replace flag is set then
                    get the new predicate
```

-113-

```
                    (vim_sp_col_get_pred)
            replace the state
                    (vim_resource_replace_state)
            replace the primitive
                    (vim_sp_col_replace_pred)
            return
        otherwise
            get the chunk and offset
                    (vim_loc_to_chunk_and_offset)
            get the memory type
                    (vim_chunk_get_memory_type)
            if the memory type is a
                    resource_definition then
                        create the resource
                    (vim_create_resource_for_location)
                        return
    initialize the predicate structure
        (vim_stored_pred_init)
    if the replace flag is set then
        replace the predicate in the pred col
            (vim_sp_col_replace_pred)
    otherwise
        add the predicate to the predicate
            collection (vim_sp_col_add_pred)

vim_loc_check_location
    call vim_loc_check_and_convert vim_loc_assume_primitive
    if the primitive is memory_freed then
        handle specially (vim_free_memory) and
        return
    if the arguments are not valid locations then
        return (vim_loc_check_location)
    if the primitive is equality then
        determine which direction to assume
            (lhs to rhs or rhs to lhs)
            (vim_direction_to_assume)
        perform the assume (vim_loc_assume_equal)
        return
    if we need to log the primitive
        (it is a relational or lost) then
            log the predicate (vim_loc_log_pred)
            mark the arguments as initialized
                (vim_loc_assume_initialized)
    switch on primitive type
        int_non_zero, true_as_condition:
            get the location and stored values of
                the constant 1 (vim_int_const)
            perform the assume
                (vim_loc_assume_equal)
        false_as_condition:
            get the location and stored values of
                the constant 0 (vim_int_const)
            perform the assume
                (vim_loc_assume_equal)
        invalid_pointer, initialized:
            perform the assume
                (vim_loc_assume_initialized)
```

```
              valid_pointer:
                  assume initialized
                      (vim_loc_assume_initialized)
                  get the location and stored values of
                      the constant 0 (vim_int_const)
                  log the predicate ine
                      (vim_loc_log_pred)
              state_eq, state_ne:
                  log the predicate ine
                      (vim_loc_log_pred)
              lost:
                  assume lost (vim_assume_lost)

vim_loc_assume_equal
    * After calling this routine, the source and
    * destination will point to the different stored
    * values with the same information.  This is used to
    * implement assuming equality operators.
          copy stored values (vim_loc_copy)

vim_loc_assume_initialized
    * vim_loc_assume_initialized: assume some number of
    * bytes are initialized (similar to
    * vim_loc_test_initialized)
          get the chunk (vim_loc_check_and_convert)
          get the stored values from the chunk
              (vim_chunk_get_stored_values)
          if <all> then set size to all the sv's
          loop through the necessary values
              get the value (vim_sv_col_get_sv)
              record chunk is initialized
              record value is assumed
          if <all> then record initialized on the chunk
              (vim_chunk_set_expansion_method)

vim_get_pointed_to
          perform a dereference
              (vim_primitive_evaluate_to_fv)
              (use the indirect operator, returning a
              location)

vim_loc_from_chunk_and_offset
          get the number of the chunk
              (vim_chunk_get_number)
          use the chunk number to compute the location
              (vim_loc_from_chunk_number_and_offset)

vim_loc_from_chunk_number_and_offset
          construct a location from a chunk number and
              offset (shift and mask)

vim_location_offset
    * vim_location_offset: return the location at a
    * specified calculated offset from a base location,
    * along with an indication of whether this is a valid
    * location, and whether it is being tracked (a
    * location may be known to be valid but not actually
    * be interpretable -- for example, if it goes beyond
    * the bounds of an array).
```

```
        vim_location_can_become_valid_pointer
    * vim_location_can_become_valid_pointer: can a
    * location become a valid pointer when some
    * (as-yet-unknown) offset is applied?  Only if it
    * identifies to a valid chunk.  Note that unlike a
    * valid pointer, this pointer may be pointing outside
    * the bounds of the chunk -- some operations are legal
    * on such pointers.  This function reports NULL and
    * invalid pointers.  It does not report pointers to
    * freed memory or bounds errors.
            if the location is zero then report an error
                (ERR_DEREF_INVALID_POINTER)
                (vim_generate_err)
            get the chunk and offset
                (vim_loc_to_chunk_and_offset)
            if the chunk was invalid then report an error
                (ERR_DEREF_INVALID_POINTER)
                (vim_generate_err)
            if the chunk was the zero chunk then report an
                error (ERR_DEREF_NULL_POINTER)
                (vim_generate_err)

--- vim_loc functions with nonstandard names --- vim_fetch
            get the chunk (vim_loc_check_and_convert)
            if the location (including offset) is not
                fetchable then create an unknown value
                    (vim_fv_create_unknown)
            otherwise get the fetched value (vim_fv_fetch)

vim_need_to_log_svs
    * vim_need_to_log_svs: look at the svs referenced by
    * loc/num_bytes and decide whether a predicate on that
    * sv col would need to be logged.
            get the svs for the location
                (vim_get_svs_for_location)
            get the number of sv's in the svs
                (vim_sv_col_get_num_svs)
            if there aren't enough sv's to match then
                return no need to log
            loop through all the stored values
                get the sv (vim_sv_col_get_sv)
                get the memory type of the origin
                    (ctx_origin_get_memory_type)
                determine if the origin's memory type
                    requires logging
                    (vim_mem_type_log_test)

vim_create_new_location
            create new memory
                (vim_mem_type_create_new_memory)
            create the location
                (vim_loc_from_chunk_and_offset)

vim_get_svs_for_location
            get the chunk and offset
                (vim_loc_to_chunk_and_offset)
```

```
        check that the offset does no go beyond the end
        of the chunk
             (vim_chunk_check_bounds)
        get the stored values from the chunk
             (vim_chunk_get_stored_values)

vim_get_svs_for_pred
 * vim_get_svs_for_pred: if logging is required, return
 * a set of stored values which can be logged in a
 * predicate.  This may be a copy of an existing set
 * (for values that may change or in cases where it's
 * just a subset of an existing collection) or may be a
 * completely new set.
        get the svs for the location
             (vim_get_svs_for_location)
        get the svs subset defined by the pred
             (vim_sv_col_subset)

--- vim_chunk functions --- vim_chunk_get_memory_type
        retrieve the memory_type field from the chunk vim_chunk_table_get_chunk
        get the chunk with bot_col_get_member vim_chunk_check_bounds
 * vim_chunk_check_bounds: perform bounds checking, and
 * map an offset (into the memory pointed to by the
 * chunk) to an index (into the stored values
 * collection associated with the chunk) Wherever
 * possible, vim_chunk_check_bounds will attempt to
 * extend the bounds of the chunk to include the
 * necessary bytes beginning at the pointed-to offset.
        if we're about to free the chunk and the
             beginning of the chunk is known
             (lower_bounds_known) and the offset is
             non-zero then report an error
             (ERR_FREE_POINTER_IN_MIDDLE_OF_BLOCK)
        if we're not just checking the chunk and the
             svs is empty then create the stored value
             set (vim_chunk_create_svs)
        if we're just checking the chunk then set the
             upper bound to the value stored with the
             chunk
        otherwise set it to the size of the svs
             (vim_svs_col_get_num_svs)
        if the lower bound is known and the offset is
             less than zero then report an error
             (ERR_BOUNDS_VIOLATION)
        if the last byte needed (offset plus size of
             subset) is greater than the upper bound and
             we're not just checking the chunk then
             allocate new stored values (bot_mem_alloc)
             record them (vim_chunk_record_overflow_svs)
             loop through the stored values
                  initialize the value
                      (vim_chunk_init_sv)
                  add to the sv collection
```

```
                        (vim_sv_col_add_sv)
                if desired also add to the original sv
                collection (vim_sv_col_add_sv)

vim_chunk_create_svs
        allocate the memory for the values
            (bot_mem_alloc)
        allocate the memory for the pointers to the
            values (bot_mem_alloc)
        loop through the values
            if there is an initial value then use it
                (vim_chunk_init_sv)
            otherwise set the value to 0
            set the pointer to the value
        create the svs using the pointers
            (vim_sv_col_create_and_init)
        set the original svs to be the new svs vim_chunk_record_overflow_svs
        add sv's to the overflow svs collection
            associated with the chunk
            (bot_col_create, bot_col_add_member)

vim_chunk_init_sv
        if there is an initial value then use the
            proper byte
        if there is an expand byte then use that
        initialize the sv (vim_stored_value_init)

vim_chunk_get_stored_values
        if the chunk's been assigned to and there are
            in fact none then
            create one (vim_chunk_create_svs)
        retrieve the stored values
        set the ending offset vim_chunk_get_freed_status
        retrieve freed status from chunk vim_chunk_set_freed_status
        label chunk as freed vim_chunk_create
        initialize the chunk fields
        create the stored values (vim_chunk_create_svs)
        if there is an initial value then
            create memory for the value (bot_mem_alloc)
            copy the value (bot_mem_copy)

vim_chunk_attempt_to_set_initialized_quickly
  * vim_chunk_attempt_to_set_initialized_quickly:
  * replace the stored values in the chunk, setting new
  * ones to initialized. This is used as an optimization
  * for setting stored values. We may be able to avoid
  * generating any svs. If this can't operate in an
  * optimized way, it simply returns FALSE for success.
  * In this case, the caller can proceed with its normal
  * processing.
        if (<all> or the number of bytes to be set
```

```
                    equals the chunk size) and there are no
                    stored values then set the proper chunk
                    fields
                        indicate initial value completely
                            replaced
                        indicate all bytes are initialized
                        indicate expanded space should be
                            automatically initialized
                        indicate stored values have been
                            assigned to vim_chunk_set_resource_change
                record there has been a change in resources
                    associated with this chunk vim_chunk_get_expansion_method
                if expanded space is not assumed or known to
                    have the specified value then
                    retrieve indication if expanded space
                        should be automatically initialized
                    retrieve indication if expanded space
                        should be automatically set to a value
                    retrieve value used to initialize new
                        memory
                otherwise return false as the flags' value vim_chunk_set_expansion_method
                record if expanded space should be
                    automatically initialized
                record if expanded space should be
                    automatically set to a value
                record the value used to initialize new memory
                record that expanded space is not assumed or
                    known to have specified value vim_chunk_record_sv_change
        * If this is the very first time the svs have changed,
        * copy the collection. if stored_values ==
        * orig_stored_values then copy the values
                (vim_sv_col_copy)

vim_chunk_record_assigned_to
                record that stored values have been assigned to vim_chunk_get_origin
                retrieve the origin of the chunk vim_chunk_set_lost
                record chunk has been lost vim_chunk_get_number
                retrieve the chunk number from the chunk --- vim_memtype functions --- vim_mem_type_is_init
                retrieve the appropriate test information
                    initialized data
```

```
        vim_mem_type_is_null
            retrieve the appropriate test information null
                data
       vim_mem_type_is_valid
            retrieve the appropriate test information valid
                data vim_mem_type_deref_type
            retrieve the appropriate dereference type data vim_memory_type_origin_id_type
            retrieve the appropriate id type data
        vim_mem_type_is_a_constant
            retrieve the appropriate constant data vim_mem_type_log_test
            if the predicate is a guard then always log it
            otherwise retrieve the appropriate test
                information log tests data vim_memory_type_ok_to_free
            retrieve the free information ok to free memory
                of this type data
            if it isn't ok to free then
                retrieve the free information error code
                    data
        vim_mem_type_create_new_memory
            create the origin (ctx_origin_create)
            set the upper and lower bounds
            if the exact value is not known and we're not
                creating a resource then
                retrieve the start as initialized data
            create the memory chunk
                (vim_mem_type_do_creation)

vim_mem_type_do_creation
      * vim_mem_type_do_creation: create and initialize new
      * memory, creating a new chunk if necessary
            if there is room in the last chunk of this
                memory type created then use the space
            otherwise
                create the chunk (vim_chunk_create)
                if the memory type starts as lost then
                    mark it so (vim_chunk_set_lost)
                put the chunk in the chunk table
                    (vim_chunk_table_add_chunk)
                remember this was the last chunk of this
                    memory type
            if the stored values are to be initialized then
                get the stored values
                    (vim_chunk_get_stored_values)
                loop through the stored values
                    get the stored value
                    if this is a resource then initialize
                        it (vim_stored_resource_init)
                    otherwise initialize the value
```

```
                                        (vim_stored_value_init)

--- vim_fv (fetched value) functions ---

       vim_fv_set_as_ulong
            record the fetched value's exact value is known
            record the fetched value's long long exact
               value data
            set the fetched value's properly sized exact
               value vim_fv_set_as_real
            record the fetched value's exact value is known
            record the fetched value's long long exact
15             value data
            set the fetched value's properly sized exact
               value vim_fv_create_memory
            create the memory (vim_create_memory)
            get the svs for the new location
                    (vim_get_svs_for_location)
            loop through the fetched values
                get the stored value from the svs
                    (vim_svs_col_get_sv)
                update stored value from fetched value
                    (vim_fv_update_sv)
            assign predicates to the location
                    (vim_fv_store_facts)
        vim_fv_update_sv
            if the initialized flag on the fv is set then
               set it on the sv
        vim_fv_store_facts
            get the svs for the location
                (vim_get_svs_for_location)
            get the number of predicates on the fetched
               value (vim_pred_col_get_num_preds)
            loop through the predicates
                get the predicate from the fv pred
                    collection (vim_pred_col_get_pred)
                initialize the predicate being attached to
                    the svs
                    (vim_stored_pred_init_from_pred)
                add the predicate to the collection
                    (vim_sp_col_add_pred)

vim_fv_create_unknown
        * create a fetched value with an unknown value
            allocate the bytes for the fetched value
                (vim_fv_alloc)
            setup the fv conservatively
                initialized
                don't know exact value
                don't know if a valid pointer
                not non zero
                memory type unknown
                no location, chunk origin, or svs
```

```
vim_fv_alloc
    allocate the memory for the fetched values
        (bot_mem_alloc)
        (struct and value byte array)
    set the exact value pointer to the byte array
    initialize the fv
        store the size
        nothing has been changed or assumed
        no predicates
        don't know exact value
        not a valid pointer
        not tracked
        no resource vim_fv_fetch
    get the stored values
        (vim_chunk_get_stored_values)
    if <all> then get the number of sv's
        (vim_sv_col_get_num_svs)
    get the fvs from the svs (vim_fv_fetch_from_svs)
    get the fv origin from the chunk
        (vim_chunk_get_origin)
    get the fv memory from the chunk
        (vim_chunk_get_memory_type)

vim_fv_fetch_from_svs
    allocate the fv (vim_fv_alloc)
    initialize fv
        remember the svs;
        initialized
        exact value is known
        not non zero
    loop through the svs
        get the sv (vim_sv_col_get_sv)
        if the sv is a resource then copy the type
            and state
        copy the initialized data and exact value
            data (if any)
    get the predicates
        (vim_fv_fetch_preds)
    if the format wanted is unsigned or pointer then
        make as such (vim_fv_as_unsigned)
    if the format wanted is integer then make as such
        (vim_fv_as_long)
    if the format wanted is float then make as such
        (vim_fv_as_long_double)

vim_fv_fetch_preds
    get the svs subset defined by the fv
        (vim_sv_col_subset)
    get the associated predicates
        (vim_util_get_preds_for_svs)

vim_fv_as_unsigned
    if the exact value is known then
        create an unsigned long based on the source
        value size (8, 16, 32, 64 bits)

vim_fv_as_long
```

```
                if the exact value is known then
                    create a long based on the source value size
                    (8, 16, 32, 64 bits)

vim_fv_as_long_double
            if the exact value is known then
                create a double based on the source value
                size (32, 64, 128 bits)

--- vim_evp (primitive evaluate) functions --- vim_fv_primitive_evaluate
            if the primitive is a C operator then evaluate
                specially (vim_evaluate_c_opcode)
            otherwise switch on primitive type
                int_non_zero, true_as_condition:
                    check for zero (vim_check_against_zero)
                float_non_zero:
                    check for zero (vim_check_against_zero)
                state_eq, state_ne:
                    check the state (vim_resource_evaluate)
                false_as_condition:
                    check for zero (vim_check_against_zero)
                initialized:
                    if exact value is known or initialized on
                        the fv then result is true
                    otherwise
                        result is false
                        set error to ERR_USE_UNINIT_MEMORY
                valid_pointer:
                    if not initialized then
                        result is false
                        set error to ERR_USE_UNINIT_MEMORY
                    otherwise
                        if the exact value is known and is
                            zero then
                                result is false
                                set error to
                                    ERR_DEREF_INVALID_POINTER
                        otherwise check for validity
                            (vim_location_offset)
                invalid_pointer:
                    [not implemented]
                freeable:
                    test for freeable (vim_test_freeable)
                int_to_float, float_to_int:
                    evaluate (vim_evaluate_normal_opcode)
                valid_offset:
                    if the lhs is not initialized then
                        result is false
                        set error to ERR_DEREF_UNINIT_POINTER
                    if the lhs and rhs are known (exact
                    values) then
                        compute the result
                        test for error (vim_location_offset)
                    otherwise if the lhs is known (exact
                    value) then
                        test for error with unknown offset
                    (vim_location_can_become_valid_pointer)
```

-123-

```
                    if the rhs not initialized then
                        report ERR_USE_UNINIT_MEMORY
                        (vim_generate_err)
                        [this error is reported before any
                         lhs errors]
            comparable:
                if the lhs is not initialized then
                    result is false
                    set error to ERR_USE_UNINIT_MEMORY
                if the lhs is known (exact value) then
                    test the lhs without reporting an
                        error
                    (vim_location_can_become_valid_pointer)
                    if the lhs is not a valid pointer
                    then
                        result is false
                        set error to ERR_INVALID_POINTER
                if the rhs is not initialized then
                    result is false
                    set error to ERR_USE_UNINIT_MEMORY
                if the rhs is known (exact value) then
                    test the rhs without reporting an
                        error
                    (vim_location_can_become_valid_pointer)
                    if the rhs is not a valid pointer
                    then
                        result is false
                        set error to
                            ERR_INVALID_POINTER
                if lhs and rhs are known (exact values)
                then
                    get the chunk for the lhs
                        (vim_loc_to_chunk_and_offset)
                    get the chunk for the rhs
                        (vim_loc_to_chunk_and_offset)
                    if the chunks are not the same
                    then
                        result is false
            if the result is a boolean true or false then set
                the fetched value
            if an error has occurred then report it
                (vim_generate_err)

vim_evaluate_c_opcode
      * vim_evaluate_c_opcode: evaluate a fetched value using
      * a C opcode.
            if the opcode is an assignment op then evaluate
                it specially (vim_evaluate_assignment_opcode)
            if the opcode is an integer op then evaluate it
                specially (vim_evaluate_normal_opcode)
            if the opcode is an pointer op then evaluate it
                specially (vim_evaluate_pointer_opcode)
            if the opcode is a miscellaneous op then evaluate
                it specially (vim_evaluate_misc_opcode)
        vim_check_against_zero
      * vim_check_against_zero: check a fetched value against
      * the appropriate 0   (int, unsigned, float, of the
      * appropriate size)
```

```
                if the value is uninitialized or the exact value
                    is not known then report an error
                        (ERR_USE_UNINIT_MEMORY)
                if the value is a float then
                    get a floating zero (vim_double_const)
                otherwise
                    get an integer zero (vim_int_const)
                fetch the zero constant (vim_fetch)
                evaluate the op (vim_evaluate_c_opcode)

vim_evaluate_assignment_opcode
        * vim_evaluate_assignment_opcode: perform an assignment,
        * including the assignment operators (+=, etc.) as well
        * as integer, float, and pointer pre/post decrement.
        * Assignment operators, including =, +=, -=, etc., have
        * as their first operand a pointer to the location
        * [i.e., the location as an lvalue]. This means that a
        * dereference must first be computed in order to get
        * to the actual value.  After the result is computed,
        * the function vim_loc_copy (from vim_loc.c) is used to
        * store the result in the first operand -- note that
        * this function requires the location itself an rvalue,
        * in EDG terms). Much of the logic in this function
        * could be moved up to the INS layer, since it is really
        * based on the EDG parse tree structures.
                check the lvalue (if necessary -- if the exact
                    value of the fv is unknown -- then create an
                    lvalue -- create memory)
                    (vim_attempt_to_ensure_valid_pointer)
                get the additional op (such as + for +=)
                    (vim_primitive_get_underlying_op)
                if the exact value of the lhs is not known then
                    return
                if there is an additional op then
                    get the argument formats
                        (vim_primitive_arg_format)
                    fetch the lhs (vim_fetch)
                    if the op is a post increment or post
                        decrement then
                            create the result memory
                                (vim_fv_create_memory)
                            copy the value to the temporary
                                (vim_loc_copy)
                    create the inc/dec rhs constant argument
                        (constant 1) (vim_create_assignment_arg)
                    fetch the rhs constant (vim_fetch)
                    evaluate the additional op
                        (vim_evaluate_c_opcode)
                if the rhs is not a valid location then create an
                    unknown rhs (vim_create_memory)
                if the lhs is not a valid location then mark it
                    as lost (vim_mark_lost)
                if the lhs is a valid location then copy the rhs
                    to the lhs (vim_loc_copy)

vim_create_assignment_arg
            if the operator is an integer or a pointer
                operator then
                get an integer 1 (vim_int_const)
```

```
                if the operator is a floating point operator then
                    get a float 1 (vim_double_const)

vim_evaluate_pointer_opcode
        * vim_evaluate_pointer_opcode: evaluate a fetched value
        * using pointer operators.  This is basically done by
        * converting the operator into a series of integer
        * operators. There are two kinds of pointer operators:
        * operators that work on a pair of pointers, and
        * operators that work on a pointer and an integer.
        * Integers are implicitly multiplied by the size of what
        * the pointer is pointing to.  Some pointer operators
        * require an indirection (dereference) for the
        * result -- rather than returning the result, returning
        * what the result is pointing to.  The eok_indirect
        * operator is a degenerate case of this.  For
        * flexibility, the routine
        * i_mprimitive_get_pointer_op_info returns
        * the characteristics of the operation, and this routine
        * is written in terms of those characteristics.  Note
        * that this routine is not called for pointer assignment
        * operators; vim_evaluate_assignment_opcode is called
        * instead, and converts them to the appropriate
        * non-assignment pointer opcode, and then this routine
        * gets called.
                get pointer information about the primitive
                    (vim_primitive_get_pointer_op_info)
                check the lvalue (if necessary -- if the exact
                    value of the fv is unknown -- then create an
                    lvalue -- create memory)
                    (vim_attempt_to_ensure_valid_pointer)
                if needed by the type of primitive then
                    multiply the size
                    (vim_multiply_pointer_operand)
                if an integer result is needed then create a
                    temporary (vim_fv_create_unknown)
                if needed by the type of primitive then
                    divide the result (vim_divide_pointer_result)

            vim_multiply_pointer_operand
                create a temporary for the result
                    (vim_fv_create_unknown)
                create a constant the size of the pointer
                    (vim_int_const)
                fetch the constant (vim_fetch)
                multiply the pointer by the constant
                    (vim_fv_primitive_evaluate)

vim_divide_pointer_result
                create a constant the size of the pointer
                    (vim_int_const)
                fetch the constant (vim_fetch)
                divide the pointer by the constant
                    (vim_fv_primitive_evaluate)
            vim_evaluate_misc_opcode
                no-op vim_evaluate_direct_assignment
```

```
* vim_evaluate_direct_assignment: evaluate an assignment
* operator in an optimized way.  In particular, we want
* to defer fetching either of the rvalues to allow for
* optimizations by vim_loc_copy.  See the discussion on
* why we need to do a dereference (to get to the
* location as an rvalue).  Note that code here
* duplicates the more general code in
* vim_evaluate_assignment_opcode.
        fetch the lhs (the lvalue) (vim_fetch)
            (we are passed a location whose svs contains
            the lvalue location)
        check the lvalue (if necessary -- if the exact
            value of the fv is unknown -- then create an
            lvalue -- create memory)
            (vim_attempt_to_ensure_valid_pointer)
        get the fv's exact value (the lvalue location)
        check the location (vim_loc_check_location)
        if the location is valid then perform the
            assignment (vim_loc_copy)
        otherwise mark the rhs as lost (vim_mark_lost)

vim_attempt_to_ensure_valid_pointer
        if the fetched value is known then return
        if the fetched value did not come from a location
            then return
        get the new memory type (vim_mem_type_deref_type)
        get the parent sv (used as the id for the new
            memory (vim_memory_type_origin_id_type,
                vim_sv_col_get_sv)
        create the memory (vim_create_memory)
        update the fetched value (vim_fv_set_as_ulong)
        update the fetched value's stored values
            (vim_loc_assume_new_value)

--- vim_int (integer evaluation) functions --- vim_evaluate_normal_opcode
* vim_evaluate_normal_opcode: evaluate a fetched value
* using a C integer or floating point opcode.
* When exact values are known, it may be possible to
* return an existing location.  This is the ideal
* situation both from an efficiency standpoint and from
* maintaining the most information.  If it is not
* possible to return an existing location, as much
* information as possible is computed in the result_fv;
* this includes the exact value, and various predicates.
        check the op to see if it's an identity op
            (vim_op_identity)
        if it is an identity op and the result is the lhs
            then
                return the lhs
        if it is an identity op and the result is the rhs
            then
                return the rhs
        perform the operation on the exact values
            (vim_do_op)
        if the exact value is not known then
            fetch the lhs predicates (vim_fv_fetch_preds)
            fetch the rhs predicates (if any)
```

```
                    (vim_fv_fetch_preds)
            evaluate the predicates
                    (vim_evaluate_all_predicates)
        vim_do_op
            if the op is VIM_PRIM_INT_TO_FLOAT then convert
                and return
            if the op is VIM_PRIM_FLOAT_TO_INT then convert
                and return
            switch on opcode type
                Integer negation:
                    if the exact value of the lhs is known
                        then compute the result and mark the
                        result as known
                Logical complement ("!"):
                    if the exact value of the lhs is known
                        then compute the result and mark the
                        result as known
                Bitwise complement ("~"):
                    if the exact value of the lhs is known
                        then compute the result and mark the
                        result as known
                Integer-integer cast, Float-float cast:
                    if the exact value of the lhs is known
                        then
                            assign the lhs to the result and
                            mark the result as known
                        otherwise
                            mark the result as initialized
                Cast to bool:
                    if the exact value of the lhs is known
                        then
                            assign the evaluation of lhs not
                            equal 0 to the result
                            and mark the result as known
                Integer addition:
                    if the exact value of the lhs and rhs are
                        known then
                            compute the result and mark the
                            result as known
                Integer subtraction:
                    if the exact value of the lhs and rhs are
                        known then
                            compute the result and mark the
                            result as known
                Integer multiplication:
                    if the exact value of the lhs and rhs are
                        known then compute the result and
                        mark the result as known
                Integer division:
                    if the rhs is known and is 0 then set the
                        error code (ERR_ILLEGAL_VALUE)
                    otherwise if the exact value of the
                        lhs and rhs are known then
                            compute the result and mark the
                            result as known
                Integer equality:
                    if the exact value of the lhs and rhs are
                        known then
```

-128-

```
                    compute the result and mark the
                    result as known
        Integer inequality:
            if the exact value of the lhs and rhs
                are known then
                    compute the result and mark the
                    result as known
        Integer greater than:
            if the exact value of the lhs and rhs
                are known then
                    compute the result and mark the
                    result as known
        Integer less than:
            if the exact value of the lhs and rhs
                are known then
                    compute the result and mark the
                    result as known
        Integer greater than or equal:
            if the exact value of the lhs and rhs
                are known then
                    compute the result and mark the
                    result as known
        Integer less than or equal:
            if the exact value of the lhs and rhs are
                known then
                    compute the result and mark the
                    result as known
        Remainder ("%"):
            if the rhs is known and is 0 then set the
                error code (ERR_ILLEGAL_VALUE)
            if the exact value of the lhs and rhs are
                known then
                    compute the result and mark the
                    result as known
        Left shift ("<<"):
            if the exact value of the lhs and rhs are
                known then
                    compute the result and mark the
                    result as known
        Right shift (">>"):
            if the exact value of the lhs and rhs are
                known then
                    compute the result and mark the
                    result as known
        Bitwise and ("&"):
            if the exact value of the lhs and rhs are
                known then
                    compute the result and mark the
                    result as known
        Bitwise or ("|"):
            if the exact value of the lhs and rhs are
                known then
                    compute the result and mark the
                    result as known
        Exclusive or ("^"):
            if the exact value of the lhs and rhs are
                known then
                    compute the result and mark the
                    result as known
```

-129-

```
Floating point negation:
    if the exact value of the lhs is known
        then
            compute the result and mark the
            result as known
Floating point addition:
    if the exact value of the lhs and rhs are
        known then
            compute the result and mark the
            result as known
Floating point subtraction:
    if the exact value of the lhs and rhs are
        known then
            compute the result and mark the
            result as known
Floating point multiplication:
    if the exact value of the lhs and rhs are
        known then
            compute the result and mark the
            result as known
Floating point division:
    if the rhs is known and is 0 then set the
        error code (ERR_ILLEGAL_VALUE)
    if the exact value of the lhs and rhs are
        known then
            compute the result and mark the
            result as known
Floating point equality:
    if the exact value of the lhs and rhs are
        known then
            compute the result and mark the
            result as known
Floating point inequality:
    if the exact value of the lhs and rhs are
        known then
            compute the result and mark the
            result as known
Floating point greater than:
    if the exact value of the lhs and rhs are
        known then
            compute the result and mark the
            result as known
Floating point less than:
    if the exact value of the lhs and rhs are
        known then
            compute the result and mark the
            result as known
Floating point greater than or equal:
    if the exact value of the lhs and rhs are
        known then
            compute the result and mark the
            result as known
Floating point less than or equal:
    if the exact value of the lhs and rhs are
        known then
            compute the result and mark the
            result as known
Logical and, Logical or:
    no-op (handled in short circuit
```

```
                    evaluation)
            default:
                internal error
        if the result is known and floating then set the
            fetched value (vim_fv_set_as_real)
        if the result is known and integer then set the
            fetched value (vim_fv_set_as_ulong)

vim_evaluate_all_predicates
        get the number of lhs predicates
            (vim_pred_col_get_num_preds)
        get the number of rhs predicates
            (vim_pred_col_get_num_preds)
        if the exact value of the rhs is known then loop
            through the lhs preds
                get the predicate (vim_pred_col_get_pred)
                evaluate the predicate
                    (vim_evaluate_predicate)
        if the exact value of the lhs is known then loop
            through the rhs preds
                get the predicate (vim_pred_col_get_pred)
                evaluate the predicate
                    (vim_evaluate_predicate)
        loop through the lhs predicates
            get the predicate (vim_pred_col_get_pred)
            if the primitive is unary and there are no
                rhs preds then
                    evaluate the predicate
                        (vim_evaluate_predicate)
            loop through the rhs predicates
                get the predicate (vim_pred_col_get_pred)
                evaluate the predicate
                    (vim_evaluate_predicate)

vim_evaluate_predicate
 * vim_evaluate_predicate: given exact value and/or
 * predicate information
 * about the left and right hand sides of an integer
 * operation, compute the result (if possible) and/or add
 * predicates to the result's fv containing information.
 * There are basically three situations:
 * For relational ops, we may be able to compute the
 * result based on predicate information.  For example,
 *    if we know
 *        lhs > lhs_arg
 *        lhs_arg > rhs_arg
 *        rhs < rhs_arg
 *    we know that lhs < rhs.  The bulk of this work is
 *        handled by
 *    vim_compute_rel_op_from_preds.
 *    For arithmetic ops, we may be able to compute
 *    predicates that apply to the result.  For example,
 *    if we know
 *        lhs > lhs_arg
 *        rhs > rhs_arg
 *        result = lhs + rhs (i.e., operation is eok_iadd)
 *    we know that result > lhs_arg + rhs_arg.  This is
 *    handled by vim_combine_rels_for_arith_op.
 *    For arithmetic operations, pointer validity must be
```

```
         *      updated.
                    if there is a predicate with an argument on the
                        lhs then
                            get the argument format of the primitive
                                (vim_primitive_arg_format)
                            get the lhs' argument
                                (vim_fv_fetch_from_svs)
                    otherwise
                        make the predicate's primitive ==
                    if there is a predicate with an argument on the
                        rhs then
                            get the argument format of the primitive
                                (vim_primitive_arg_format)
                            get the rhs' argument
                                (vim_fv_fetch_from_svs)
                    otherwise
                        make the predicate's primitive ==
                    if the primitive is a relational op and exact
                        values are known then compute the result
                        (vim_compute_rel_op_from_preds)
                    create a temporary for the result
                        (vim_fv_create_unknown)
                    compute the result
                        (vim_combine_rels_for_arith_op)
                    if the exact value of the result is known then
                        add the predicate (vim_pred_add_inferred)

vim_compute_rel_op_from_preds
              * vim_compute_rel_op_from_preds: given predicate
              * information about the left and right hand sides of a
              * relational operator, figure out the relation (if
              * known) between the lhs and rhs.  For example, if the
              * information passed in is lhs > lhs_pred_arg,
              * lhs_pred_arg > rhs_pred_arg, rhs < rhs_pred_arg
              * then the result is lhs > rhs.  If the information
              * passed in is lhs >= lhs_pred_arg, lhs_pred_arg >
              * rhs_pred_arg, rhs < rhs_pred_arg then the result is
              * lhs >= rhs.  If the information passed in is
              * lhs > lhs_pred_arg, lhs_pred_arg > rhs_pred_arg, rhs
              * > rhs_pred_arg then the result is unknown.
                    check the format (types) of the arguments
                        (vim_value_format_matches)
                    if the formats do not match then return
                    if the format is integer, unsigned, or pointer then
                        determine the basic operator
                            (vim_prim_rel_between_ints)
                    otherwise
                        determine the basic operator
                            (vim_prim_rel_between_reals)
                    convert the primary operator to a relational
                        operator (vim_rel_op_from_prim)
                    convert the lhs operator to a relational operator
                        (vim_rel_op_from_prim)
                    convert the rhs operator to a relational operator
                        (vim_rel_op_from_prim)
                    reverse the rhs operator (vim_rel_op_reverse)
                    compose the lhs operator and the basic operator
                        to an intermediate op (vim_rel_op_compose)
                    compose the intermediate operator and the rhs
```

```
            operator to the final op (vim_rel_op_compose)
       evaluate the final operation with the primary
            operation (vim_rel_op_does_desired_rel_hold)
       if the result is true then set the result in the
            fetched value to 1
       if the result is false then set the result in the
            fetched value to 0 vim_value_format_matches
       if both formats are either reals or integeroids
            (integer, unsigned, pointer) then the formats
            match vim_combine_rels_for_arith_op
 * vim_combine_rels_for_arith_op: combine relationships
 * to deal with "derived predicates" when computing an
 * integer operation.
       switch on operator
           Integer addition:
           Floating point addition:
               if the lhs argument or rhs argument is
               not defined then
                   the result is not computable
               else if the lhs operator is == then
                   use the rhs operator
               else if the rhs operator is == then
                   use the lhs operator
               else if the lhs operator is the same as
                   the rhs operator and the lhs operator
                   is not == then
                       use the lhs operator
               else if the lhs operator is > or >= and
                   the rhs operator is > or >= then
                       use the >= operator
               else if the lhs operator is < or <= and
                   the rhs operator is < or <= then
                       use the <= operator
               else the result is not computable
           Integer subtraction:
           Floating point subtraction:
               if the lhs argument or rhs argument is
                   not defined then
                       the result is not computable
               else if the lhs operator is == then
                   reverse rhs primitive
                       (vim_primitive_reverse)
               else if the rhs operator is == then use
           the lhs operator
               else if the lhs operator is >
                   and the rhs operator is < then
                       use the > operator
               else if the lhs operator is > or >= and
                   the rhs operator is < or <= then
                       use the >= operator
               else if the lhs operator is < and the rhs
                   operator is > then
                       use the < operator
               else if the lhs operator is < or <= and
                   the rhs operator is > or >= then
```

-133-

```
                            use the <= operator
                    else the result is not computable
            Integer negation:
            Floating point negation:
                if the lhs argument is not defined then
                    the result is not computable
                else if the lhs operator is == or != then
                    use the lhs operator
                else if the lhs operator is > then
                    use the < operator
                else if the lhs operator is >= then
                    use the <= operator
                else if the lhs operator is < then
                    use the > operator
                else if the lhs operator is <= then
                    use the >= operator
                else the result is not computable
        if the result is computable then compute it
            (vim_do_op)

vim_is_op_identity
 * Integer and floating point ops might be identity
 * operations -- returning either their left or right
 * hand side.  It may be useful for the callers to
 * know this independently of computing the value --
 * optimizations may be possible for computations, and
 * more information can be tracked in
 * predicates.
        switch on opcode type
            Integer negation:
                if the lhs is 0 then lhs is result
                    /* -0 = 0 */
            integer-integer or float-float cast:
                lhs is result
            Integer addition, Bitwise or ("|"):
                /* ops where 0 is the identity on both
                sides */
                if the lhs is 0 then rhs is result
                    /* 0 + X = X */
                if the rhs is 0 then lhs is result
                    /* X + 0 = X */
            Integer subtraction, Right shift (">>"), Left
            shift ("<<"):
                /* ops where 0 is the identity as rhs
                only */
                if the rhs is 0 then lhs is result
                    /* X - 0 = X */
            Integer multiplication:
                /* cases where 1 is the identity on both
                sides */
                if the lhs is 1 then rhs is result
                    /* 1 * X = X */
                if the rhs is 1 then lhs is result
                    /* X * 1 = X */
            Integer division:
                /* cases where 1 is the identity on rhs
                only */
                if the rhs is 1 then lhs is result
                    /* X / 1 = X */
```

```
                    Floating point negation:
                        if the lhs is 0.0 then lhs is result
                        /* -0.0 = 0.0 */
                    Floating point addition:
                        /* ops where 0.0 is the identity on both
                        sides */
                        if the lhs is 0.0 then rhs is result
                           /* 0.0 + X = X */
                        if the rhs is 0.0 then lhs is result
                           /* X + 0.0 = X */
                    Floating point subtraction:
                        /* ops where 0.0 is the identity as rhs
                        only */
                        if the rhs is 0.0 then lhs is result
                           /* X - 0.0 = X */
                    Floating point multiplication:
                        /* cases where 1.0 is the identity on
                        both sides */
                        if the lhs is 1.0 then rhs is result
                           /* 1.0 * X = X */
                        if the rhs is 1.0 then lhs is result
                           /* X * 1.0 = X */
                    Floating point division:
                        /* cases where 1.0 is the identity on rhs
                        only */
                        if the rhs is 1.0 then lhs is result
                           /* X / 1.0 = X */
                default:
                    no-op
        --- vim_asp (primitive assume) functions --- vim_free_memory
                get the chunk (vim_loc_check_and_convert)
                get the memory type (vim_chunk_get_memory_type)
                record that the chunk has been freed
                    (vim_chunk_set_freed_status)
                create an unknown origin (ctx_origin_create)
                set the chunk origin to the unknown one
            vim_direction_to_assume
                fetch the lhs (vim_fetch)
                fetch the rhs (vim_fetch)
                if exact values for both are known then assume
                    nothing
                if the lhs is known then assume the rhs
                if the rhs is known then assume the lhs
                if no exact values then assume the lhs
            vim_assume_lost
                get the chunk (vim_loc_check_and_convert)
                record that the chunk has been lost
                    (vim_chunk_set_lost)

            vim_test_freeable
          * vim_test_freeable: test to see if the memory given the
          * fv of the pointer to the memory can be freed.
                if the fetched value is uninitialized then report
                    an error and return (ERR_FREE_UNINIT_POINTER)
```

```
                        (vim_generate_err)
              if the exact value is unknown then return
              if the exact value is zero then report an error
                 and return (ERR_FREE_NULL_POINTER)
                    (vim_generate_err)
              get the chunk from the location (exact value)
                    (vim_loc_check_and_convert)
              get the memory type of the chunk
                    (vim_chunk_get_memory_type)
              test the memory type (vim_memory_type_ok_to_free)
              if the type cannot be freed then
                 report and error (determined in ok_to_free)
                 and return
              get the chunk's freed status
                    (vim_chunk_get_freed_status)
              if the chunk has already been freed then return
                 (the double free is reported in
                 vim_loc_check_and_convert)
              check the offset (vim_chunk_check_bounds)

--- vim_leak functions --- vim_mark_lost
       * vim_mark_lost: mark all memory beginning with a
       * location as lost to aliasing.  This can be used, for
       * example, to model passing a pointer to a missing-model
       * function.  That function could save the pointer in a
       * global, or free the memory.
              call vim_mark_reachable_and_lost vim_mark_reachable_and_lost (part of mark and sweep)
              (vim_leak)
              mark all memory, starting at a given location, as
                 reachable (and optionally as lost)

--- vim_res (resource) functions --- vim_resource_replace_state
              replace the resource type and state on one sv
                 with that on another vim_create_resource_for_location
              get the svs for the location
                    (vim_get_svs_for_location)
              get the first (and only) sv (vim_sv_col_get_sv)
              create a new location and resource
                    (vim_create_new_location)
              log a state_eq predicate (vim_loc_log_pred)
              get the svs for the new location
                    (vim_get_svs_for_location)
              get the first (and only) sv (vim_sv_col_get_sv)
              remember that the sv is new vim_create_resource_definition
              create a new location for the resource
                    (vim_create_new_location)
              get the stored value collection from the location
                    (vim_get_svs_for_location)
              get the stored value from the svs
```

```
              (vim_sv_col_get_sv)
         mark the resource as created rather than assumed
            (set is_new flag)

      vim_resource_evaluate (vim_res)
     * vim_resource_evaluate: evaluate a fetched value
     * against a resource
         get the resource predicates associated with the
            svs (vim_util_get_preds_for_svs)
         get the number of predicates
            (vim_pred_col_get_num_preds)
         loop through the predicates
            get the predicate (vim_pred_col_get_pred)
            compare the states (bot_str_compare)
         /* It's complicated.  There are two primitives
     and two states running around here; if we assume the
     resource state is X, and Y != X, the truth table looks
     like this:

       primitive    resource    predicate   predicate   result
       being        state       primitive   state
       evaluated ==           X           ==          X           TRUE
       ==           X           ==          Y           FALSE
       ==           X           !=          X           FALSE
       ==           X           !=          Y           ?

!==          X           ==          X           FALSE
       !==          X           ==          Y           ?
       !=           X           !=          X           TRUE
       !=           X           !=          Y           ?

We've compared the two states and have a
       relation.  Expressing the truth table in terms of the
       relation give us this:

primitive    relation    predicate   result
                 being                    primitive
                 evaluated ==           0           ==          TRUE
                 ==           1           ==          FALSE
                 ==           0           !=          FALSE
                 ==           1           !=          ?

!=           0           ==          FALSE
                 !=           1           ==          ?
                 !=           0           !=          TRUE
                 !=           1           !=          ?   */
         test the primitive and the relation per the
            second table
         set the result (true, false, don't know)

     --- vim_spred (stored predicate) functions --- vim_stored_pred_init (vim_spred)
          initialize stored predicate fields
            (prim, lhs, rhs)
```

```
                    if the rhs is not null then log the svs
                        (vim_util_record_svs_in_log)

vim_stored_pred_init_from_pred (vim_spred)
                  get the svs subset defined by the lhs
                        (vim_sv_col_subset)
                  copy the rhs svs (vim_sv_col_copy)
                  initialize the new predicate
                        (vim_stored_pred_init)
              vim_pred_needs_logging (vim_sprutil)
                  if the predicate is not a resource predicate then
                        return (other predicate filtering is done in
                        automodelling)
                  get the predicates for the svs
                        (vim_util_get_preds_for_svs)
                  get the size of the svs (vim_sv_col_get_num_svs)
                  get the number of predicates
                        (vim_pred_col_get_num_preds)
                  loop through all the predicates
                        get the predicate (vim_pred_col_get_pred)
                        if the svs sizes match and the predicate is
                            a resource one then
                            set the replace information
              vim_util_get_preds_for_svs (vim_sprutil)
                  get all the predicates that have been applied to
                        a set of stored values
              vim_util_record_svs_in_log (vim_sprutil)
                  mark each sv in an svs with the fact that it has
                        been used in a predicate logged in vim_facts,
                        vim_guards, or vim_tests
          --- vim_const functions --- vim_int_const
            * vim_int_const: return the location and stored values
            * for an integer constant of a particular size if there
            * is a constant representation.
                  create the constant of the right length
                        (8, 16, 32)
                  lookup the constant (vim_constant_loc)

              vim_double_const
                  create the constant of the right length (float,
                        double, long double)
                  lookup the constant (vim_constant_loc)

              vim_constant_loc
                  call vim_const_find vim_const_find
                  hash the value (vim_const_hash)
                  get the entry in the hash table
                        (bot_col_get_member)
                  loop through the constants chained to this entry
                        done if match (bot_mem_equal)
                  if no match then add the constant to the hash
```

```
                    table (vim_const_add)

vim_const_hash
            compute the hash value (unsigned short) from the
                constant value vim_const_add
            allocate the memory for the constant
                (bot_mem_alloc)
            initialize the constant (bot_mem_copy)
            create a location
                (vim_create_memory of type MEMORY_CONSTANT)
            get the svs for the location
                (vim_get_svs_for_location)
            get the entry in the hash table
                (bot_col_get_member)
            add this constant to the head of the chain
            replace the entry (bot_col_replace_member)

--- vim primitive utility (vim_prim) functions --- vim_primitive_arg_format
            determine the vim_value_format_t for the operands
            of an operation (C operator or model primitive)
                from the operation vim_primitive_get_underlying_op
            switch on operator
                Integer preincrement operator:
                Integer postincrement operator:
                Integer add assign operator:
                    +
                Integer predecrement operator:
                Integer postdecrement operator:
                Integer subtract assign operator:
                    -
                Integer multiply assign operator:
                    *
                Integer divide assign operator:
                    /
                Remainder assign operator:
                    %
                Left shift assign operator:
                    <<
                Right shift assign operator:
                    >>
                Bitwise and assign operator:
                    &
                Bitwise or assign operator:
                    |
                Exclusive or assign operator:
                    ~
                Floating point preincrement operator:
                Floating point postincrement operator:
                Floating point add assign operator:
                    +
                Floating point predecrement operator:
                Floating point postdecrement operator:
                Floating point subtract assign operator:
```

```
                Floating point multiply assign operator:
                    *
                Floating point divide assign operator:
                    /
                Pointer preincrement operator:
                Pointer postincrement operator:
                Pointer add assign operator:
                    +
                Pointer predecrement operator:
                Pointer postdecrement operator:
                Pointer subtract assign operator:
                    -
                Integer assignment:
                floating assignment:
                pointer assignment:
                block assignment:
                struct assignment:
                pointer-to-member assignment:
                    no-op vim_primitive_get_pointer_op_info
    * vim_primitive_get_pointer_op_info: for an pointer
    * operator, get information about how to implement it in
    * terms of integer operations.
          switch on operator
              Pointer addition:
                  +; multiply_operand
              Pointer subtraction:
                  -; multiply_operand
              C subscripting operation:
                  (the operands are the array address and
                  the subscript value; the result is the
                  value of that element of the array)
                  +, multiply_operand; deref_result
              Pointer de-reference ("*"):
              Pointer difference:
                  -; divide_result
              Pointer equality:
              Pointer-to-member equality:
                  ==
              Pointer inequality:
              Pointer-to-member inequality:
                  !=
              Pointer greater than:
                  >
              Pointer less than:
                  <
              Pointer greater than or equal:
                  >=
              Pointer less than or equal:
                  <=
              default:
                  no-op
      vim_primitive_reverse
          switch on operator
              ==: ==
              !=: !=
```

```
                    >:  <
                    <:  >
                    >=: <=
                    <=: >=
                    default: not reversible vim_prim_rel_between_ints
            if lhs == rhs then use ==
            else if lhs > rhs then use >
            else if lhs < rhs then use <
            else use != vim_prim_rel_between_reals
            if lhs == rhs then use ==
            else if lhs > rhs then use >
            else if lhs < rhs then use <
            else use !=

--- assorted functions ---
        vim_pred_add_inferred (vim_pred)
      * vim_pred_add_inferred: create a new inferred
      * predicate, based on some existing stored values, a
      * primitive, and a value.
            lookup the constant (vim_constant_loc)
            if the predicate collection doesn't exist then
                create it (vim_pred_col_create)
            initialize a new predicate with the prim and
                value (vim_pred_init)
            add the predicate (vim_pred_col_add_pred)

vim_pred_init (vim_pred)
            initialize the fields of a predicate
        vim_stored_resource_init (vim_sr)
            initialize the stored resource fields
                (a stored resource is the resource version of
                a stored value)

        vim_stored_value_init (vim_sv)
            initialize the stored value fields vim_rel_op_from_prim (vim_relop)
            convert a parse tree relational operator to a vim
            relational operator vim_rel_op_reverse (vim_relop)
            convert a relational operator to an equivalent
                one on reversed operands (for example,
            convert A > B to B < A)

vim_rel_op_compose (vim_relop)
            convert two relational operators on three
                arguments to one on two (for example, convert
            A > B and B > C to A > C)

vim_rel_op_does_desired_rel_hold (vim_relop)
      *                    actual
      * desired   ==   !=   >   >=   <   <=
```

-141-

```
      * ==         T    F    F    DK   F    DK
      * !=         F    T    T    DK   T    DK
      * >          F    DK   T    DK   F    F
      * >=         T    DK   T    T    F    DK
      * <          F    DK   F    F    T    DK
      * >=         T    DK   F    DK   T    T
            given a relation known to be true, determine if
               a second relation on the same operands is
               true
         vim_generate_err
       * vim_generate_err: generate an error about a location
            get the origin from the chunk or sv
            generate the error (err_generate)
      --- collection functions --- vim_pred_col_create
            create a predicate collection
         vim_pred_col_add_pred
            add a member to a predicate collection vim_pred_col_get_pred
            get a member of a predicate collection vim_pred_col_get_num_preds
            get the size of a predicate collection
         vim_sp_col_add_pred
            add a member to a stored predicate collection vim_sp_col_get_pred
            get a member of a stored predicate collection
         vim_sp_col_replace_pred
            replace a member of a stored predicate collection vim_sv_col_create_and_init
            create and initialize a stored value collection vim_sv_col_add_sv
            add a member to a stored value collection
         vim_sv_col_get_sv
            get a member of a stored value collection vim_sv_col_replace_sv
            replace a member of a stored value collection
         vim_sv_col_copy
            copy a stored value collection vim_sv_col_subset
            create a stored value collection that is a subset
               of an existing one vim_sv_col_get_num_svs
            get the size of a stored value collection
```

```
--- ctx functions used in vim --- ctx_origin_get_memory_type (ctx_orig)
        retrieve the what field from the origin ctx_origin_create (ctx_orig)
        get the emulation status (ctx_get_in_emulation)
        allocate a new origin (bot_mem_alloc)
        get the current statement into the origin
            (ctx_get_current_statement)
        get the current file and line into the origin
            (ctx_get_current_file_and_line)
        get the current expression into the origin
            (ctx_get_current_expression)
        if in emulation then
            get the emulated function into the origin
                (ctx_get_emulated_function)
            get the emulated outcome into the origin
                (ctx_get_emulated_outcome)
            get the external into the origin
                (ctx_get_external)

ctx_get_in_emulation
        determine whether emulation is in progress ctx_get_current_statement
        get the current statement from the context ctx_get_current_file_and_line
        get the current file and line from the context ctx_get_current_expression
        get the current expression from the context ctx_get_emulated_outcome
        get the outcome from the current emulation
            context ctx_get_external
        get the external from the current emulation
            context
```

Appendix E

The following pseudo code is one embodiment used to implement the automodeller.

--- models and modelling --

```
components of a model of a function:
    externs (data externally visible)
    parameters
    globals
    statics
    (a model can also have temporaries, which are
    handled like externs)
    outcomes (a case, determined by the return value
        of the function)
        return 0, return -1, return 1, return void,
        return some other known value, return an
        unknown value, longjmp, exit
    operations within outcomes
        constraints: what must be true when the
            function is called
        results: what is true after the function is
            executed
        guards: what must be true for a particular
            outcome to be used
    all operations have a: type, operation, and 1 or
        2 operands where a type is "constraint", etc.
        an operation is equality, etc. and an operand
        is an extern or constant value
    details
        Operation operands that refer to externs are
            not simple names. At each level of
            (de)reference the number of bytes and
            the offset are also specified. In this way
            fields of structures can be referenced.
            Extern operands are called references.
        References that refer to input values
            (which appear in guards and constraints)
            are labeled with a "@", while output
            value references are "plain". (Sometimes
            it's useful to refer to an input value
            in a result operation.)
        Operand constants can be integers or
            resources. A resource constant consist of
            a type/state pair of symbols. The type is
            the type of resource (such as FILE), and
            the state is the state (such as open).

overview of automodelling (the construction of models
    as functions are analyzed)
    At the end of each path through the function
        being analyzed, the value data base is
        scanned to determine the tests performed on
        each external, which determine the
        constraints and guards, and the changes made
        to each external (such as assignment), which
        determine the results. These constraints and
        results are packaged into an outcome.
```

```
                    At the end of the function, all the individual
                        path outcomes are scanned, extraneous
                        operations are removed, and duplicate
                        outcomes are eliminated.  The individual
                        outcomes are then packaged into the
                        function's model, along with the lists of the
                        externs.

--- data types and data structures --
                    data structures (from auto_pvt.h):
                Per operation:
                    a structure (auto_operation_tag) containing:
                        the operation type (guard, constraint,
                            result)
                        the primitive operation (assignment, etc.)
                        the left hand side reference
                        the type of the right hand side
                        the right hand side name (if extant)
                        the right hand side constant (if extant)
                        the right hand side resource type (if extant)
                        the right hand side resource state (if
                            extant)
                    ...the operation structure has all the potential
                        operands so that the structure will be
                        fixed size
                Per path:
                    an outcome -- a structure (auto_outcome_tag)
                        containing:
                        a return type (return_0, etc.)
                        a collection of guard predicates (or NULL)
                        a collection of constraints (or NULL)
                        a collection of results (or NULL)
                    ...guards, constraints, and results are in
                        separate collections to speed processing
                    a static variable holding the current outcome
                        (auto_current_outcome)

Per function:
                    a static variable holding a collection of all
                        per-path outcomes (auto_all_outcomes)
                    a structure (auto_model_tag) containing:
                        for each outcome type,
                            a collection of the merged outcomes
                            (distinguished by the guard collections)
                        a static variable holding the model
                            (auto_current_model)

--- auto initialization --
                auto_begin_function
                    Initialize (clear) data structures:
                        extern lists (collections of parameters,
                            globals, statics, temps)
                        current outcome
                        collection of all outcomes
                        current model
                        extern reference tables
                            (ins_name_table_create)
```

-145-

The reference table mechanism can be thought of
as a symbol table for references, so that each
reference is identified by a unique pointer -- if x is
a parameter, and the reference "x<4:0>" (referring to
the first 4 bytes of x) appears in two operations,
then each reference operand in each operation points
to the same reference table entry (rather than
separate copies of the string).

--- end of path (auto_path) functions --- auto_end_path
    don't automodel if failure during analysis or not
        wanted (config)
    determine the return type of the outcome for this
        path (auto_determine_return_type)
    clear the current outcome
        (auto_clear_current_outcome) data structure
    label all input values (auto_label_variables)
        (label original stored values accessible from
        the symbol table)
    label all output values (auto_label_variables)
        (label final stored values accessible from
        the symbol table)
    generate results for locations accessible by an
        input name only (auto_gen_input_results)
    generate the guards (auto_scan_predicates)
        (get and remember predicates from vim)
    generate the constraints (auto_scan_predicates)
        (get and remember predicates from vim)
    generate the results (auto_scan_predicates)
        (get and remember predicates from vim)
    add the outcome to the collection of all outcomes
        (auto_add_operations)

auto_determine_return_type
    if the exit code is exit or longjmp then use that
    look up the return value in the symbol table and
        get its location (sym_find_symbol)
    if the location is null then set the return type
        to void
    get the stored value set from the location
        (vim_get_stored_value_set)
    get the exact value (if any) from the stored
        value set (vim_svs_get_exact_value)
    if there is an exact value then
        convert it to a long integer
        set the return type based on the value (0,
        -1, etc.)
    otherwise set the return type to unknown auto_label_variables
    loop through the externs in the symbol table
        get the extern name, type, and location
            (sym_get_next_extern, sym_get_name)
        get the base reference table entry
            (create if necessary)
            (auto_get_root,ins_nt_entry_set_is_param)
        if we're labeling input values then

```
                        get the initial stored value set from the
                            location
                                (vim_get_initial_stored_value_set)
                        label input (auto_label_input_locations)
                    otherwise label output
                        (auto_label_output_locations)

auto_label_input_locations
                loop through the subsets of the initial stored
                value
                    get the label (if any) and subset size
                        (vim_svs_get_external_name)
                    if there is a label then pass on to the next
                        subset
                    otherwise
                        create the reference (auto_get_deref)
                        set the label (vim_svs_set_external_name)
                    loop through the values in the subset
                        get the exact value (if any)
                            (vim_svs_get_exact_value)
                        get the "computed" (unary) tests
                            (vim_svs_get_computed_tests)
                        remember the tests
                            (auto_scan_computed_predicates)
                        if the value is a pointer then
                            create the pointer reference
                            (auto_get_deref)
                            save the pointer in the input ptr col
                            get the svs of the value/location
                                (vim_get_initial_stored_value_set)
                            recurse (auto_label_input_locations)

auto_scan_computed_predicates
                    loop through the predicates
                        create the reference of the argument
                            (auto_get_deref)
                        if the predicate is "initialized" and the size
                            is "all" then
                                log the predicate
                                    (auto_log_unary_predicate)
                        otherwise
                            translate the operator from vim to ins
                                representation
                                (auto_translate_primitive)
                            if the primitive is not memory_new then
                                log the predicate
                                (auto_log_unary_predicate)
                            otherwise
                                get the number of bytes allocated
                                    (vim_svs_get_exact_value)
                                get the offset
                                    (vim_svs_get_exact_value,
                                     vim_get_stored_value_set)
                                if the offset is zero then log the
                                    predicate
                                    (auto_log_constant_predicate)
                                otherwise
                                    create the temp reference
                                        (auto_create_temp_name)
```

```
                              log the predicate using the temp
                                  ref
                                  (auto_log_constant_predicate)
                              log needed aliasing predicates
                                  (auto_gen_results_for_sv_col)

auto_gen_results_for_sv_col
             if this region of memory has been examined
                  then
                  generate a points-to operation (peq_addr)
                       (auto_adjust_reference_offset,
                        auto_log_operator)
             otherwise
                  if the location points to the base of the
                       region then
                       create the reference (auto_get_deref)
                       name the region
                           (vim_location_set_region_name)
                  get the filler for this memory region
                       (vim_location_get_expansion_method)
                  if the filler is a constant then log the
                       initialization predicate
                       (auto_log_constant_predicate)
                  loop through the stored value subsets
                       get the label (if any) and subset size
                            (vim_svs_get_external_name)
                       create the reference (auto_get_deref)
                       if there is an existing svs label then
                            if this is an output result then
                                 log an == predicate
                                 (auto_log_reference_predicate)
                            move on to the next subset
                       otherwise
                            if this is an output result then
                                 set the label
                                 (vim_svs_set_external_name)
                            if the subset has changed then
                                 loop through all the values
                                      if there is an input name
                                      then log an == predicate
                                      (auto_log_reference_predicate)
                            loop through all the values
                                 if the subset has changed or
                                      has been freed then
                                      if the value is not a
                                           pointer then
                                      generate == constant
                                           predicates
                                      (auto_scan_constant_results)
                                      process computed
                                           predicates
                                      (vim_svs_get_computed_facts)
                                      (auto_scan_computed_predicates)
                                 if the value is a pointer then
                                      create the reference
                                           (auto_get_deref)
                                      if desired then recurse
                                      (auto_label_output_locations)
                            check for an associated
```

-148-

```
                        resource change
                (vim_location_get_resource_change)
                    if a resource has changed
                        then log the results
                            (auto_scan_resource_results)

auto_scan_constant_results
            loop through the exact values in the svs
                get the svs (vim_svs_get_exact_value)
                if it is not a pointer then
                    build an integer of the appropriate
                            size from the individual sv
                            bytes
                    log the predicate
                        (auto_log_constant_predicate)

auto_scan_resource_results
            loop through the resources in the svs
                get the svs (vim_svs_get_resource)
                if the resource is new then
                    log a resource_new predicate
                        (auto_log_resource_result)
                otherwise
                    log a resource_state predicate
                        (auto_log_resource_result)

auto_log_reference_predicate
            if the second (rhs) operand has been labeled
                    (auto_get_name) then
                package arguments and log the operation
                    (auto_log_operator)

auto_get_name
            get the input label
                (vim_svs_get_external_name)
            if the input name doesn't match then
                get the output label
                    (vim_svs_get_external_name)

auto_log_unary_predicate
            package arguments and log the operation
                (auto_log_operator)

auto_log_constant_predicate
            package arguments and log the operation
                (auto_log_operator)

auto_log_operator
            if the operation has the form X == X then
                ignore it
            if the operation is a result and is a
                    parameter then ignore it
                    (call by value)
                    (note that derefs of parameters
                        are not ignored)
            package the operands into an auto_operation_t
            put the operation in the proper collection
                (guard, constraint, result)
                of the current outcome
```

```
                                  (avoiding duplication)

auto_get_deref
            lookup the reference (ins_nt_entry_find_deref)
            if the reference exists then return it else
                    create it
                (ins_nt_entry_add_deref)

auto_label_output_locations
            if the location is from a parameter then
                get the initial stored value set
                    (vim_get_initial_stored_value_set)
            otherwise get the final stored value set
                (vim_get_stored_value_set)
            log the associated predicates
                (auto_gen_results_for_sv_col)

auto_gen_input_results
            loop through the pointers saved in the input
                    pointer collection
                get the associated stored value set
                    (vim_get_stored_value_set)
                log the associated predicates
                    (auto_gen_results_for_sv_col)
        auto_scan_predicates
            if scanning guards then get them
                (vim_get_all_guards)
            if scanning constraints then get them
                (vim_svs_get_all_tests)
            if scanning results then get them
                (vim_get_all_facts)
            loop through the predicates
                get a predicate (vim_pred_col_get_pred)
                get the label on the first (lhs) operand
                        (if any)
                    (vim_svs_get_external_name)
                if the first operand is labeled and not a
                        parameter then
                    log the predicate
                        (auto_scan_predicate)

auto_scan_predicate
            translate the operator from vim to ins
                    representation
                (auto_translate_primitive)
            if the predicate is a resource one then log it
                (auto_log_operator)
            get the label of the second operand
                (rhs) if any (auto_get_name)
            if the predicate has a labeled rhs then log it
                (auto_log_operator)
            log a predicate with a constant second operand
                    (if any)
                (auto_scan_constant_predicate)
            if any predicates have been logged so far
                    then return
            convert binary operators that have unlabeled
                    second operands into unary operators
```

```
                        valid_offset, comparable, and pointer
                        relationals are mapped to
                        valid_pointer)
                       (all others are mapped to initialized)
            log the unary predicate (auto_log_operator)

auto_scan_constant_predicate
            get the svs (vim_svs_get_exact_value)
            if they are not pointers then
                build an integer of the appropriate size
                    from the sv bytes
            log the predicate (auto_log_operator)

--- end of function (auto_func) functions --- auto_end_function:
            don't automodel if failure during analysis or
                    not wanted (config)
            create the model (auto_create_ins_model)
            clean up data structures
                (auto_clean_all_outcomes,
                 auto_clean_current_model,
                 ins_name_table_delete)

auto_create_ins_model
            loop through all the outcomes
                (auto_all_outcomes)
                    process the outcome
                        (auto_get_model_outcome)
            create the basic model
                (ins_function_model_create)
            create the param list
                (ins_function_model_add_params)
            create the global list
                (ins_function_model_add_globals)
            create the static list
                (ins_function_model_add_statics)
            create the temp list
                (ins_function_model_add_temps)
            create the return_0 outcomes
                (auto_create_ins_outcomes)
            create the return_1 outcomes
                (auto_create_ins_outcomes)
            create the return_minus1 outcomes
                (auto_create_ins_outcomes)
            create the return_X outcomes
                (auto_create_ins_outcomes)
            create the return_void outcomes
                (auto_create_ins_outcomes)
            create the longjmp outcomes
                (auto_create_ins_outcomes)
            create the exit outcomes
                (auto_create_ins_outcomes)
            insert the completed model into the model
                    table
                (ins_mt_insert)

auto_create_ins_outcomes
            loop through the outcome collection of the
```

-151-

```
                    given return type
                create the outcome
                    (auto_create_ins_outcome)

       auto_create_ins_outcome
            create the outcome itself
                (ins_function_model_create_outcome)
            create the guards (auto_create_ins_operations)
            create the constraints
                (auto_create_ins_operations)
            create the results
                (auto_create_ins_operations)

auto_create_ins_operations
            loop through the operations
                create the operands
                    (auto_create_ins_operands)
                create the operation
                    (ins_function_model_add_operation)
        auto_create_ins_operands
            create the first (lhs) operand
                (ins_nt_entry_get_name,
                 ins_model_operand_create)
            create the second (rhs) operand based on its
                    type (variable, constant, resource)
                (ins_nt_entry_get_name,
                 ins_model_operand_create)

        auto_get_model_outcome
            select the proper return type collection from
                    auto_current_model
            filter the guard collection
                (auto_filter_operations)
            filter the constraint collection
                (auto_filter_operations)
            filter the result collection
                (auto_filter_operations)
            remove extraneous results that appear in
                    guards and constraints
                (auto_remove_results)
            match the current outcome with other outcomes
                    in the return type collection
                (auto_choose_model_outcome)
            if there was no match then
                add the current outcome to the return
                        type collection auto_filter_operations
            loop through the input operation collection
                if the input operation is useless then
                        do not put it in the output col
                    (auto_ignore_operation)
                loop through the accumulating output
                        collection
                    if the input operation is a duplicate
                            then do not put it in the
                            output col
                        (auto_match_operation)
```

-152-

```
                    compare the input and output
                        operations
                        (auto_filter_operation)
                    if the output operation is weak then
                        replace it with the input
                    if the input operation is weak then
                        do not put it in the output col
                    if the input operation has not replaced
                        an output operation
                        and has not been suppressed then
                    add it to the output col auto_ignore_operation
            if first operand is the same as the second
                    operand then
                ignore the operation auto_filter_operation
            for operations on the same variable
                select valid pointer over initialized
                select a relational with a constant over
                    initialized
                select a relational with a variable over
                    initialized
                select valid pointer over a relational
                    with a constant
                select equality with variable over
                    equality with constant
                select more inclusive relational with a
                    constant for results and constraints
                select less inclusive relational with a
                    constant for guards
                convert X >= C and X <= C to X == C
                convert X > C and X == C to X >= C
                convert X < C and X == C to X <= C
                if the operations are X >= C and X == C
                    then select X == C
                if the operations are X <= C and X == C
                    then select X == C
                if the operations are X == C1 and X != C2
                    then select X == C1 auto_remove_results
            loop through all results
                loop through all guards
                    compare the guard and the result
                        (auto_match_operation)
                    if there is a match then
                        delete the result
                loop through all constraints
                    compare the constraint and the result
                        (auto_match_operation)
                    if there is a match then
                        delete the result auto_match_operations
            loop through all the operations in the first
                collection
                loop through all the operations in the
```

```
                        second collection
                    compare two operations
                        (auto_match_operation)
                    if the operation from the first
                            collection did not match
                            any operation from the second
                    then no match auto_match_operation
            if the two operators are the not the same
                then no match
            if the second operand types are not the
                same then no match
            if the operator is == or != or comparable then
                compare first operands and second operands
                and compare opposite operands
                    (lhs-1 with rhs-2,
                    lhs-2 with rhs-1)
                    because of commutativity
            if neither are the same then no match
            if the first operands are not the same then
                no match
            if the second operands (name, constant, or
                resource) are not the same then
                no match auto_choose_model_outcome
            get the number of outcomes from the return
                type collection
            if it is below a configureable threshold then
                simply match the outcome
                    (auto_match_model_outcome)
            otherwise
                loop through all the outcomes in the
                    return type collection
                    compare the guards
                        (auto_match_operations)
                    if the guards matched then
                        sort the two sets of results
                            (from the input outcome
                            and from the test outcome
                            in the return type col)
                            (auto_sort_operations)
                        compare the results
                            (auto_compare_results)
                if an outcome from the return type col
                    matched in the above loop then
                sort and merge the two sets of constraints
                    (auto_sort_operations,
                    auto_merge_operations)
                merge the results (auto_merge_operations)
                remove extraneous results that appear in
                    guards and constraints
                    (auto_remove_results)
                replace the matched outcome from the
                    return type collection auto_match_model_outcome
            loop through all the outcomes in the return
```

```
                    type collection
            compare the guards (auto_match_operations)
            compare the constraints
                    (auto_match_operations)
            compare the results
                    (auto_match_operations)
            if all collections matched then
                    select this outcome
        if no outcome selected then no match auto_sort_operations
        loop through all the operations in the first
                collection
            loop through all the operations in the
                    second collection
                if the two operations are the same
                        then
                        put it in the common collection
                            (auto_match_operation)
                if the operation from the first col did
                        not match any from the second
                    then put it in the first-only
                            collection
        loop through the second collection (flags)
            if the operation did not match any from
                    the first then
                put it in the second-only collection auto_merge_operations
        loop through the first input operation
                collection
            loop through the second input collection
                compare the two operations
                    (auto_merge_operation)
                if the first operation is selected
                    then add it to the output collection
                if the second operation is selected
                    then add it to the output collection auto_merge_operation
        for operations on the same variable
            select initialized over valid pointer
            select initialized over a relational with
                    a constant
            select initialized over a relational with
                    a variable
            select valid pointer over a relational
                    with a constant
            select less inclusive relational with a
                    constant
            convert X >= C and X <= C to initialized
            convert X > C and X == C to X >= C
            convert X < C and X == C to X <= C
            convert X == C and X != C to initialized
            convert X < C and X > C to initialized
            convert X >= C and X < C to initialized
            convert X > C and X <= C to initialized
            if the operations are X >= C and X == C
                then select X == C
```

```
                    if the operations are X <= C and X == C
                        then select X == C
                    if the operations are X == C1 and X != C2
                        then select X == C1
        --- vim functions used in automodelling --- vim_get_stored_value_set (vim_loc)
                get the chunk and offset
                    (vim_loc_to_chunk_and_offset)
                get the stored values from the chunk
                    (vim_chunk_get_stored_values)
                determine whether the stored values have
                        changed
                    (vim_chunk_have_stored_values_changed)

vim_chunk_have_stored_values_changed (vim_chunk)
                get the assigned to data from the chunk
            vim_get_initial_stored_value_set (vim_loc)
                get the chunk and offset
                    (vim_loc_to_chunk_and_offset)
                get the initial stored values from the chunk
                    (vim_chunk_get_initial_stored_values)
            vim_chunk_get_initial_stored_values (vim_chunk)
                retrieve the original stored values data
                set the ending offset
            vim_svs_get_exact_value (vim_sv)
        * Get the exact value from an svs, along with
        * information about whether this is a valid pointer.
                get the number of stored values
                    (vim_sv_col_get_num_svs)
                loop through all the values
                    get the stored value (vim_sv_col_get_sv)
                    if the exact value is known then
                        copy the byte into the output exact
                            value array
                    if the exact value array points to a
                            valid location
                            (vim_loc_check_location) then
                        note that it is a tracked value
                    return
            vim_svs_get_external_name (vim_sv)
                get the first stored value (vim_sv_col_get_sv)
                if an input name is wanted then get the input
                        name
                    (ctx_origin_get_input_name)
                otherwise get the output name
                    (ctx_origin_get_output_name)
                get the number of stored values
                    (vim_sv_col_get_num_svs)
                loop through all the values
                    get the stored value (vim_sv_col_get_sv)
                    if an input name is wanted then get the
                            input name
                        (ctx_origin_get_input_name)
```

```
                    otherwise get the output name
                        (ctx_origin_get_output_name)
                    if the name is different from the name on
                        the first value then
                        return with the length of the common
                            name vim_svs_set_external_name (vim_sv)
            get the number of stored values
                (vim_sv_col_get_num_svs)
            loop through all the values
                get the stored value (vim_sv_col_get_sv)
                if an input name is begin set then
                    get the old input name (if any)
                        (ctx_origin_get_input_name)
                otherwise get the old output name (if any)
                    (ctx_origin_get_output_name)
                if there is an old name then return
                if there is an existing origin then
                    copy it (ctx_origin_copy)
                    if an input name is begin set then
                        set it
                            (ctx_origin_set_input_name)
                    otherwise set the output name
                        (ctx_origin_set_output_name)
                set the origin of the stored value to the
                    copied origin (or null)

vim_svs_get_computed_tests (vim_loc)
        * vim_svs_get_computed_tests: certain unary predicates
        * are not stored as tests, but rather computed as
        * needed.  This function does that computation, figuring
        * out VIM_PRIM_INITIALIZED.
            get the number of stored values
                (vim_sv_col_get_num_svs)
            loop through all the values
                get the stored value (vim_sv_col_get_sv)
                if the sv has not been tested as
                    initialized
                then continue
                loop through the remaining values
                    get the stored value
                        (vim_sv_col_get_sv)
                    if the sv has not been tested as
                        initialized
                    then break
                create the predicate (vim_pred_init)
                if there is no predicate collection then
                    create one (vim_pred_col_create)
                add the predicate to the collection
                    (vim_pred_col_add_pred)

vim_svs_get_computed_facts (vim_loc)
        * vim_svs_get_computed_facts: certain unary predicates
        * are not stored as facts, but rather computed as
        * needed.  This function does that computation,
        * figuring out
        *       VIM_PRIM_FREED_MEMORY,
        *       VIM_PRIM_NEW_MEMORY,
```

-157-

```
*           VIM_PRIM_INITIALIZED, and
*           VIM_PRIM_VALID_POINTER.
         get the number of sv's in the svs
             (vim_sv_col_get_num_svs)
         create the result predicate collection
             (vim_pred_col_create)
         get the freed status of the input location
             (vim_location_get_freed_status)
         if the chunk has been freed then
             initialize a new freed predicate
                 (vim_pred_init)
             add the new predicate to the collection
                 (vim_pred_col_add_pred)
             return
         loop through the stored values
             get a stored value (vim_sv_col_get_sv)
             if the stored value is initialized and is
                     not assumed and an exact value is
                     not known then
                 loop through the remaining sv's
                     get a stored value
                         (vim_sv_col_get_sv)
                     if the stored value is not
                             initialized or is assumed
                             or an exact value is known
                         then break
                 initialize a new initialized predicate
                     (vim_pred_init)
                 add the new predicate to the collection
                     (vim_pred_col_add_pred)
         loop through all possible exact values
                 in the svs
             get the exact value (if any)
                 (vim_svs_get_exact_value)
             if the exact value is not known or is not
                     pointer sized then continue
             get the pointed-to chunk (if any)
                 (vim_loc_check_and_convert)
             if the pointer is valid then
                 initialize a new valid pointer pred
                     (vim_pred_init)
                 add the new pred to the collection
                     (vim_pred_col_add_pred)
                 if the chunk has not been freed then
                     get the memory type of the chunk
                         (vim_chunk_get_memory_type)
                     get the visited status of the chunk
                         (vim_chunk_get_new_memory_visited)
                     if the pointed-to memory
                             is heap memory and has
                             not been visited then
                         get the size of the pointed-to
                             memory from the svs
                             (vim_chunk_get_stored_values)
                         create the pointed-to memory
                             (vim_create_memory)
                         get the svs for the created
                             memory
                             (vim_get_svs_for_location)
```

-158-

```
                                initialize a memory new pred
                                    for the created memory
                                    (vim_pred_init)
                                add the new pred to the
                                    collection
                                    (vim_pred_col_add_pred)
                                mark the chunk as visited
                            (vim_chunk_get_new_memory_visited)

vim_chunk_get_new_memory_visited (vim_chunk)
            get the visited flag from the chunk vim_chunk_set_new_memory_visited (vim_chunk)
            set the visited flag of the chunk vim_location_get_freed_status (vim_loc)
            get the chunk and offset
                (vim_loc_to_chunk_and_offset)
            get the chunk's freed status
                (vim_chunk_get_freed_status)

vim_svs_get_all_tests (vim_loc)
            convert and get the tests
                (vim_convert_pred_col)

vim_get_all_guards (vim_loc)
            convert and get the guards
                (vim_convert_pred_col)

vim_get_all_facts (vim_loc)
            convert and get the facts
                (vim_convert_pred_col)

vim_convert_pred_col (vim_loc)
    *   vim_convert_pred_col: generate a vim_pred_col_t
    *   equivalent to the input vim_stored_pred_col_t.
            get the number of stored predicates
                (vim_sp_col_get_num_preds)
            create the result predicate collection
                (vim_pred_col_create)
            loop through the stored predicates
                get the stored predicate
                    (vim_sp_col_get_pred)
                if the stored predicate is a fact
                    and assumed then skip (continue)
                get the number of stored values on the
                    lhs of the predicate
                    (vim_sv_col_get_num_svs)
                initialize the new predicate from the
                    stored predicate
                    (vim_pred_init_from_sp)
                add the new predicate to the collection
                    (vim_pred_col_add_pred)

vim_sp_col_get_num_preds (vim_spc)
            get the size of a stored predicate collection vim_pred_init_from_sp (vim_pred)
            initialize a predicate with fields from
```

```
                a stored predicate
                    (vim_pred_init)

vim_svs_get_resource (vim_res)
            get the resource (vim_svs_get_bound_resource)

vim_svs_get_bound_resource
            get the number of stored values
                (vim_sv_col_get_num_svs)
            get the resource predicates for the stored
                values
                (vim_util_get_preds_for_svs)
            if there are no predicates then return
            get the number of predicates
                (vim_pred_col_get_num_preds)
            loop through all the predicates
                get the predicate (vim_pred_col_get_pred)
                if the predicate matches the svs
                    (by offset) then
                    get the resource from the predicate
                        (vim_sv_col_get_sv)
                    return vim_location_set_region_name (vim_loc)
            get the chunk and offset
                (vim_loc_to_chunk_and_offset)
            set the name on the chunk
                (vim_chunk_set_auto_name)

vim_chunk_set_auto_name (vim_chunk)
            set the auto name field on the chunk vim_location_get_resource_change (vim_loc)
            get the chunk and offset
                (vim_loc_to_chunk_and_offset)
            get the name from the chunk
                (vim_chunk_get_auto_name)

vim_chunk_get_auto_name (vim_chunk)
            get the auto name field on the chunk vim_location_get_expansion_method
            get the chunk and offset
                (vim_loc_to_chunk_and_offset)
            get the expansion method from the chunk
                (vim_chunk_set_auto_name)

vim_chunk_get_expansion_method (vim_chunk)
            get the flags
                expand marking as initialized
                expand initializing with an exact value
                expand using the default value for the
                    memory type --- ins model functions used in automodelling (ins_mod)

ins_function_model_create
            allocate a function model data structure
                (ins_function_model_t)
```

```
            initialize the data structure ins_function_model_add_params
        fill in the parameter list of a function model ins_function_model_add_globals
        fill in the global list of a function model ins_function_model_add_statics
        fill in the static list of a function model ins_function_model_add_temps
        fill in the temp list of a function model ins_function_model_create_outcome
        allocate a model outcome data structure
            (ins_outcome_model_t)
        initialize the data structure
        add it to the outcome collection of a
            function model ins_function_model_add_operation
        initialize a model operation data structure
            (ins_model_operation_t)
        add it to the proper operation collection
            (guard, constraint, result)
            of a model outcome --- ins model functions used in automodelling (others)

ins_model_operand_create (ins_operand)
        allocate a model operand data structure
            (ins_model_operand_t)
        initialize the data structure ins_mt_insert (ins_mtbl)
        insert a model into the model table --- ins name functions used in automodelling --- ins_name_table_create
        create a new name table ins_nt_entry_add_deref
        add a deref name entry to a base name entry
            in a name table ins_nt_entry_find_deref
        find a deref name entry from a base name
            entry in a name table ins_nt_entry_get_name
        get the name string of a name entry in a name
            table ins_nt_entry_set_is_param
        indicate that an entry in a name table is a
            parameter
```

```
--- ctx functions used in vim for automodelling --- ctx_origin_copy
            allocate a new origin (bot_mem_alloc)
            copy the data ctx_origin_get_input_name
            retrieve the input name field from the origin
        ctx_origin_get_output_name
            retrieve the output name field from the origin ctx_origin_set_input_name
            set the input name field on the origin
        ctx_origin_set_output_name
            set the output name field on the origin
```

Appendix F

The following pseudo code is one embodiment used to implement function emulation as performed by action 2504.

--- exe_eval functions ---

```
exe_evaluate_funccall_operation
    get the location of the function
        (exe_evaluate_expr)
    if the func loc evaluation caused a longjmp
        or exit then return
    lookup the function model from the location
        (exe_lookup_function_model)
    create the external map that maps external
            names to locations
        (a symbol table for model externals)
        (ins_create_external_map_col)
    create the return value location
        (exe_evaluate_funccall_return)
    indicate in the execution context that
            emulation is in progress
        (ctx_set_in_emulation)
    set the name of the model in the execution
            context
        (ctx_set_emulated_function)
    evaluate the function parameters
        (exe_evaluate_funccall_parameters)
    if the actual and formal parameters didn't
            match then
        use the missing model for emulation
    if the func param evaluation caused a longjmp
        or exit then return
    lay out memory for the globals and statics in
            the model
        (exe_layout_model_externals)
    emulate the model (ins_emulate)
    if emulation caused a longjmp or exit then
            return
    if the result is needed as a condition then
            produce it
        (exe_fill_in_arg_info,
         ins_is_condition_true)
    clear the emulation flag in the execution
            context
        (ctx_set_in_emulation)

exe_lookup_function_model
* exe_lookup_function_model: get a function model
*   from a location.  Looking up the model from the
*   routine address location is a 3 step process:
*   1) get the stored value set from the location,
*   2) get the exact value from the stored value set,
*   and 3) look up the model from the exact value.
    get the location (vim_get_pointed_to)
    if the location is null then
        use the missing model
        return
    get the svs for the location
```

```
                    (vim_get_svs_for_location)
               if the svs is null then
                    use the missing model
                    return
               get the exact value from the svs
                    (vim_svs_get_exact_value)
               if the exact value is unknown then
                    use the missing model
                    return
               look up the model in the model table
                    (ins_mt_lookup)
               if the model is not found then
                    use the missing model
          exe_evaluate_funccall_return
               if the function is not void then
                    lay out memory based on the return type
                         (vim_create_memory)
                    fill in the argument size info
                         (exe_fill_in_arg_info)
                    add the return value to the external map
                         (ins_add_external_map_entry)

exe_evaluate_funccall_parameters
               create a collection of parameter locations
                    (ins_arg_info_col_create)
               match up actual and formal parameters
                    (exe_check_parameters)
               loop through the parameters
                    evaluate the parameter (exe_evaluate_expr)
                    if the param evaluation caused a longjmp
                         or exit then return
                    fill in the argument size info
                         (exe_fill_in_arg_info)
                    add the location to the collection
                         (ins_arg_info_col_add_member)
                    get the model parameter information
                         (ins_external_info_col_get_member)
                    add the parameter to the external map
                         (ins_add_external_map_entry)
               if there are varargs then loop through the
                         varargs
                    evaluate the vararg parameter
                         (exe_evaluate_expr)
                    if the param evaluation caused a longjmp
                         or exit then return
                    fill in the argument size info
                         (exe_fill_in_arg_info)
                    emulate the vararg
                         (ins_emulate_vararg_parameter)
               if there was a parameter mismatch then
                    return status indicating that exe_check_parameters
               count the number of actual parameters
               get the number of formals
                    (ins_external_info_col_get_num_members)
               if the number of actuals and formals is not
                         the same then
```

```
                get the last formal
                    (ins_external_info_col_get_member)
                if the last formal is "..." then
                    there are varargs
                otherwise if the missing model is not
                        being used then
                    report an error
                        (ins_report_parameter_mismatch)

exe_fill_in_arg_info
            get the size of the argument
                (based on its type) from the parse tree --- exe_decl functions --- exe_layout_model_externals
            lay out the globals
                (exe_layout_model_externals_by_memtype)
            lay out the statics
                (exe_layout_model_externals_by_memtype)
            lay out the temporaries
                (exe_layout_model_externals_by_memtype)

exe_layout_model_externals_by_memtype
            get the number of externals of this type
                (ins_external_info_col_get_num_members)
            loop through the externals
                get the external
                    (ins_external_info_col_get_member)
                lay out the external
                    (exe_layout_model_external)
                add the external to the external map
                    (ins_add_external_map_entry)

exe_layout_model_external
            get the external from the parse tree
                (mcil_get_external)
            look up or add this variable to the symbol
                table (exe_find_declaration)
            fill in the argument size info
                (exe_fill_in_arg_info)

exe_find_declaration
            [discussed elsewhere]

--- ins_emul functions --- ins_emulate
            push the external map and model for nested
                    emulation
            check for the missing model
                (ins_check_missing_model)
            if the model is missing then
                emulate using the missing model
                    (ins_emulate_missing)
                return
            set the exit code to return
            if there are no outcomes then return
            get the number of outcomes
```

```
                (bot_col_get_num_members)
        loop through the outcomes
            get the outcome (bot_col_get_member)
            test its guards (ins_emulate_enables)
        if no outcomes are enabled then
            emulate using the missing model
                (ins_emulate_missing)
            return
        choose an outcome among those enabled
            (cph_choose_outcome)
        get the chosen outcome (bot_col_get_member)
        set the outcome in the context
            (ctx_set_emulated_outcome)
        assume the guards (ins_emulate_assumes)
        test the constraints (ins_emulate_tests)
        set the return value based on the outcome type
            (ins_set_return_value)
        set the results (ins_emulate_sets)
        set the exit code based on the outcome
        pop the external map and model ins_emulate_missing
        loop through the parameters
            get the parameter (bot_col_get_member)
            if the parameter points to something
                    (points_to_size > 0) then
                get the location
                    (ins_get_points_to_location)
                if the location is not null then
                    set the attributes of what the
                            parameter points to
                        (ins_emulate_missing_external)
        loop through the globals and statics
            get the external (bot_col_get_member)
            set the external's attributes
                (ins_emulate_missing_external)
        if the return location is not null then
            mark it as initialized
                (vim_primitive_set)

ins_get_points_to_location
        perform the dereference (vim_get_pointed_to)

ins_emulate_missing_external
    * Set attributes for an external to a missing model.
    * These are sets and not assumes so that IO or
    * output parameters don't cause subsequent spurious
    * errors.
        mark the external location as lost
            (vim_mark_lost)
            (we don't know what happens to it)
        set the external to initialized
            (vim_primitive_set)
        if the external points to something then
            get the location
                (ins_get_points_to_location)
            if the location is not null then
                set what it points to as initialized
                    (vim_primitive_set)
```

```
                    if the external points to something that
                            points to something
                            (points_to_points_to_size > 0) then
                        get the location
                            (ins_get_points_to_location)
                        if the location is not null then
                            set what it points to as
                                    initialized (vim_primitive_set)

            ins_emulate_enables
                set the default return to enabled
                loop through the guards
                    get the guard (bot_col_get_member)
                    test the guard (ins_emulate_enable)
            ins_emulate_enable
                get the first operand (ins_emulate_operand)
                get the second operand (ins_emulate_operand)
                apply the primitive (ins_primitive_test)
                if the result is false then disable the guard
                otherwise
                    (true or don't known) enable the guard ins_emulate_assumes
                loop through the guards
                    get the guard (bot_col_get_member)
                    assume the guard (ins_emulate_assume)

ins_emulate_assume
                get the first operand (ins_emulate_operand)
                get the second operand (ins_emulate_operand)
                apply the primitive (ins_primitive_assume)

ins_emulate_tests
                loop through the constraints
                    get the constraint (bot_col_get_member)
                    test the constraint (ins_emulate_test)

ins_emulate_test
                get the first operand (ins_emulate_operand)
                get the second operand (ins_emulate_operand)
                apply the primitive (ins_primitive_test)

ins_set_return_value
          * Set the return value based on the outcome type.
          * This is less precise than any information that may
          * be in the results, but handles cases where the
          * automodeller could not derive any results for the
          * return value (e.g., return_unknown or return_X).
                switch on return type
                    0, 1, -1, void, exit, longjmp, unknown:
                        record the make initialized data
                    X:
                        record the make initialized data
                        record the make valid data
                        set the return not to 0
                            (ins_set_return_not_integer)
                        set the return not to 1
                            (ins_set_return_not_integer)
```

```
                    set the return not to -1
                            (ins_set_return_not_integer)
                default:
                    record the make initialized data
                    record the make valid data
                if make initialized then
                    assume the result is initialized
                        (vim_primitive_assume)
                if make valid then
                    assume the result is a valid pointer
                        (vim_primitive_assume)

ins_set_return_not_integer
      * Add a predicate to the return value which assumes
      *   it is not equal to the given integer.
                create memory for the constant
                    (vim_create_memory)
                assume the not equal predicate for the result
                    and the constant
                    (ins_primitive_assume)

ins_emulate_sets
            loop through the results
                get the result (bot_col_get_member)
                set the result (ins_emulate_set)

ins_emulate_set
            get the first operand (ins_emulate_operand)
            get the second operand (ins_emulate_operand)
            if the operand locations are null then return
            get the status of the lhs
                (bot_col_lookup_member,
                 ins_loc_status_map)
            if a memory new or resource new has been done
                    on the lhs and then primitive is a
                    memory new or equality then return
            if a set has not been done before on the lhs
                    then perform the set
                (ins_primitive_set)
            otherwise if the primitive is a memory new,
                    memory freed, resource new,
                    or address equality operator then
                perform the set (ins_primitive_set)
            otherwise assume the primitive
                (ins_primitive_assume)
            set the status of the lhs
                (bot_col_replace_member,
                 ins_loc_status_map)

ins_emulate_operand
            if the operand is null then return
            switch on operand type
                constant:
                    get the constant
                        (ins_emulate_constant)
                variable:
                    get the variable
                        (ins_emulate_variable)
                resource:
```

```
                    create the resource definition
                        (vim_create_resource_definition)
        ins_emulate_constant
            allocate the right sized memory for the
                    constant (bot_mem_alloc)
            assign the value to the memory
            create the constant in vim memory
                (vim_create_memory)

ins_emulate_variable
            if the variable name is "NULL" then handle as
                    constant 0 and return
                (ins_emulate_constant)
            if the variable name is "EOF" then handle as
                    constant -1 and return
                (ins_emulate_constant)
            if the variable name is "default" then handle
                    as constant 0 and return
                (ins_emulate_constant)
            if the variable name is "..." then return
                (handled during parameter processing)
            look up the location of the external
                (bot_col_lookup_member,
                    ins_external_map->extern_col)
            if the location is not known then return
            set variable information in the context
                (ins_set_emulated_variable_info)
            get the operand size (ins_apply_ref_bytes)

ins_set_emulated_variable_info
            loop through the model parameters
                get the parameter info
                    (ins_external_info_col_get_member)
                if the variable matches the parameter then
                    set the variable in the context as a
                            param (ctx_set_external)
                    return
            set the variable in the context as a global
                (ctx_set_external)

ins_apply_ref_bytes
            walk the name table getting the operand size
                    and offset --- ins_prim functions --- ins_primitive_test
            convert the ins prim to a vim prim
                (ins_prim_map_to_vim_prim)
            if error reporting is desired then
                perform a test
                    (vim_primitive_test)
            otherwise evaluate (vim_primitive_evaluate)

ins_primitive_assume
            convert the ins prim to a vim prim
                (ins_prim_map_to_vim_prim)
            assume (vim_primitive_assume)
```

-169-

```
         ins_prim_map_to_vim_prim
              convert ins primitive enumerations to vim
                   primitive enumerations
              (switch on primitive type)
         ins_primitive_set
              switch on primitive type
                   memory_new, memory_new_stack:
                        if the rhs location argument is not
                               null then
                             get the svs
                                  (vim_get_stored_value_set)
                             get the exact value (if any)
                                  (vim_svs_get_exact_value)
                             use the exact value as the size
                                  of the memory block
                        otherwise
                             use 0 as the size of the memory
                                  block (default)
                        create new pointed-to memory
                             (vim_create_memory)
                        create new pointer memory
                             (vim_create_memory)
                             (this points to the pointed-to
                                  memory)
                        set the lhs location to the new memory
                             (vim_primitive_set using the ==
                             primitive)
                   memory_freed:
                        perform the set (vim_primitive_set)
                   memory_initialized:
                        perform the set (vim_primitive_set)
                   memory_valid_pointer:
                        perform the set (vim_primitive_set)
                   memory_invalid_pointer:
                        perform the set (vim_primitive_set)
                   memory_valid_offset:
                        perform the set (vim_primitive_set)
                   memory_comparable:
                        perform the set (vim_primitive_set)
                   memory_incomparable:
                        perform the set (vim_primitive_set)
                   resource_new:
                        create a resource at the location
                             (vim_create_resource_for_location)
                   resource_state:
                        perform the set (vim_primitive_set)
                   resource_not_state:
                        perform the set (vim_primitive_set)
                   int_non_zero:
                        perform the set (vim_primitive_set)
                   float_non_zero:
                        perform the set (vim_primitive_set)
                   ==:
                        perform the set (vim_primitive_set)
                   !=:
                        perform the set (vim_primitive_set)
                   <:
                        perform the set (vim_primitive_set)
```

```
        <=:
                perform the set (vim_primitive_set)
        >:
                perform the set (vim_primitive_set)
        >=:
                perform the set (vim_primitive_set)
        peq_addr:
                create new pointer memory
                        (vim_create_memory)
                set the lhs location to the new
                        pointer
                        (vim_primitive_set using the ==
                        primitive)

--- assorted ins functions --- ins_create_external_map_col (ins_emul)
        create an external to location map collection
                (bot_col_create)

ins_add_external_map_entry (ins_emul)
        add an entry to an external map
                (bot_col_add_member)

ins_external_info_col_get_member (ins_extern)
        get a member from an external info collection
                (bot_col_get_member)

ins_external_info_col_get_num_members (ins_extern)
        get the number of members of an external info
                collection
                (bot_col_get_num_members)

ins_arg_info_col_create (ins_extern)
        create an arg info collection
                (bot_col_create)

ins_arg_info_col_add_member (ins_extern)
        add a member to an arg info collection
                (bot_col_add_member)

ins_emulate_vararg_parameter (ins_emul)
        test that the param is initialized
                (ins_primitive_test)
        get what the param points to
                (ins_get_points_to_location)
        if it point to a valid location then
                emulate a missing external
                        (ins_emulate_missing_external)

ins_is_condition_true (ins_ctrl)
        get the condition's truth value
                (vim_primitive_test)
        if the value is true then return true
        if the value is false then return false
        if the value is don't know then
                if true is preferred then return true
                if false is preferred then return false
                otherwise choose true or false
```

-171-

```
                (cph_choose_condition)

ins_report_parameter_mismatch (ins_mtbl)
           if the mismatch warning for this model has not
                  been given then
               issue the warning
               mark the model with warning given --- other functions ---
       ins_check_missing_model (ins_mtbl)
           if the model is the missing model then
               get the function being emulated from the
                   context
                  (ctx_get_emulated_function)
               if the function being emulated is unknown
                   (the location of the function is not
                   an exact value) then return
               create a key for the function
                  (ins_mt_create_key)
               find the entry in the model table
                   (bot_col_lookup_member)
               if the model has not been reported as
                   missing then
                  report the missing model
                       (err_generate)
                       (ERR_MISSING_FUNCTION_MODEL)
                   set the missing_reported field of the
                       model table entry
                  update the model table entry
                       (bot_col_replace_member)

mcil_get_external
           get an external from the parse tree
    --- ctx functions used in emulation --- ctx_set_in_emulation
           if entering emulation then
               initialize and push an emulation context
               increment the emulation depth
           otherwise (if leaving emulation)
               pop an emulation context
               decrement the emulation depth
       ctx_set_emulated_function
           set the emulated function in the current
               emulation context
       ctx_get_emulated_function
           get the emulated function from the current
               emulation context ctx_set_emulated_outcome
           set the outcome in the current emulation
               context ctx_set_external
           set the external in the current emulation
``` context

Appendix G

The following describes the modelling language used in one embodiment of the present invention.

Meaning of Constraint, Guard, and Result Operations

The modelling language supports a variety of operations (some of which can only be used for results).

Constraint and guard operations on memory:
- memory_initialized: requires that the variable must be initialized;
- memory_valid_pointer: requires that the variable be a valid pointer;
- memory_valid_offset: requires that the variable be a valid offset into a structure or array;
- memory_freeable: requires that the variable have memory that can be freed;
- pointer_comparable: requires that two pointers point into the same chunk of allocated memory.
- int_non_zero: requires that the variable have a non-zero value;

Result operations on memory:
- memory_new: allocates new memory;
- memory_new_stack: allocates new memory on the stack;
- memory_freed: frees allocated memory;
- memory_initialized: asserts that the variable is initialized;
- memory_valid_pointer: asserts that the variable is a valid pointer;
- memory_valid_offset: asserts that the variable is a valid offset;
- pointer_comparable: asserts that the two pointers point into the same chunk of allocated memory.
- int_non_zero: asserts that the variable has a non-zero value;

Comparison constraint, guard, and result operations:
- signed integer: ieq, ine, ilt, ile, igt, ige;
- unsigned integer: ueq, une, ult, ule, ugt, uge;
- floating point: feq, fne, flt, fle, fgt, fge;
- pointer: peq, peq_addr, pne, plt, ple, pgt, pge.

Resources and Resource Operations

There is a final class of special operations.

These operations are used to define constraints and
results on a special type of object, a resource. A
resource is an object that has a state, such as a file.
A file can be open (in the open state) or closed (in
the closed state). Functions change the state of such
objects (fclose, for example, changes the state of a
file from open to closed), and the resource operations
enable the modelling of such behavior. For example, the
model of the fopen function creates a "FILE" resource
in the open state using the "resource_new" operation:
    (result resource_new *return (FILE open))
The model for fclose requires that its file input
parameter be open:
    (constraint resource_state *stream (FILE open))
and changes the state of the file to closed:
    (result resource_state *stream (FILE closed))

At the lowest level resource operations must be
added by hand. Analyzer 202 cannot tell, for instance,
by analyzing the code for fopen, that a file resource
needs to be created (files are fundamentally a higher
level, abstract concept). But analyzer 202 will
propagate resource operations up to callers of
functions that use them -- it will, for example,
propagate the "resource_new" operation in fopen up into
models of functions that call fopen.

Constraint and guard resource operations:
- resource_state: requires that the given
  resource be in the given state;
- resource_not_state: requires that the given
  resource not be in the given state;

Result resource operations:
- resource_new: creates the given resource and
  sets it to the given state;
- resource_state: sets the given resource to
  the given state.

The Model Language Syntax

The complete model language syntax is given below,
in modified BNF. Note that:

- items in square brackets ([ ]) are optional;

- items in braces ({ }) can appear one or more
  times;

- a <name> is a symbol; a <number> is an
  unsigned integer; a <string> is a C string
  constant (such as "Intrinsa");

- items with name, number, or string in their
  names (such as <file-name>, <line-number>,
  and <descriptive-string>) are names, numbers,
  and strings respectively;

-175-

- comments (in the C form of /* ... */) are
  supported.

The syntax:

```
<model-specification> ::=
    ( <routine-header> { <case> } )

<routine-header> ::=
    <routine-name>
        [ <documentation> ]
        [ <params> ]
        [ <globals> ]
        [ <statics> ]
        [ <temporaries> ]

<documentation> ::=
        [ <file-name> [ <line-number>
            [ <descriptive-string> ] ] ]

<params> ::=
    ( param { <variable-definition> } )

<globals> ::=
    ( global { <variable-definition> } )

<statics> ::=
    ( static { <variable-definition> } )

<temporaries> ::=
    ( temp { <variable-definition> } )

<variable-definition> ::=
    <extern-name> [ <byte-field> ]

<case> ::=
    ( <case-header> [ { <operation> } ] )

<case-header> ::=
    <case-type>
        [ <return-type> ] [ <reason-string> ]

<case-type> ::=
        normal
      | error
      | alternate

<return-type> ::=
        return_0
      | return_1
      | return_minus1
      | return_X
      | return_void
      | return_type_unknown
      | longjmp
      | exit <operation> ::=
    ( <operation-type>
```

-176-

```
                    <operator>
                    <operand>
                [ <operand> ] )

5       <operation-type> ::=
                    guard
                  | constraint
                  | result <operator> ::=
                    memory_new
                  | memory_new_stack
                  | memory_freed
                  | memory_freeable
                  | memory_initialized
                  | memory_valid_pointer
                  | memory_invalid_pointer
                  | memory_valid_offset
                  | pointer_comparable
                  | pointer_incomparable
                  | resource_new
                  | resource_state
                  | resource_not_state
                  | int_non_zero
                  | float_non_zero
                  | ieq  | ine  | ilt
                  | ile  | igt  | ige
                  | ueq  | une  | ult
                  | ule  | ugt  | uge
                  | feq  | fne  | flt
                  | fle  | fgt  | fge
                  | peq  | pne  | plt
                  | ple  | pgt  | pge 35      <operand> ::=
                    <variable>
                  | <constant>
                  | <resource-specification>

40      <variable> ::=
                [ { <dereference> } ]
                    <variable-name>
                [ <byte-field> ]

45      <variable-name> ::=
                    <name>
                  | <name>@

<dereference> ::= * [ <byte-field> ]
50
        <byte-field> ::=
                    < <size> >
                  | < : <offset> >
                  | < <size> : <offset> >
55
        <size> ::=
                    <number-of-bytes>
                  | all
```

-177-

```
        <offset> ::= <number-of-bytes>

<constant> ::=
                <number>
              | - <number>

<resource-specification> ::=
            ( <resource-type-name>
              <resource-state-name> )

Semantic notes:

- All parameters must be listed in the params
          list in the order they appear in the modeled
          function.

- A variable name with a trailing @ indicates
          an input value.

- All guards in a case are implicitly anded
          (&&) together.

- All constraints in a case are implicitly
          anded (&&) together.  Thus
                (constraint ige n 0)
                (constraint ile n 255)
          requires that 0 <= n <= 255.

- All results in a case are implicitly anded
          (&&) together.  Thus
                (result ige n 0)
                (result ile n 255)
          states that 0 <= n <= 255.

- Note that
                (constraint memory_valid_pointer V)
          implies, in order:
                (constraint memory_initialized V)
                (constraint ine V 0)
          (where V is a variable, a sized variable, a
          dereference, or the remaining variables).

- Note that
                (constraint <relational-operator> V
                    <argument>)
          implies:
                (constraint memory_initialized V)

- Note that resource_new creates a resource,
          and that resource is associated with the
          given variable.  The resource is separate
          from the variable's normal value.  For
          example, a file descriptor fd is an int and
          is laid out as such.  It also has an
          associated resource with a state.  This
          resource is tested and set with the resource
          primitives, which operate on the associated
          object.
```

- Note that resource types and states have no special meaning to analyzer 202. They can be arbitrary names. Analyzer 202 has no inherent knowledge of files, for example, or the states files can be in.

- There are a few variable names that have special meaning. Variables cannot have these names:
    1) return (for the return value);
    2) ... (for the remaining parameters in a function);
    3) NULL;
    4) EOF;
    5) default.

We claim:

1. A method for simulating execution of a computer program to detect programming errors in said computer program, said computer program containing at least one function, said function containing one or more statements, said method comprising:
   retrieving a representation of said computer program;
   traversing a first control flow path through said function wherein said first control flow path comprises a first sequence of said statements, wherein said traversing comprises:
      maintaining a first structural memory model for said function over said first control flow path;
      manipulating said first structural memory model to simulate execution of said first sequence of said statements;
      detecting an invalid condition in said first structural memory model; and
      reporting said invalid condition in said first structural memory model.

2. A method as in claim 1 wherein said representation of said computer program is an internal format structure.

3. A method as in claim 1 further comprising:
   identifying all said functions defined by said computer program;
   ordering a list of said functions defined by said computer program based on a function call ordering; and
   scheduling an analysis of said computer program based upon said ordering a list of said functions defined by said computer program.

4. A method as in claim 1 further comprising:
   accepting a configuration control command; and
   modifying an analysis of said computer program based upon said configuration control command.

5. A method as in claim 4 further comprising:
   accepting a second configuration control command for a specified function; and
   modifying an analysis of said specified function based upon said second configuration control command.

6. A method as in claim 5 further comprising:
   accepting a third configuration control command for a specified statement; and
   modifying an analysis of said specified statement based upon said third configuration control command.

7. A method as in claim 6 wherein said reporting said invalid condition in said first sturctural memory model further comprises:
   determining that one of said configuration control command, said second configuration control command and said third configuration control command orders suppression of said invalid condition; and
   suppressing reporting of said invalid condition.

8. A method as in claim 1 wherein said traversing a first control flow path through said function further comprises:
   identifying an unresolved choice point in said first control flow path;
   representing said unresolved choice point by a node in a tree, wherein said node contains an edge for each potential resolution of said choice point; and
   resolving said unresolved choice point by randomly choosing a first unselected edge to determine a first choice.

9. A method as in claim 8 wherein said resolving said unresolved choice point further comprises:
   maintaining a history of said first choice; and
   randomly choosing a second unselected edge to determine a second choice.

10. A method as in claim 8 wherein said traversing a first control flow path through said function further comprises:
    updating said first structural memory model to reflect said resolving said unresolved choice point.

11. A method as in claim 1 further comprising:
    analyzing said representation of said computer program to identify a function call;
    locating an external behavior model of a called function corresponding to said function call;
    retrieving said external behavior model of a called function corresponding to said function call; and, wherein said manipulating said first structural memory model to simulate execution of said first sequence of said statements further comprises:
    emulating execution of said function call through execution of said external behavior model of a called function corresponding to said function call.

12. A method as in claim 1 wherein said invalid condition in said first structural memory model signals an uninitialized piece of memory.

13. A method as in claim 1 wherein said invalid condition in said first structural memory model signals an invalid pointer.

14. A method as in claim 1 wherein said invalid condition in said first structural memory model signals a zero divisor.

15. A method as in claim 1 further comprising:
    logging information describing said manipulating said first structural memory model to produce a first logged data.

16. A method as in claim 15 further comprising automodelling said function to generate an external behavior model corresponding to said function, wherein said automodelling comprises:
    scanning said first logged data to produce a first outcome for said first control flow path.

17. A method as in claim 16 wherein said automodelling said function further comprises:
    scanning said first logged data to identify an extern of said function.

18. A method as in claim 17 further comprising:
    traversing a second control flow path through said function, wherein said second control flow path comprises a second sequence of said statements, wherein said traversing comprises:
    maintaining a second structural memory model for said function over said second control flow path;
    manipulating said second structural memory model to simulate execution of said second sequence of said statements;
    logging information describing said manipulating said second structural memory model to produce a second logged data; and wherein, automodelling said function to generate an external behavior model corresponding to said function further comprises:
    scanning said second logged data to produce a second outcome for said second control flow path;
    eliminating duplicates among said first outcome and said second outcome to generate one or more remaining outcomes; and
    packaging said remaining outcomes and said extern into said external behavior model corresponding to said function.

19. A method as in claim 18 wherein said computer program is a first function.

20. A method as in claim 19 wherein said first function is part of a second computer program and wherein said external behavior model generated by said automodelling said function is used to emulate said first function in an analysis of said second computer program.

21. A method as in claim 16 wherein said automodelling said function further comprises:

ordering a symbol table, wherein said symbol table comprises one or more links to said first structural memory model prior to said logging information describing said manipulating said first structural memory model.

22. A method as in claim 1 wherein said reporting said invalid condition in said first structural memory model further comprises:

determining that said invalid condition is a duplicate; and suppressing reporting of said invalid condition.

23. A method for simulating execution of a computer program to detect programming errors in said computer program, said computer program containing at least one function, said function containing zero statements, said method comprising:

retrieving a representation of said computer program;

traversing a control flow path through said function wherein said control flow path comprises zero statements, wherein said traversing comprises:

maintaining a structural memory model for said function over said control flow path;

logging information describing said function to produce a logged data; and automodelling said function to generate an external behavior model corresponding to said function, wherein said automodelling comprises:

scanning said logged data to produce an outcome for said control flow path.

24. A method as in claim 23 wherein said automodelling said function further comprises:

scanning said logged data to identify an extern of said function.

25. A method for simulating execution of a computer program to detect programming errors in said computer program, said computer program containing one or more statements, said method comprising:

retrieving a representation of said computer program;

traversing a first control flow path through said computer program wherein said first control flow path comprises a first sequence of said statements, wherein said traversing comprises:

maintaining a first structural memory model for said computer program over said first control flow path;

manipulating said first structural memory model to simulate execution of said first sequence of said statements;

detecting invalid conditions in said first structural memory model; and reporting said invalid conditions in said first structural memory model.

26. A method as in claim 25 wherein said representation of said computer program is an internal format structure.

27. A method as in claim 25 wherein said traversing a first control flow path through said computer program further comprises:

identifying an unresolved choice point in said first control flow path;

representing said unresolved choice point by a node in a tree, wherein said node contains an edge for each potential resolution of said choice point; and resolving said unresolved choice point by randomly choosing a first unselected edge to determine a first choice.

28. A method as in claim 27 wherein said resolving said unresolved choice point further comprises:

maintaining a history of said first choice; and randomly choosing a second unselected edge to determine a second choice.

29. A method as in claim 27 wherein said traversing a first control flow path through said computer program further comprises:

updating said first structural memory model to reflect said resolving said unresolved choice point.

30. A method as in claim 25 further comprising:

analyzing said representation of said computer program to identify a function call;

locating an external behavior model of a called function corresponding to said function call;

retrieving said external behavior model of a called function corresponding to said function call; and, wherein said manipulating said first structural memory model to simulate execution of said first sequence of said statements further comprises:

emulating execution of said function call through execution of said external behavior model of a called function corresponding to said function call.

31. A method as in claim 25 wherein said invalid condition in said first structural memory model signals an uninitialized piece of memory.

32. A method as in claim 25 wherein said invalid condition in said first structural memory model signals an invalid pointer.

33. A method as in claim 25 wherein said invalid condition in said first structural memory model signals a zero divisor.

34. A method as in claim 25 further comprising:

logging information describing said manipulating said first structural memory model to produce a first logged data.

35. A method as in claim 34 further comprising automodelling said computer program to generate an external behavior model corresponding to said computer program, wherein said automodelling comprises:

scanning said first logged data to produce a first outcome for said first control flow path.

36. A method as in claim 35 wherein said automodelling said computer program further comprises:

ordering a symbol table, wherein said symbol table comprises one or more links to said first structural memory model prior to said logging information describing said manipulating said first structural memory model.

37. A method as in claim 35 wherein said automodelling said computer program further comprises:

scanning said first logged data to identify an extern of said computer program.

38. A method as in claim 37 further comprising:

traversing a second control flow path through said computer program wherein said second control flow path comprises a second sequence of said statements, wherein said traversing comprises:

maintaining a second structural memory model for said computer program over said second control flow path;

manipulating said second structural memory model to simulate execution of said second sequence of said statements;

logging information describing said manipulating said second structural memory model to produce a second logged data; and wherein, automodelling said computer program to generate an external behavior model corresponding to said computer program further comprises:

scanning said second logged data to produce a second outcome for said second control flow path;

eliminating duplicates among said first outcome and said second outcome to generate one or more remaining outcomes;

packaging said remaining outcomes and said extern into said external behavior model corresponding to said computer program.

39. A method as in claim 25 wherein said computer program is part of a second computer program and wherein said external behavior model generated by said automodelling said computer program is used to emulate said computer program in an analysis of said second computer program.

40. An error detection processor for detecting errors in a computer program, said computer program comprising one or more statements, said error detection processor comprising:

a structural memory model which represents the behavior of said computer program upon a simulation;

an analysis engine which traverses a control flow path through said computer program, wherein said control flow path is comprised of a sequence of said statements;

a statement unit which simulates the effect of said statements in the said control flow path; and an error generation unit which reports invalid conditions detected within said structural memory model after said simulation.

41. The error detection processor of claim 40 further comprising:

an automodeller which generates an external behavior model to represent the visible behavior of said computer program.

* * * * *